US008243278B2

(12) United States Patent
Valois

(10) Patent No.: US 8,243,278 B2
(45) Date of Patent: Aug. 14, 2012

(54) NON-CONTACT SELECTION AND CONTROL OF LIGHTING DEVICES

(75) Inventor: Charles Bernard Valois, Westford, MA (US)

(73) Assignee: Integrated Illumination Systems, Inc., Morris, CT (US)

( * ) Notice: Subject to any disclaimer, the term of this patent is extended or adjusted under 35 U.S.C. 154(b) by 429 days.

(21) Appl. No.: 12/466,647

(22) Filed: May 15, 2009

(65) Prior Publication Data
US 2009/0284747 A1    Nov. 19, 2009

Related U.S. Application Data

(60) Provisional application No. 61/053,792, filed on May 16, 2008.

(51) Int. Cl.
*G01N 21/55* (2006.01)
*G01C 3/08* (2006.01)
*G01J 1/00* (2006.01)

(52) U.S. Cl. ........ 356/448; 346/4.01; 346/213; 346/445

(58) Field of Classification Search .................. None
See application file for complete search history.

(56) References Cited

U.S. PATENT DOCUMENTS

| | | | |
|---|---|---|---|
| 4,298,869 A * | 11/1981 | Okuno | 345/82 |
| 5,659,582 A * | 8/1997 | Kojima et al. | 375/345 |
| 5,909,429 A | 6/1999 | Satyanarayana et al. | |
| 5,947,587 A | 9/1999 | Keuper et al. | |
| 6,013,988 A | 1/2000 | Bucks et al. | |
| 6,016,038 A | 1/2000 | Mueller et al. | |
| 6,040,663 A | 3/2000 | Bucks et al. | |
| 6,094,014 A | 7/2000 | Bucks et al. | |
| 6,127,783 A | 10/2000 | Pashley et al. | |
| 6,147,458 A | 11/2000 | Bucks et al. | |

(Continued)

FOREIGN PATENT DOCUMENTS
WO    WO 03/017733 A1    2/2003

OTHER PUBLICATIONS

Lee, M., Shunt Battery Charger Provides 1A Continuous Current, EDN Magazine, 1997.

(Continued)

*Primary Examiner* — Hwa Lee
*Assistant Examiner* — Gordon Stock, Jr.
(74) *Attorney, Agent, or Firm* — Foley & Lardner LLP; Christopher J. McKenna

(57) ABSTRACT

The present disclosure presents systems and methods for providing for detecting a presence of an object or a user via a non-contact selection switch. An LED may emit a signal, comprising high components and low components within a plurality of pulses. A detector may determine that an average intensity of a received portion of the electromagnetic signal is below a predetermined threshold. The average intensity may be responsive to a ratio of high components duration over a period of time to low components duration over the period of time. An object located in proximity of the non-contact switch may reflect the portion of the signal. The detector may detect presence of the object by determining that a sum of average intensities of the received portion of the electromagnetic signal and the reflected portion of the electromagnetic signal exceeds the predetermined threshold responsive to the ratio of a duration of high components to a duration of low components within or over the period of time.

20 Claims, 9 Drawing Sheets

U.S. PATENT DOCUMENTS

| | | |
|---|---|---|
| 6,150,774 A | 11/2000 | Mueller et al. |
| 6,157,093 A | 12/2000 | Giannopoulos et al. |
| 6,166,496 A | 12/2000 | Lys et al. |
| 6,194,839 B1 | 2/2001 | Chang |
| 6,201,353 B1 | 3/2001 | Chang et al. |
| 6,211,626 B1 | 4/2001 | Lys et al. |
| 6,234,645 B1 | 5/2001 | Borner et al. |
| 6,234,648 B1 | 5/2001 | Borner et al. |
| 6,249,088 B1 | 6/2001 | Chang |
| 6,250,774 B1 | 6/2001 | Begemann et al. |
| 6,288,497 B1 | 9/2001 | Chang et al. |
| 6,292,901 B1 | 9/2001 | Lys et al. |
| 6,304,464 B1 | 10/2001 | Jacobs et al. |
| 6,340,864 B1 | 1/2002 | Wacyk |
| 6,340,868 B1 | 1/2002 | Lys et al. |
| 6,384,545 B1 | 5/2002 | Lau |
| 6,390,983 B1 * | 5/2002 | Mo et al. ................. 600/453 |
| 6,411,046 B1 | 6/2002 | Muthu |
| 6,441,558 B1 | 8/2002 | Muthu et al. |
| 6,445,139 B1 | 9/2002 | Marshall et al. |
| 6,459,919 B1 | 10/2002 | Lys et al. |
| 6,489,731 B1 | 12/2002 | Bruning et al. |
| 6,495,964 B1 | 12/2002 | Muthu et al. |
| 6,507,158 B1 | 1/2003 | Wang |
| 6,507,159 B2 | 1/2003 | Muthu |
| 6,510,995 B2 | 1/2003 | Muthu et al. |
| 6,513,949 B1 | 2/2003 | Marshall et al. |
| 6,528,954 B1 | 3/2003 | Lys et al. |
| 6,552,495 B1 | 4/2003 | Chang |
| 6,576,881 B2 | 6/2003 | Muthu et al. |
| 6,577,080 B2 | 6/2003 | Lys et al. |
| 6,577,512 B2 | 6/2003 | Tripathi et al. |
| 6,580,309 B2 | 6/2003 | Jacobs et al. |
| 6,586,890 B2 | 7/2003 | Min et al. |
| 6,596,977 B2 | 7/2003 | Muthu et al. |
| 6,608,453 B2 | 8/2003 | Morgan et al. |
| 6,609,813 B1 | 8/2003 | Showers et al. |
| 6,617,795 B2 | 9/2003 | Bruning |
| 6,621,235 B2 | 9/2003 | Chang |
| 6,630,801 B2 | 10/2003 | Schuurmans |
| 6,636,003 B2 | 10/2003 | Rahm et al. |
| 6,639,368 B2 | 10/2003 | Sheoghong |
| 6,676,284 B1 | 1/2004 | Wynne Willson |
| 6,692,136 B2 | 2/2004 | Marshall et al. |
| 6,720,745 B2 | 4/2004 | Lys et al. |
| 6,724,159 B2 | 4/2004 | Gutta et al. |
| 6,734,639 B2 | 5/2004 | Chang et al. |
| 6,741,351 B2 | 5/2004 | Marshall et al. |
| 6,762,562 B2 | 7/2004 | Leong |
| 6,777,891 B2 | 8/2004 | Lys et al. |
| 6,788,011 B2 | 9/2004 | Mueller et al. |
| 6,796,680 B1 | 9/2004 | Showers et al. |
| 6,796,686 B2 | 9/2004 | Jacob et al. |
| 6,801,003 B2 | 10/2004 | Schanberger et al. |
| 6,806,659 B1 | 10/2004 | Mueller et al. |
| 6,831,569 B2 | 12/2004 | Wang et al. |
| 6,853,150 B2 | 2/2005 | Clauberg et al. |
| 6,853,151 B2 | 2/2005 | Leong et al. |
| 6,859,644 B2 | 2/2005 | Wang |
| 6,922,022 B2 | 7/2005 | Bucks et al. |
| 6,930,452 B2 | 8/2005 | De Krijger et al. |
| 6,932,477 B2 | 8/2005 | Stanton |
| 6,933,685 B2 | 8/2005 | Gutta et al. |
| 6,933,767 B2 | 8/2005 | Bucks et al. |
| 6,965,205 B2 | 11/2005 | Piepgras et al. |
| 6,969,954 B2 | 11/2005 | Lys |
| 6,972,525 B2 | 12/2005 | Bucks et al. |
| 6,975,079 B2 | 12/2005 | Lys et al. |
| 6,992,803 B2 | 1/2006 | Chang |
| 6,998,594 B2 | 2/2006 | Gaines et al. |
| 7,014,336 B1 | 3/2006 | Ducharme et al. |
| 7,030,572 B2 | 4/2006 | Nijhof et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,064,498 B2 | 6/2006 | Dowling et al. |
| 7,067,992 B2 | 6/2006 | Leong et al. |
| 7,071,762 B2 | 7/2006 | Xu et al. |
| 7,113,541 B1 | 9/2006 | Lys et al. |
| 7,118,248 B2 | 10/2006 | Wynne Willson |
| 7,132,804 B2 | 11/2006 | Lys et al. |
| 7,135,824 B2 | 11/2006 | Lys et al. |
| 7,139,617 B1 | 11/2006 | Morgan et al. |
| 7,140,752 B2 | 11/2006 | Ashdown |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,180,252 B2 | 2/2007 | Lys et al. |
| 7,186,003 B2 | 3/2007 | Dowling et al. |
| 7,202,608 B2 | 4/2007 | Robinson et al. |
| 7,202,613 B2 | 4/2007 | Morgan et al. |
| 7,202,641 B2 | 4/2007 | Claessens et al. |
| 7,204,622 B2 | 4/2007 | Dowling et al. |
| 7,221,104 B2 | 5/2007 | Lys et al. |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,242,152 B2 | 7/2007 | Dowling et al. |
| 7,253,566 B2 | 8/2007 | Lys et al. |
| 7,255,457 B2 | 8/2007 | Ducharme et al. |
| 7,255,458 B2 | 8/2007 | Ashdown |
| 7,256,554 B2 | 8/2007 | Lys |
| 7,262,559 B2 | 8/2007 | Tripathi et al. |
| 7,267,461 B2 | 9/2007 | Kan et al. |
| 7,274,160 B2 | 9/2007 | Mueller et al. |
| 7,300,192 B2 | 11/2007 | Mueller et al. |
| 7,308,296 B2 | 12/2007 | Lys et al. |
| 7,314,289 B2 | 1/2008 | Montagne |
| 7,319,298 B2 | 1/2008 | Jungwirth et al. |
| 7,323,676 B2 | 1/2008 | Duijve |
| 7,329,998 B2 | 2/2008 | Jungwirth |
| 7,349,454 B2 * | 3/2008 | Quek et al. ................. 372/38.02 |
| 7,350,936 B2 | 4/2008 | Ducharme et al. |
| 7,352,339 B2 | 4/2008 | Morgan et al. |
| 7,353,071 B2 | 4/2008 | Blackwell et al. |
| 7,354,172 B2 | 4/2008 | Chemel et al. |
| 7,358,679 B2 | 4/2008 | Lys et al. |
| 7,358,681 B2 | 4/2008 | Robinson et al. |
| 7,358,706 B2 | 4/2008 | Lys |
| 7,358,929 B2 | 4/2008 | Mueller et al. |
| 7,358,961 B2 | 4/2008 | Zwanenburg |
| 7,387,405 B2 | 6/2008 | Ducharme et al. |
| 7,388,665 B2 | 6/2008 | Ashdown |
| 7,394,210 B2 | 7/2008 | Ashdown |
| 7,420,335 B2 | 9/2008 | Robinson et al. |
| 7,423,387 B2 | 9/2008 | Robinson et al. |
| 7,432,668 B2 | 10/2008 | Zwanenburg et al. |
| 7,443,209 B2 | 10/2008 | Chang |
| 7,449,847 B2 | 11/2008 | Schanberger et al. |
| 7,453,217 B2 | 11/2008 | Lys et al. |
| 7,459,864 B2 | 12/2008 | Lys |
| 7,462,997 B2 | 12/2008 | Mueller et al. |
| 7,463,070 B2 | 12/2008 | Wessels |
| 7,482,565 B2 | 1/2009 | Morgan et al. |
| 7,482,760 B2 | 1/2009 | Jungwirth et al. |
| 7,490,953 B2 | 2/2009 | Holten et al. |
| 7,490,957 B2 | 2/2009 | Leong et al. |
| 7,495,671 B2 | 2/2009 | Chemel et al. |
| 7,502,034 B2 | 3/2009 | Chemel et al. |
| 7,505,395 B2 | 3/2009 | Ashdown et al. |
| 7,507,001 B2 | 3/2009 | Kit |
| 7,511,436 B2 | 3/2009 | Xu |
| 7,511,437 B2 | 3/2009 | Lys et al. |
| 7,515,128 B2 | 4/2009 | Dowling |
| 7,520,634 B2 | 4/2009 | Ducharme et al. |
| 7,521,872 B2 | 4/2009 | Bruning |
| 7,525,254 B2 | 4/2009 | Lys et al. |
| 7,538,499 B2 | 5/2009 | Ashdown |
| 7,542,257 B2 | 6/2009 | McCormick et al. |
| 7,550,931 B2 | 6/2009 | Lys et al. |
| 7,550,935 B2 | 6/2009 | Lys et al. |
| 7,557,521 B2 | 7/2009 | Lys |
| 7,569,807 B2 | 8/2009 | Matheson |
| 7,572,028 B2 | 8/2009 | Mueller et al. |
| 7,573,209 B2 | 8/2009 | Ashdown et al. |

| | | |
|---|---|---|
| 7,573,210 B2 | 8/2009 | Ashdown et al. |
| 7,573,729 B2 | 8/2009 | Elferich et al. |
| 7,598,681 B2 | 10/2009 | Lys et al. |
| 7,598,684 B2 | 10/2009 | Lys et al. |
| 7,598,686 B2 * | 10/2009 | Lys et al. ............... 315/312 |
| 7,619,370 B2 | 11/2009 | Chemel et al. |
| 7,652,236 B2 | 1/2010 | Cortenraad et al. |
| 7,654,703 B2 | 2/2010 | Kan et al. |
| 7,656,366 B2 | 2/2010 | Ashdown |
| 7,658,506 B2 | 2/2010 | Dowling |
| 7,659,673 B2 | 2/2010 | Lys |
| 7,659,674 B2 | 2/2010 | Mueller et al. |
| 7,665,883 B2 | 2/2010 | Matheson |
| 7,667,409 B2 | 2/2010 | Geerts et al. |
| 7,675,238 B2 | 3/2010 | Cortenraad et al. |
| 7,687,753 B2 | 3/2010 | Ashdown |
| 7,688,002 B2 | 3/2010 | Ashdown et al. |
| 7,689,130 B2 | 3/2010 | Ashdown |
| 7,703,951 B2 | 4/2010 | Piepgras et al. |
| 7,710,369 B2 | 5/2010 | Dowling |
| 7,712,926 B2 | 5/2010 | Matheson |
| 7,714,265 B2 * | 5/2010 | Fadell et al. ............ 250/214 AL |
| 7,714,521 B2 | 5/2010 | Qian |
| 7,731,387 B2 | 6/2010 | Cortenraad et al. |
| 7,731,389 B2 | 6/2010 | Draganov et al. |
| 7,731,390 B2 | 6/2010 | Van Gorkom et al. |
| 7,737,643 B2 | 6/2010 | Lys |
| 7,738,002 B2 | 6/2010 | Ashdown et al. |
| 7,740,375 B2 | 6/2010 | Zou et al. |
| 7,766,489 B2 | 8/2010 | Duine et al. |
| 7,766,518 B2 | 8/2010 | Piepgras et al. |
| 7,772,787 B2 | 8/2010 | Ashdown et al. |
| 7,777,427 B2 | 8/2010 | Stalker, III |
| 7,781,979 B2 | 8/2010 | Lys |
| 7,802,902 B2 | 9/2010 | Moss et al. |
| 7,806,558 B2 | 10/2010 | Williamson |
| 7,808,191 B2 | 10/2010 | Wu |
| 7,809,448 B2 | 10/2010 | Lys et al. |
| 7,810,974 B2 | 10/2010 | Van Rijswick et al. |
| 7,845,823 B2 | 12/2010 | Mueller et al. |
| 7,850,347 B2 | 12/2010 | Speier et al. |
| 7,854,539 B2 | 12/2010 | Van Duijneveldt |
| 7,868,562 B2 | 1/2011 | Salsbury et al. |
| 7,878,683 B2 | 2/2011 | Logan et al. |
| 7,878,688 B2 | 2/2011 | Paulussen et al. |
| 7,893,631 B2 | 2/2011 | Speier |
| 7,893,661 B2 | 2/2011 | Ackermann et al. |
| 7,894,050 B2 | 2/2011 | Ashdown et al. |
| 7,906,917 B2 | 3/2011 | Tripathi et al. |
| 7,911,151 B2 | 3/2011 | Xu |
| 7,914,173 B2 | 3/2011 | Paulussen et al. |
| 2002/0074559 A1 | 6/2002 | Dowling et al. |
| 2003/0132721 A1 | 7/2003 | Jacobs et al. |
| 2003/0133292 A1 | 7/2003 | Mueller et al. |
| 2004/0052076 A1 | 3/2004 | Mueller et al. |
| 2005/0236998 A1 | 10/2005 | Mueller et al. |
| 2005/0275626 A1 | 12/2005 | Mueller et al. |
| 2006/0002110 A1 | 1/2006 | Dowling et al. |
| 2006/0076908 A1 | 4/2006 | Morgan et al. |
| 2006/0114201 A1 | 6/2006 | Chang |
| 2006/0152172 A9 | 7/2006 | Mueller et al. |
| 2006/0221606 A1 | 10/2006 | Dowling |
| 2006/0262521 A1 | 11/2006 | Piepgras et al. |
| 2006/0274526 A1 | 12/2006 | Weston et al. |
| 2006/0290624 A1 | 12/2006 | Ashdown |
| 2007/0029946 A1 | 2/2007 | Yu et al. |
| 2007/0057639 A1 * | 3/2007 | Sun et al. ............... 315/209 R |
| 2007/0063658 A1 | 3/2007 | Van Der Veeken |
| 2007/0086912 A1 | 4/2007 | Dowling et al. |
| 2007/0153514 A1 | 7/2007 | Dowling et al. |
| 2007/0230159 A1 | 10/2007 | Cortenraad et al. |
| 2007/0273290 A1 | 11/2007 | Ashdown et al. |
| 2008/0122386 A1 | 5/2008 | De Brouwer et al. |
| 2008/0140231 A1 | 6/2008 | Blackwell et al. |
| 2008/0265797 A1 | 10/2008 | Van Doorn |
| 2008/0278092 A1 | 11/2008 | Lys et al. |
| 2008/0290251 A1 | 11/2008 | Deurenberg et al. |
| 2008/0297066 A1 | 12/2008 | Meijer et al. |
| 2008/0298330 A1 | 12/2008 | Leitch |
| 2008/0315798 A1 | 12/2008 | Diederiks et al. |
| 2009/0002981 A1 | 1/2009 | Knibbe |
| 2009/0021175 A1 | 1/2009 | Wendt et al. |
| 2009/0072761 A1 | 3/2009 | Wessels |
| 2009/0079358 A1 | 3/2009 | Shteynberg et al. |
| 2009/0134817 A1 | 5/2009 | Jurngwirth et al. |
| 2009/0168415 A1 | 7/2009 | Franciscus Deurenberg et al. |
| 2009/0184662 A1 * | 7/2009 | Given et al. ............... 315/294 |
| 2009/0243507 A1 | 10/2009 | Lucero-Vera et al. |
| 2010/0079085 A1 | 4/2010 | Wendt et al. |
| 2010/0102732 A1 | 4/2010 | Peeters et al. |
| 2010/0117543 A1 | 5/2010 | Van Der Veen et al. |
| 2010/0117656 A1 | 5/2010 | Snelten |
| 2010/0118531 A1 | 5/2010 | Montagne |
| 2010/0127633 A1 | 5/2010 | Geerts et al. |
| 2010/0134041 A1 | 6/2010 | Radermacher et al. |
| 2010/0134042 A1 | 6/2010 | Willaert |
| 2010/0148689 A1 | 6/2010 | Morgan et al. |
| 2010/0165618 A1 | 7/2010 | Vissenberg et al. |
| 2010/0171771 A1 | 7/2010 | Otte et al. |
| 2010/0181936 A1 | 7/2010 | Radermacher et al. |
| 2010/0188007 A1 | 7/2010 | Deppe et al. |
| 2010/0194293 A1 | 8/2010 | Deurenberg et al. |
| 2010/0207879 A1 * | 8/2010 | Fadell et al. ............... 345/156 |
| 2010/0231133 A1 | 9/2010 | Lys |
| 2010/0244707 A1 | 9/2010 | Gaines et al. |
| 2010/0244734 A1 | 9/2010 | Van Harpen et al. |
| 2010/0264834 A1 | 10/2010 | Gaines et al. |
| 2010/0271843 A1 | 10/2010 | Holten et al. |
| 2010/0301780 A1 | 12/2010 | Vinkenvleugel |
| 2011/0025205 A1 | 2/2011 | Van Rijswick et al. |
| 2011/0025230 A1 | 2/2011 | Schulz et al. |
| 2011/0035404 A1 | 2/2011 | Morgan et al. |
| 2011/0090684 A1 | 4/2011 | Logan et al. |

OTHER PUBLICATIONS

Locher, R., Introduction to Power MOSFETs and Their Applications, Fairchild Semiconductor, 1998.

Perrin, R., Inexpensive Relays Form Digital Potentiometer, EDN Design Ideas, 1998.

Petersen, A., Harness Solar Power with Smart Power-Conversion Techniques, Maxim Integrated Products, Feb. 1999.

Understanding Boost Power Stages in Switchmode Power Supplies, Application Report, Texas Instruments, 1999.

Understanding Buck Power Stages in Switchmode Power Supplies, Application Report, Texas Instruments, 1999.

Shanmugam, S., Design of a Linear Fresnel Lens System for Solar Photovoltaic Electrical Power Source, Center for Robotics Research, 2001.

Zetex, High-Side Current Monitor, Issue 3, Apr. 2001.

Fosler, R., Digitally Addressable DALI Dimming Ballast, Microchip Technology Inc., 2002.

Fosler, R., The RS-232/Dali Bridge Interface, Microchip Technology Inc., 2002.

UPB, Universal Powerline Bus Communication Technology Overview, 2002.

By Staff, DALI Delivers Control and Cost Savings, Headaches Too, Counsulting-Specifying Engineer, Jun. 2002.

Wojslaw, C., DPP adds versatility to VFC, Design Ideas, Nov. 14, 2002.

Curtis, K., High Power IR LED Driver Using the PIC16C781/782, Microchip Technology, Inc., 2002.

Dietz et al., Very Low-Cost Sensing and Communication Using Bidirectional LEDs, Mitsubishi Electric Research Laboratories, 2003.

Miller, R., Digital addressable lighting interface protocol fosters systems interoperablility for lower costs and greater design flexibility, RNM Engineering, Inc., Apr. 2003.

Dunn, J., Matching MOSFET Drivers to MOSFETs , Microchip Technology Inc., 2004.

Fosler, R., Use a Microcontroller to Design a Boost Converter, EDN Magazine, Mar. 2004.

Distler, T., LED Effects Stream™ v2.0 Protocol, Revision C, Jun. 2005.

Bowling, S., Buck-Boost LED Driver Using the PIC16F785 MCU, Microchip Technology Inc., 2006.

Di Jasio, L., A Technique to Increase the Frequency Resolution of PICmicro® MCU PWM Modules, Microchip Technology Inc., 2006.
Davmark Ltd., Dali-Protocol, 2007.
Walma, K., DALI: Forerunner of Today's Breakthrough Lighting Technology, Feb. 2007.
Atmel, ATAVRFBKIT/EVLB001 Dimmable Fluorescent Ballast User Guide, Oct. 2007.
Davidovic, et al., Lead-Acid Battery Charger Becomes a Subfunction in a Microcontroller, The Authority on Emerging Technologies for Design Solutions, Mar. 2007.
Klepin, K., Temperature Compensation for High Brightness LEDs using EZ-Color™ and PSoC Express, Cypress Perform, Aug. 2007.
Kremin et al., Multichannel LED Dimmer with CapSense Control-AN13943, Cypress Perform, Jul. 2007.
Kropf, B., Firmware-RGB Color Mixing Firmware for EZ-Color™—AN16035, Cypress Perform, Jun. 2007.
O'Loughlin, M., 350-W, Two-Phase Interleaved PFC Pre-regulator Design Review, Texas Instruments, Application Report, Mar. 2007.
O'Loughlin, M., PFC Pre-Regulator Frequency Dithering Circuit, Texas Instruments, 2007.
Richardson, C., LM3404 Driving a Seoul Semi Zpower P4 1A LED-RD-134, National Semiconductor, Apr. 2007.
UPB, UPB Technology Description, Version 1.4, 2007.
Zarr, R., Driving High-Power LEDs, Machine Design, Oct. 2007.
Zensys® ASCII Interface, VIZIA , 2007.
Z-Wave Protocol Overview, Software Design Specification, 2007.
CybroTech, Managing Lights with Dali, TN-012, rev 2, Cybrotech Ltd., 2007.
Prendergast, P., How to Design a Three-Channel LED Driver, Cypress Perform, Jan. 2008.
Richardson, C., Matching Driver to LED, National Semiconductor, Jan. 2008.
Takahashi, A., Methods and Features of LED Drivers, National Semiconductor, Mar. 2008.
Renesas, R8C/25 Demonstration Example for DALI Lighting Protocol Stack, REU05B0077-0100/Rev. 1.00, Jul. 2008.
Soundlight, Operating Manual, DALI and DMX Dekoder 7064A-H Mk1, Jul. 2008.
Conductivity with the BS2/OWL2, EME Systems, Oct. 2008.
Cypress Perform, Implementing an Integrated DMX512 Receiver, Item ID: 39762, Dec. 2009.
Cypress Semiconductor Corporation, PowerPSoC® Intelligent LED Driver, Document No. 001-46319, Rev. *G, 2009.
Ghulyani, L., Simple MPPT-Based Lead Acid Charger Using bq2031, Texas Instruments, 2009.
Dali-AG website, Dali at work.
Seattle Robotics Society, Ross, Kevin, Implementing Infrared Object Detection.
Van Dorsten, A., A Low Cost Step-up Converter by IC 555, Circuit Electronic.
EDN High Side Current Sensing for String of White LEDs.
International Rectifier, Application Note AN-944, Use Gate Charge to Design the Gate Drive Circuit for Power MOSFETs and IGBTs.
Google-dali query group.
Control Freak Addict, Data Sheet.
Wikipedia, Digital Addressable Lighting Interface (Dali).
Vizia, Z-Wave.
Office Action for U.S. Appl. No. 12/363,349 dated Sep. 14, 2011.
Notice of Allowance for U.S. Appl. No. 12/363,349 dated Feb. 1, 2012.
Notice of Allowance for U.S. Appl. No. 12/209,551 dated Dec. 27, 2011.
Final Office Action for U.S. Appl. No. 12/209,551 dated Jan. 12, 2011.
Non-Final Office Action for U.S. Appl. No. 12/209,551 dated Aug. 5, 2010.
Office Action for U.S. Appl. No. 12/565,492 dated Oct. 5, 2011.

* cited by examiner

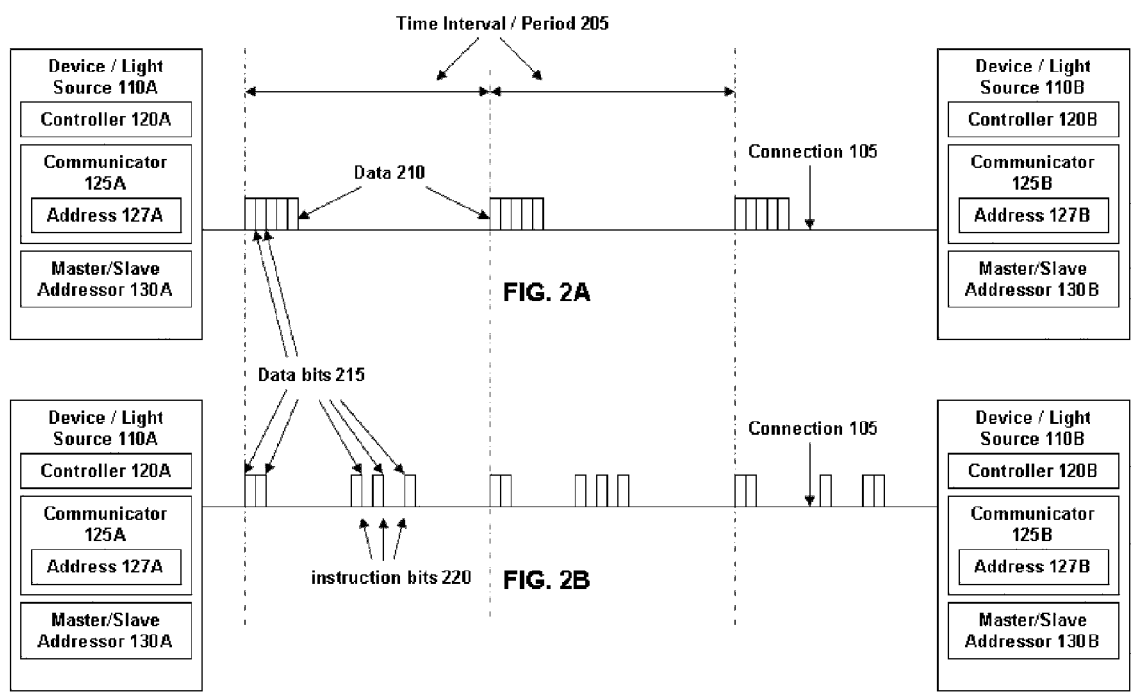

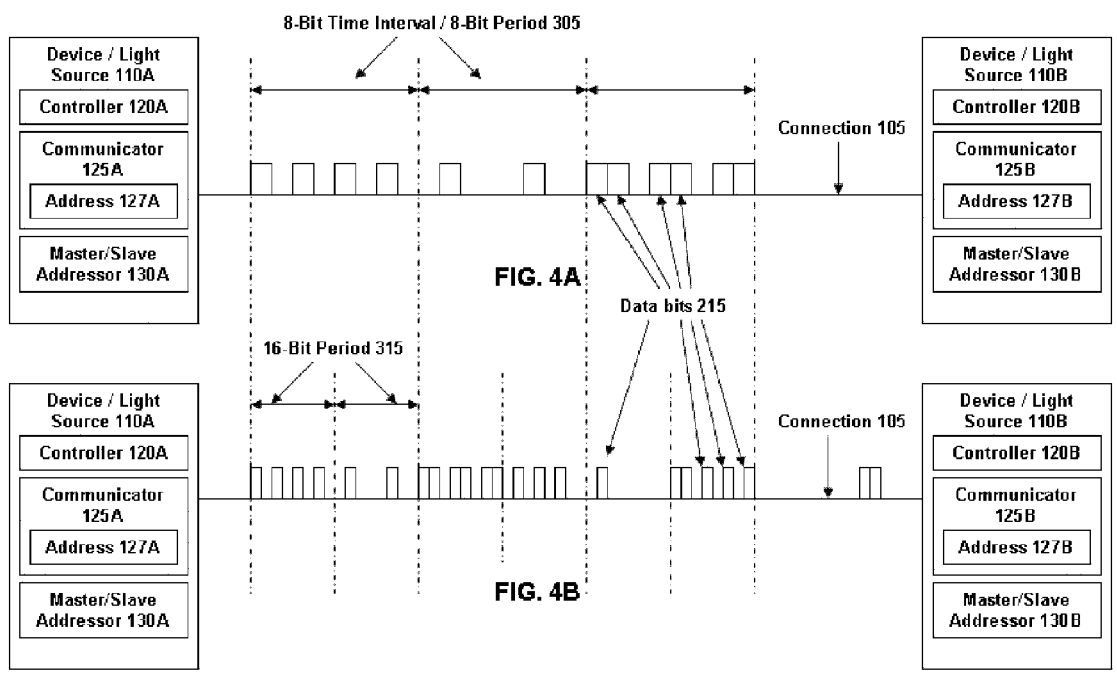

NON-CONTACT SELECTION AND CONTROL OF LIGHTING DEVICES

RELATED APPLICATIONS

The present application claims priority to U.S. Provisional Application No. 61/053,792 filed on May 16, 2008, which is incorporated herein in its entirety by reference.

FIELD OF THE INVENTION

The present application is generally related to lighting systems. In particular, the present application is directed to systems and methods for non contact selection and control of one or more lighting devices of a network of lighting devices.

BACKGROUND

Lighting systems may include various components for control and selection of the lighting devices. Some lighting systems traditionally include light sources that have only limited control and functionality. Such lighting systems are often controlled only by on and off switches that involve human contact. A traditional lighting systems generally includes a number of lighting sources connected to such a switch for the lone purpose of turning the device on or off. Aside from this functionality, the switches commonly do not serve any further purpose. Some intelligent lighting systems may offer different types of control or options but such systems are often more expensive due to their complexity in design and increased number of components.

SUMMARY

The present disclosure presents a relatively inexpensive yet intelligent solution for selecting or controlling one or more lighting devices via one or more non-contact switches. A non-contact switch may detect a command or a presence of an object or a user without the user or the object physically touching the non-contact switch. For example, the user may place a hand or an object near or in the vicinity of the non-contact switch. The non-contact switch may use a reflected portion of a light emitted from the non-contact switch to detect the presence of the user. Following the detection, the non-contact switch may send any type of instruction or command to the lighting devices. The non-contact switch may be used for detecting presence of the object or the user within any range and for various purposes, such as for example light source selection, control, programming, configuration, address or status assignment, zone or group creation and more. In addition, the non-contact switch may further be used for transmitting and receiving communication between different non-contact switches of different zones of the lighting devices of even different lighting systems.

In some aspects, the present disclosure relates to a method for detecting presence of an object or a user. A light emitting device (LED) of an apparatus, unit or a device may emit an electromagnetic signal, such as an infrared light signal or a radio wave. The electromagnetic signal may comprise high components and low components. The high components may be portions of the signal having a higher voltage, power, current, energy or value than the voltage, power, current, energy or values of the low component portions of the signal. The detector of the apparatus or device may determine that an average intensity of a received portion of the electromagnetic signal is below a predetermined threshold. The average intensity may be a total intensity detected over a period of time. The average intensity may be determined responsive to a ratio of high components duration over a period of time to low components duration over the period of time. In some embodiments, the average intensity is responsive to a ratio of a duration of high components to a duration of low components within or over a period of time. In further embodiments, the average intensity is responsive to a duration of a high components and a duration of low components within a period of time. An object located in proximity of the detection apparatus may reflect a portion of the electromagnetic signal. The detector may detect presence of the object by determining that a sum of average intensities of the received portion of the electromagnetic signal and the reflected portion of the electromagnetic signal exceeds the predetermined threshold. The sum of average intensities may be determined responsive to the ratio. In some embodiments, the sum of average intensities is responsive to a ratio of a duration of high components to a duration of low components within or over the period of time. In further embodiments, the sum of average intensities is responsive to a duration of a high components and a duration of low components within a period of time.

In some embodiments, the received portion of the electromagnetic signal comprises a portion of the electromagnetic signal that is reflected by a glass of the apparatus. In further embodiments, adjusting the ratio to detect the object at a second proximity, the second proximity comprising a different length of detection range of the object from the apparatus than the proximity. In some embodiments, the object is a part of a body of a person. In some embodiments, a gain circuit adjusts gain of a detector detecting a sum of the detected or received portion of the signal and the reflected portion detected by the detector. The gain may be adjusted to be within a predetermined gain range. A frequency filter of the apparatus may filter the frequency of the sum. The frequency filter may eliminate frequencies of the sum that are outside of a predetermined frequency range. In some embodiments, the frequencies eliminated may be the frequencies of the pulses of the signal. Each of the pulses of the signal may further comprise any number of the high components and the low components. In some embodiments, the pulses of the signal are emitted at a carrier frequency of the signal or they form the carrier frequency of the signal. The detector may detect presence of the object in response to determining, by a comparator of the apparatus, that average intensity of the sum adjusted by the gain circuit and filtered by the frequency filter exceeds the predetermined threshold.

In some aspects, the present disclosure relates to a method for detecting presence of an object via a presence detection device. A first light emitting device (LED) of an apparatus may emit a first signal comprising high components and low components. A user, gain circuit or any component of the apparatus may adjust a ratio of time duration of the high components in relation to time duration of the low components. The adjustment may be implemented automatically via the gain circuit. In some embodiments, adjustment is set by a manufacturer or by a user configuration. A glass of the apparatus may reflect a portion of a second signal. The second signal may be emitted from a second LED of the non-contact switch. An object located in proximity of the apparatus may reflect a portion of the first signal. In some embodiments, the object located outside of the apparatus reflects the portion of the first signal that was emitted from the LED of the apparatus back into the detector of the apparatus through the glass. A detector of the apparatus may detect presence of the object by determining that an average intensity of a sum of the reflected portions of the first signal and the second signal exceeds a detection threshold of the detector, the average intensity of the sum exceeding the detection threshold based on the ratio.

In some embodiments, the reflected portion of the first signal propagates through the glass that reflects the second portion of the second signal. In further embodiments, the detector determines that the reflected portion of the second signal does not exceed the detection threshold. In still further embodiments, the detector detects presence of the object by determining that the sum exceeds the detection threshold. In some embodiments, a gain circuit of the apparatus adjusts gain of the sum. The gain of the sum may be adjusted to be within a predetermined gain range. In some embodiments, the adjusting the gain of the sum comprises adjusting the gain of the detector as the detector detects the sum, or the intensity of the sum of the reflected portions of the first signal and a reflected portion of the second signal or the second signal. A frequency filter of the apparatus may filter the frequency of the sum, the frequency filter eliminating frequencies outside of a predetermined frequency range. A comparator of the apparatus may determine that the sum adjusted by the gain circuit and filtered by the frequency filter exceeds the detection threshold. In some embodiments, the gain circuit adjusts the gain to maintain the reflected portion of the second signal received by the detector below detection threshold. In further embodiments, the frequency filter filters out signals with carrier frequencies below 35 kilohertz and above 45 kilohertz.

In some aspects, the present disclosure relates to a system for detecting presence of an object. A light emitting device (LED) of an apparatus may emit an electromagnetic signal comprising high components and low components. A detector of the apparatus may determine that an average intensity of a received portion of the electromagnetic signal is below a predetermined threshold. The average intensity may be determined responsive to a ratio of high components duration over a period of time to low components duration over the period of time. An object may be positioned or located in proximity of the apparatus reflects a portion of the electromagnetic signal. The detector may detect presence of the object by determining that a sum of average intensities of the received portion of the electromagnetic signal and the reflected portion of the electromagnetic signal exceeds the predetermined threshold. The sum of average intensities may be determined responsive to the ratio.

In some embodiments, the received portion of the electromagnetic signal comprises a portion of the electromagnetic signal that is reflected by a glass of the apparatus. In further embodiments a user, a gain circuit, the LED, the detector or any other component of the apparatus adjusts a ratio. The adjusted ratio may enable detection of the object at a second proximity. The second proximity may comprise a different length of detection range of the object from the apparatus than the proximity. In some embodiments, the object is a part of a body of a person. In some embodiments, an intensity filter of the apparatus adjusts gain of a sum of the received portion and the reflected portion detected by the detector, the gain adjusted to be within a predetermined gain range. In some embodiments, a frequency filter of the apparatus filters the frequency of the sum, the frequency filter eliminating frequencies of the sum that are outside of a predetermined frequency range. In further embodiments, the detector detects presence of the object in response to determining, by a comparator of the apparatus, that the average intensity of the sum exceeds the predetermined threshold.

In some aspects, the present disclosure relates to a system for detecting presence of an object. A first light emitting device (LED) of an apparatus may emit a first signal comprising high components and low components. A ratio adjuster may adjust a ratio of time duration of the high components in relation to time duration of the low components. A glass of the apparatus may reflect a portion of a second signal, the second signal emitted from a second LED of the non-contact switch. An object located in proximity of the apparatus may reflecting a portion of the first signal. A detector of the apparatus may detect a presence of the object by determining that an average intensity of a sum of the reflected portions of the first signal and the second signal exceeds a detection threshold of the detector. The average intensity of the sum may exceed the detection threshold based on the ratio.

In some embodiments, the reflected portion of the first signal propagates through the glass that reflects the second portion of the second signal. In further embodiments, the detector determines that the reflected portion of the second signal does not exceed the detection threshold and detects presence of the object by determining that the sum exceeds the detection threshold. In still further embodiments, a gain circuit of the apparatus adjusts gain of the sum, the gain of the sum adjusted to be within a predetermined gain range. In some embodiments, the gain circuit adjusts a gain of the sum detected by the detector. A frequency filter of the apparatus may filter the frequency of the sum. The frequency filter may eliminate frequencies outside of a predetermined frequency range. A comparator of the apparatus may determine that the sum adjusted by gain circuit and frequency filtered by the frequency filter exceeds the detection threshold. The gain circuit may adjust the gain to maintain the reflected portion of the second signal received by the detector below detection threshold and wherein the frequency filter filters out frequencies below 35 kilohertz and above 45 kilohertz.

BRIEF DESCRIPTION OF THE DRAWINGS

The foregoing and other objects, aspects, features, and advantages of the present invention will become more apparent and better understood by referring to the following description taken in conjunction with the accompanying drawings, in which:

FIG. 2A and FIG. 2B are block diagrams of embodiments of digital communication between light sources, intensity control and master/slave control;

FIG. 4A and FIG. 4B are block diagrams of embodiments of additional light intensity control embodiments;

The features and advantages of the present invention will become more apparent from the detailed description set forth below when taken in conjunction with the drawings, in which like reference characters identify corresponding elements throughout.

DETAILED DESCRIPTION

For purposes of reading the description of the various embodiments of the present invention below, the following descriptions of the sections of the specification and their respective contents may be helpful:

Section A describes lighting system environment and components of the lighting system;

Section B relates to systems and methods for communication among lighting system components;

Section C relates to embodiments for status assignment of the light sources;

Section D relates to embodiments for lighting system intensity control with digital patterning;

Section E relates to embodiments for non-contact selection and control of lighting system components; and Section F relates to systems and methods for status assignment of the light sources.

A. Lighting System and Lighting System Components

Figure 1A:
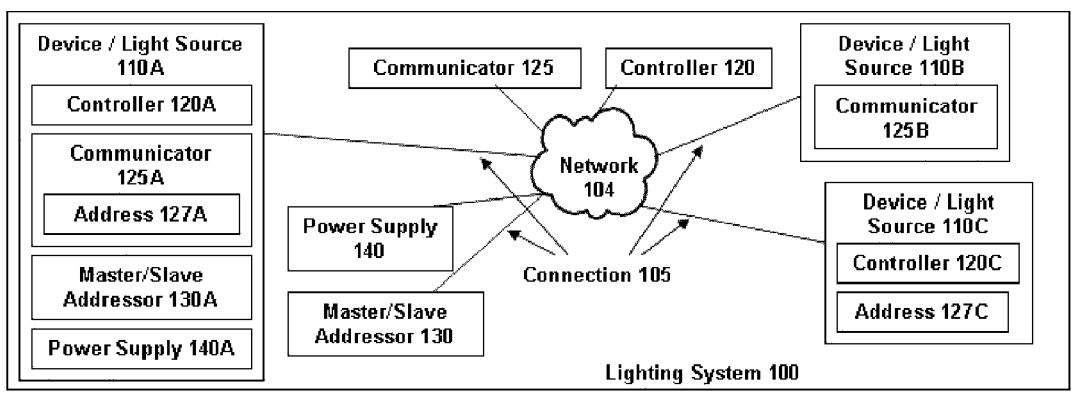
FIG. 1A is a block diagram that depicts an embodiment of an environment of a lighting system and components of the lighting system.

Lighting system 100 comprises a number of lighting system components which may be used for a variety of lighting or illumination applications in numerous environments. FIG. 1A illustrates a block diagram of an environment within which lighting system 100 may be used. FIG. 1A illustrates a lighting system 100 comprising lighting system components called lighting devices, or light sources 110A, 110B and 110C. The lighting system 100 also includes additional lighting system components: a communicator 125, a controller 120, a master/slave addressor 130 and a power supply 140. All the lighting system components illustrated by FIG. 1A are connected to each other via connections 105. Connections 105 are depicted running into or running through a network 104. In many embodiments, network 104 comprises a plurality of connections 105 through which signals, information or data packets, or electrical power are propagated. In a plurality of embodiments, network 104 and connections 105 provide connections between any of the lighting system components.

FIG. 1A depicts light sources 110 comprising various components. FIG. 1A presents a light source 110A comprising: a controller 120A, a communicator 125A which further comprises an address 127A, a master/slave addressor 130A, and a power supply 140A. FIG. 1A also illustrates a light source 110B which includes only a communicator 125B. Light source 110C is shown by FIG. 1A comprising a controller 120C and an address 127C. Other lighting system components, such as a communicator 125, controller 120, power supply 140 and master/slave addressor 130 are illustrated in FIG. 1A as individual and independent lighting system components not comprising any additional subcomponents.

In some embodiments, however, any of the communicator 125, controller 120, power supply 140 and master/slave addressor 130 may comprise any number of lighting system components or subcomponents. Herein, the term lighting system component, may be used interchangeably for any component or subcomponent within a lighting system 100 or for any component related to a lighting system 100. Furthermore, terms lighting device, device, light source, lighting fixture or a lighting unit may also be used interchangeably and may comprise any number of similar or other lighting system 100 components.

Lighting system 100, illustrated in FIG. 1A, may be any system including one or more lighting devices 100, also referred to as light sources 110. Sometimes, lighting system 100 is a system comprising one or more light sources or light fixtures controlled by one or more lighting system components. In a plurality of embodiments, a lighting system 100 includes a number of light sources 110 connected to each other. In a number of embodiments, a lighting system 100 includes a number of light sources 110 connected to a power supply 140 or a source of electricity, such as an electrical outlet. In many embodiments, lighting system 100 is a system comprising a plurality of light sources 110 or other lighting system components connected to each other and communicating with each other. In a number of embodiments, lighting system 100 comprises a plurality of lighting system components electrically connected to each other in parallel. In some embodiments, lighting system 100 comprises a plurality of lighting system components electrically connected to each other in series. In a plurality of embodiments, lighting system 100 comprises components, such as light sources 110 or power supplies 140 connected to each other in parallel or in series or in a combination of parallel and series electrical connections. Sometimes, lighting system 100 includes any number of systems, products, components or devices assisting any functionality, operation or control of light sources 110. In a number of embodiments, lighting system 100 includes one or more components, systems, products or devices assisting or controlling communication between a light source 110 and another light source 110 or another component, device, system or product. In a plurality of embodiments, lighting system 100 is any system comprising a plurality of light sources 110, such as light fixtures for example, illuminating or lighting an area or a space. In many embodiments, lighting system 100 is any system comprising a plurality of light sources 110, providing illumination or lighting an area or a space as controlled by one or more lighting system components.

In some embodiments, lighting system 100 comprises one or more lighting devices, or light sources 110. In numerous embodiments, lighting system 100 comprises one or more light sources 110 comprising a power supply 140. In a number of embodiments, lighting system 100 comprises a master/slave addressor 130, a controller 120, a power supply 140 and a communicator 125 as separate and independent components of the lighting system 100. In a plurality of embodiments, lighting system components are electrically connected to one or more light sources 110 via connections, cables, wires, lines or any electrically conductive mediums. In some embodiments, lighting system components are electrically connected to one or more light sources 110 via network 104. In a number of embodiments, lighting system 100 comprises any number of lighting system components connected to each other or other lighting system components either directly via connections 105, via combinations of connections 105 and network 104 or via one or more networks 104.

In one embodiment, the lighting system 100 is installed, deployed or otherwise provided in any type or form of indoor, outdoor, residential or commercial environment. In one embodiment, lighting system 100 is deployed, installed or provided in any type of indoor environment. In some embodiments, lighting system 100 is deployed, installed or provided in a residential building or a room. In a number of embodiments, lighting system 100 is deployed, installed or provided in a commercial building or an office area. In many embodiments, lighting system 100 is deployed, installed or provided in a store or a mall. In a plurality of embodiments, lighting system 100 is deployed, installed or provided in a hallway, or a parking garage. In numerous embodiments, lighting system 100 is deployed, installed or provided in a restaurant or a museum. In some embodiments, the lighting system 100 is installed in a laboratory or a research or development laboratory, area or an institution. In some embodiments, lighting system 100 is deployed in an outside environment, such as a stadium, or a concert stage. In a plurality of embodiments, lighting system 100 is deployed, installed or provided in a town square, residential area, or section of a town or city.

In many embodiments, lighting system 100 comprises one or more light sources 110 which are different from other light sources 110 of the lighting system 100. In a number of embodiments, lighting system 100 comprises one or more light sources 110 which are same or similar to other light sources 110 of the lighting system 100. In some embodiments, lighting system 100 includes only one or two light sources 110 while in other embodiments, lighting system 100 includes a very large number of light sources 110, such as tens or hundreds. In a plurality of embodiments, a plurality of lighting systems 100 are electrically connected to each other and form one larger lighting system 100 or a lighting system farm. In some embodiments, lighting system 100 includes a plurality of separate lighting systems 100 or lighting system farms.

Connections 105 are represented in FIG. 1A by lines connecting components of lighting system 100 to other lighting system 100 components via network 104. Connections 105 may comprise any type of medium or means for transferring, transporting or propagating electrical power, electronic analog or digital signals, or any other type of communication signal between any two components or devices of the lighting system 100. In some embodiments, connection 105 is a wire or a plurality of wires of any size or gauge capable of conducting electricity or an electronic signal. In a plurality of embodiments, connection 105 is a cable including one or more electrical conductors electrically insulated from each other and other conductors. In many embodiments, connection 105 comprises a plurality of separate and mutually insulated conductive mediums, each one transmitting a separate signal or information. In some embodiments, connection 105 is a cable including a plurality of wires insulated with any non-conductive material, the wires being used for electrical power distribution in residential or commercial areas. In certain embodiments, connection 105 includes a cable or a group of wires of any size and gauge comprising any electrical current conducting material. In some embodiments, connection 105 comprises an optical fiber transmitting an optical signal. In a number of embodiments, connection 105 is a coaxial cable. In a plurality of embodiments, connection 105 is a wire harness comprising any number of sheathed or unsheathed wires, each wire transmitting a separate signal without interference from an outside wire. In a plurality of embodiments, connection 105 is a wire harness comprising a plurality of mediums for transmitting electrical signals and optical signals. In some embodiments, connection 105 is a wire harness comprising three separate mediums for transmitting electrical signals or conducting electricity. In a number of embodiments, connection 105 comprises a plurality of current conducting mediums wherein each of the mediums is sheathed or electrically insulated from other conducting mediums of the connection 105.

Connection 105, in some embodiments, is a wireless connection between two or more lighting system 100 components. In many embodiments, connection 105 comprises a medium for wireless communication between two or more lighting system 100 components. In some embodiments, the connection 105 is a wireless communication link between two or more lighting system 100 components. In many embodiments, the connection 105 is a medium through which wireless communication of two or more lighting system 100 components is propagated. The connection 105 may comprise any number of wireless communication links and wired communication links. In a plurality of embodiments, connection 105 comprises a number of connection 105 components each of which may further comprise any number of wireless communication links for communication between two or more lighting system 100 components. The wireless communication link or the wireless communication propagated via connection 105 may refer to any transfer of information between any two or more lighting system 100 components without the use of electrical conductors or wires. In some embodiments, connection 105 comprises any one, or any combination of: a metal wire, a metal line, a cable having one or more wires or lines, a light guide, an optical fiber and a wireless link or wireless connection system. In some of embodiments, connection 105 comprises a plurality of connection 105 components comprising metal lines or wires, wireless links, optical fibers or cables.

Network 104 may be any medium or means for transferring electrical power, electronic data, electromagnetic waves, electrical signals, or communication signals between two or more lighting system 100 components. In some embodiments, network 104 is a mesh of connections 105 connecting any lighting system component with any other component of the lighting system 100. In a plurality of embodiments, network 104 comprises a number of connections 105 connecting light sources 110, with each other. In many embodiments, network 104 comprises a number of connections 105 connecting any lighting system 100 component to any other lighting system 100 component. Network 104, in some embodiments, is plurality of connections 105 connecting specific lighting system 100 components to other specific lighting system 100 components. In a plurality of embodiments, lighting system components are connected to other lighting system components via one or more connections 105. The network 104 may also be a wireless network and comprise any number of wireless communication links between any number of lighting system 100 components. In some embodiments, the network 104 comprises wireless links and non-wireless links, such as connections via wires. Network 104, in some embodiments, is a plurality of connections 105 connecting any of the lighting system 100 components to any other lighting system 100 components, such as a lighting device 110A to lighting devices 110B and 110C and vice versa.

A device 110, also referred to as a lighting device 110 or a light source 110, is any device performing or executing a function or an instruction, or any device operating, outputting or performing as instructed or commanded by an instruction or information received by the device via a connection 105. In many embodiments, device 110 is any device or an apparatus performing a functionality as directed by a signal. The device 110 may be any electrical, electromechanical or mechanical component, such as a motor for example. The device 110 may be an engine, a turbine, or may be any apparatus or a system comprising a motor or an engine. In some embodiments, device 110 is a device, apparatus or a material capable of producing, emitting or emanating light or electromagnetic radiation. In a plurality of embodiments, a device 110 is any device performing any functionality as instructed via a connection 105 or any device transmitting instruction to other devices 110, even if the device 110 or the devices 110 receiving or transmitting instructions are not light emitting devices. Devices 110 may be any electronic or electrical components, devices, products or apparatuses performing a function or an operation in response to an electrical or electronic signal.

In many embodiments, device 110 is a lighting device 110 or a lighting fixture, a light source, or any device producing or emitting light. In a plurality of embodiments, device 110 or a light source 110 is a fluorescent light. In a number of embodiments, light source 110 is a lamp or a light bulb. In many embodiments, light source is a white light emitting diode. In some embodiments, light source 110 is a semiconductor light emitting device, such as a light emitting diode of any spectral or wavelength range. In a plurality of embodiments, the light source 110 is a broadband lamp or a broadband light source. In number of embodiments, the light source 110 is a black light. In a plurality of embodiments, light source 110 is a hollow cathode lamp. In a number of embodiments, light source 110 is a fluorescent tube light source. In some embodiments, the light source 110 is a neon or argon lamp. In a plurality of embodiments, light source 110 is a plasma lamp. In certain embodiments, light source 110 is a xenon flash lamp. In a plurality of embodiments, light source 110 is a mercury lamp. In some embodiments, light source 110 is a metal halide lamp. In certain embodiments, light source 110 is a sulfur lamp. In a number of embodiments, light source 110 is a laser, or a laser diode. In some embodiments, light source 110 is an OLED, PHOLED, QDLED, or any other variation of a light source 110 utilizing an organic material. In certain embodiments, light source 110 is a monochromatic light source. In a number of embodiments, light source 110 is a polychromatic light source. In a plurality of embodiments, light source 110 is a light source emitting light partially in the spectral range of ultraviolet light. In some embodiments, light source 110 is a device, product or a material emitting light partially in the spectral range of visible light. In a number of embodiments, light source 110 is a device, product or a material partially emanating or emitting light in the spectral range of the infra red light. In a number of embodiments, light source 110 is a device, product or a material emanating or emitting light in the visible spectral range. In some embodiments, light source 110 includes a filter to control the spectral range of the light emitted from the light source 110. In certain embodiments, light source 110 includes a light guide, an optical fiber or a waveguide through which light is emitted from the light source 110. In some embodiments, light source 110 includes one or more mirrors for reflecting or redirecting of light. In some embodiments, lighting device 110 reflects light emitted from another light source. In some embodiments, light source 110 includes a light reactive material affecting the light emitted, such as a polarizer, filter or a prism. In a plurality of embodiments, light source 110 is a coherent light source. In some embodiments, light source 110, or a lighting device 110, is an incoherent light source.

The device 110, or the lighting device 110, may be any light emitting device, comprising one or more light sources and capable of providing light to an area or a space. In other embodiments, lighting device 110 is a semiconductor light emitting diode producing an incoherent light of any given spectral or power range. In another embodiment, lighting device 110 is an ultra-violet light emitting source used for illuminating a light reactive material. A light reactive material sometimes, in response to the illuminated light absorbs the light, and in response to the absorbed light, produces a light of its own. In some embodiments, lighting device 110 is an LED or a light source used for color rendering of the fruits, vegetables, meats or any light reactive materials. In a number of embodiments, lighting device 110 emits light which alters the color of the object illuminated by the light source 110 as perceived by the human eye. In some embodiments, lighting system 100 is used for illuminating an object whose appearance of color pigment is shifted as perceived by a human eye in response to the illumination of the object using a specific spectral range of light. For example, an object of a yellow pigment may appear orange to a human eye when illuminated by purple light. In another example, a blue pigment may appear black to a human eye when illuminated by orange light. In some embodiments, an object of a red pigment, when illuminated by a deep red light may be perceived by human eye as a even more red. In some embodiments, light source 110 emits a light having a specific spectral range tailored for illuminating a specific object and creating a perception to a human observer of an object having a different color pigment as the result of the illumination. In some embodiments, an array of light sources 110 are used to vary the wavelength and intensity of the light emitted. In a number of embodiments, light source 110 is a monochromatic light source, emitting only a single wavelength of light. In some embodiments, light source 110 is a tunable light source, emitting a light of varying spectral range. In a plurality of embodiments, light source 110 is a broadband light utilizing a filter for narrowing down the light spectral range. Light source 110, in some embodiments, is any device, product or material emitting, emanating or illuminating light of any spectral or power range, any constant output or varying intensity output, and any type of coherent or incoherent light.

In some other embodiment, light source 110 creates color of the light emitted from the light source 110 using a plurality of light sources emitting specific wavelengths of light which individually or mixed produce the color of the light emitted. In a number of embodiments, light source 110 includes one or more light sources emitting a monochromatic light. In many embodiments, light source 110 includes one or more light sources emitting a relatively monochromatic light, wherein relatively means about ninety percent monochromatic. In a plurality of embodiments, light source 110 includes one or more light sources emitting a light having a narrow spectral range which when mixed with other light produces white light or light of a color different from the original color. In a plurality of embodiments, monochromatic light is a light having only a single wavelength of light. Relatively monochromatic light is a light similar to a light emitted by a monochromatic laser or a laser diode and it may have a spectral wavelength range of one or a few nanometers. Narrow spectral range, in some embodiments, means a range of about five to fifty nanometers of wavelength range. In some embodiments, light source 110 emits one or more of any of the monochromatic, relatively monochromatic or a narrow spectral range light individually or in any combination. In a number of embodiments, light source 110 emits blue light, such as the light having wavelength length between 460 nanometers and 490 nanometers. Light emanated or emitted from the light source, in some embodiments, has shorter wavelengths or a higher energy than the visible light. In some embodiments, light emitted or emanated from a light source 110 has a spectral range at least partially in the ultraviolet range and at least partially in a visible range. In a plurality of embodiments, the light emitted or emanated from a light source 110 has a spectral range at least partially in the visible range and at least partially in the infrared range. In a number of embodiments, light emitted from a light source 110 is pulsed or varying in intensity, or continuous and/or without any interruption in emission. In some embodiments, light emitted from light source 110 is periodically or non-periodically pulsed. In some embodiments, a light source 110 comprises a plurality of light sources, each of which emits a light having a partially different wavelength from light emitted by other light sources of the light source 110. In a number of embodiments, light source 110 comprises a plurality of light sources each emitting a light of different color or a different wavelength or wavelength range. In a number of embodiments, light source 110 comprises a plurality of light sources, wherein each of the light sources emits a light having a different intensity or power range.

The device 110, also referred to as the light source 110, may also comprise a wireless device, such as a wireless signal receiver or a wireless signal transmitter. In some embodiments, light source 110 comprises an antenna for receiving or for transmitting wireless communication. In a plurality of embodiments, light source 110 comprises a wireless connector, a wireless receiver or a wireless signal emitter. In many embodiments, light source 110 comprises a device or a unit controlling and implementing wireless communication between two or more light sources 110. In some embodiments, the light source 110 may comprise a wireless link, such as an infrared channel or satellite band. In many embodiments, the light source 110 comprises a wireless RF network port, such as a network port supporting IEEE 802.11 wireless communication protocols or Bluetooth technology. In a plurality of embodiments, any lighting system 100 component may comprise any number of wireless communication devices, such as wireless network ports, wireless transmitters or receivers or wireless transceiver used for wireless communication between the lighting system 100 components.

In a number of embodiments, the light source 110 comprises a controller 120. In a plurality of embodiments, light source 110 comprises a communicator 125. In a number of embodiments, light source 110 comprises a master/slave addressor 130. In some embodiments, light source 110 comprises a power supply 140. In certain embodiments, light source 110 comprises any of, or any combination of: controller 120, communicator 125, master/slave addressor 130 and power supply 140. In a plurality of embodiments, light source 110 comprises an enclosure which encloses any of or any combination of: controller 120, communicator 125, master/slave addressor 130 and power supply 140. In a plurality of embodiments, light source 110 comprises a connection 105 which can be used to connect the light source 110 with any other light sources 110 or other lighting system components.

Still referring to FIG. 1A, controller 120 is any unit, system, device or component capable of controlling, modulating light emitted or emanated from any light source 110. In some embodiments, controller 120 includes software, hardware, or any combination of software and hardware for controlling, managing or otherwise directing the operation and/or performance of one or more light sources 110. Controller 120 may include any type and form of logic, electronic circuitry, logic operations or functions, software or hardware embodied in forming instructions or enabling control of one or more light sources 110. In some embodiments, controller 120 comprises any type and form of digital and/or analog circuitry, any device, system, unit or a program for performing any of the operations described herein. Controller 120 may include any type and form of executable instructions, including an application, a program, a library, a process, a service, a task or a thread. In one embodiment, controller 120 provides, includes or controls power output for one or more of light sources 110. Herein, terms light emanated from a light source, light produced from a light source or light emitted from a light source may be used interchangeably and may comprise the meaning of any of these terms.

In some embodiments, controller 120 is any unit used for controlling one or more light sources 110. Sometimes, controller 120 is any device, system, structure, circuit, piece or hardware or software used for controlling a light source 110 or any other lighting system component. In a plurality of embodiments, controller 120 comprises a combination of any device, system structure, circuit, piece of hardware or software, computer program, structure or algorithm used for controlling a light source 110 or any other lighting system component. In some embodiments, controller 120 includes logic, functions or operations to establish, determine, adapt, coordinate, manage or control any characteristics of light emitted from one or more light sources 110. In numerous embodiments, controller 120 includes logic, functions or operations to establish, determine, adapt, coordinate, manage or control any characteristics of any output of any lighting system component. In a plurality of embodiments, controller 120 controls a light source 110 which produces a light of a predetermined wavelength. In another embodiment, the controller 120 directs the light source to emit a light having a wavelength in a predetermined range. In some embodiments, the controller 120 directs the light source to emanate a light at a predetermined frequency or within a predetermined frequency range. In other embodiments, controller 120 adjusts one or more characteristics of the light to be emitted or emanated from the light source 110. In a plurality of embodiments, controller 120 establishes or adjusts the color and/or color temperature of the light to emanate from the light source. For example, the color may be established or adjusted based on a color rendering index or value thereof. In another example, the color temperate may be established or adjusted based on a temperature value, such as for example, Kelvin scale. In some embodiments, controller 120 comprises functionality for detecting, or detects a duty cycle of a signal.

In some embodiments, responsive to information from any one of a light source 110, communicator 125, master/slave addressor 130 or a power supply 140, controller 120 establishes or adjusts intensity of the light emitted from a light source 110. In a number of embodiments, responsive to information from any one of a light source 110, communicator 125, master/slave addressor 130 or a power supply 140, controller 120 establishes or adjusts spectral range of the light emitted from a light source 110. In many embodiments, responsive to information from any one of a light source 110, communicator 125, master/slave addressor 130 or a power supply 140, controller 120 establishes or adjusts wavelength of the light emitted from a light source 110. In numerous embodiments, responsive to information from any one of a light source 110, communicator 125, master/slave addressor 130 or a power supply 140, controller 120 establishes or adjusts frequency of pulses of the light emitted from a light source 110. In certain embodiments, responsive to information from any one of a light source 110, communicator 125, master/slave addressor 130 or a power supply 140, controller 120 establishes or adjusts brightness or luminance of the light emitted from a light source 110. In some embodiments, responsive to information from any one of a light source 110, communicator 125, master/slave addressor 130 or a power supply 140, controller 120 establishes or adjusts chromaticity of the light emitted from a light source 110. In many embodiments, any lighting system 100 component may comprise any number of other lighting system 100 components, such as, for example light source 110A illustrated in FIG. 1A. In a plurality of embodiments, lighting system 100 components comprising other lighting system 100 components are still controlled, modified, affected or adjusted by other lighting system 100 components not comprised by them. For example, light source 110A in FIG. 1A having a master/slave addressor 130A, in some embodiments, is affected, adjusted, modified or controlled by a master/slave addressor 130. Similarly, in some embodiments, light source 110A having a controller 120A is affected, adjusted, controlled or modified by a controller 120 not comprised by light source 110A.

In a number of embodiments, controller 120 comprises functionality for detecting or detects an instruction within a duty cycle of a signal. In a number of embodiments, controller 120 comprises functionality for detecting, or detects a time interval associated with a duty cycle. In a plurality of embodiments, controller 120 receives, decodes or processes a signal comprising a duty cycle of a time interval or within a time interval. In some embodiments, controller 120 receives, decodes or processes an instruction comprised within the duty cycle. In some embodiments, controller 120 receives, decodes or processes a duty cycle within a time interval wherein the duty cycle comprises a plurality of separated portions within the time interval. The controller 120 may detect or process the duty cycle within the time interval regardless if the duty cycle is a single active signal portion within the time interval or a plurality of separated active signal portions within the time interval.

In some embodiments, controller 120 receives an information from another lighting system 100 component and adjusts the output or the light emitted from the light source 110 in response to the communication or information received. In some embodiments, information received by a controller 120 or any other lighting system 100 component comprises any one, or any combination of: a command, a signal, an instruction, a digital or analog code, a pulse, a data bit, a data byte, data or any form of electronic or electrical signal. In a number of embodiments, controller 120A of light source 110A receives an information from light source 110B or light source 110C and changes, amends or adjusts the control of the light source 110A in response to the received information. In a plurality of embodiments, controller 120A of light source 110A receives an information from any one of communicator 125, controller 120, power supply 140 or master/slave addressor 130 and changes, amends or adjusts the control of light source 110A in response to the received information. In certain embodiments, controller 120A of light source 110A receives an information from any one of communicator 125A, address 127A, master/slave addressor 130A and adjusts, changes or amends the control of the light source 110A in response to the received information.

In some embodiments, the controller 120 includes a central processing unit (CPU), a memory unit, a power supply and a current driving circuitry for powering and controlling one or more light sources 110. In a plurality of embodiments, controller 120 comprises a software application controlling a logic unit for managing the circuitry which powers up or controls one or more light sources 110 or an array of light sources within the light source 110. In a number of embodiments, controller 120 is a module comprising a CPU or a microprocessor, a memory and a digital logic circuit subsystem associated with control and management of the light sources 110. In some embodiments, controller 120 controls intensity of the light emitted from a light source 110 using electronic circuitry, software, or a combination of electronic circuitry and software of the controller 120. In certain embodiments, controller 120 controls wavelength of the light emitted from a light source 110 using electronic circuitry, software, or a combination of electronic circuitry and software of the controller 120. In a number of embodiments, controller 120 controls a duty cycle of the intensity varying light emitted from the light source 110 using hardware, software or a combination of the hardware and software of the controller 120. In some embodiments, controller 120 controls or modulates the light emitted from light source 110 using a microprocessor or a processing unit, such as a central processing unit. In a number of embodiments, controller 120 modulates or controls intensity or wavelength of a light source 110 using a combination of hardware and software to control or modulate current through the light source 110. In a plurality of embodiments, controller 120 modulates or controls intensity or wavelength of a light source 110 using hardware or software or any combination of hardware or software to control or modulate voltage of light source 110. In some embodiments, controller 120 modulates or controls intensity or wavelength of a light source 110 using hardware or software or any combination of hardware and software. In a plurality of embodiments, controller 120 modulates or controls frequency of pulses of light emitted by light source 110 using hardware or software or any combination of hardware and software.

The controller 120, in some embodiments, is a commercial off the shelf system or comprises a commercial off the shelf product, component or a system. In many embodiments, controller 120 is a customized or a proprietary system for controlling light sources 110 or any other lighting system components. In some embodiments, controller 120 comprises controller components such as control circuits, analog or digital logic circuitry, processors or micro-processors, memory units, software or firmware which individually, or in combination, control the output of a light source 110. In a number of embodiments, controller 120 includes any of the products or modules manufactured or provided by Integrated Illumination Systems, Inc. referred to as I 2 Systems, of Morris, Conn. In some embodiments, controller 120 includes user interface modules and light source control modules to control and drive one or more light sources 110.

FIG. 1A also displays a stand-alone communicator 125 connected to other lighting system 100 components via network 104. In some embodiments, communicator 125 and communicator 125A comprise or share any embodiments of any communicator 125. In some embodiments, communicator 125 comprises all the functionality and performance characteristics of communicator 125A and vice versa. Communicator 125A or any other communicator 125, may be any device, unit or a component capable of communicating with any other lighting system 100 component. In some embodiments, communicator 125A receives an information from any component inside of light source 110A, such as controller 120A, address 127A, master/slave 130A or a power supply 140A and in response to the received information transmits an information to any component inside of light source 110A or any lighting system 100 component.

In some embodiments, communicator 125 includes software, hardware, or any combination of software and hardware for receiving or sending information or communication, processing received information and sending information. In some embodiments, communicator 125 includes any one of, or any combination of: analog or digital logic circuitry, processing units or microprocessors, memory, hardware or software for receive and processing information, performing and implementing logical functions or algorithms or transmitting information to other lighting system 100 components. In some embodiments, communicator 125 includes any one of, or any combination of: analog or digital logic circuitry, processing units or microprocessors, memory, hardware or software for receive and processing information, performing and implementing logical functions or algorithms or transmitting information to other components within light source 110A.

Communicator 125 may include any type and form of logic, electronic circuitry, logic operations or functions, software or hardware embodied in forming instructions or enabling control of one or more light sources 110. In some embodiments, communicator 125A or any other communicator 125 comprises any type and form of digital and/or analog circuitry, any device, system, unit or a program for performing any of the operations described herein. Communicator 125, in some embodiments, includes any type or form of executable instructions, including an application, program, library, process, service, task or thread.

In a number of embodiments, communicator 125 detects and processes an instruction within a duty cycle of a signal. In a number of embodiments, communicator 125 detects a time interval associated with a duty cycle. In a plurality of embodiments, communicator 125 receives, decodes or processes a signal comprising a duty cycle of a time interval or within a time interval. In some embodiments, communicator 125 receives, decodes or processes an instruction comprised within the duty cycle. In some embodiments, communicator 125 receives, decodes or processes a duty cycle within a time interval wherein the duty cycle comprises a plurality of separated portions within the time interval. The communicator 125 may detect or process the duty cycle within the time interval regardless if the duty cycle is a single active signal portion within the time interval or a plurality of separated active signal portions within the time interval.

In a number of embodiments, communicator 125A receives all communication or information external to the light source 110A and distributes the received communication to any of the components within the light source 110A. In a plurality of embodiments, communicator 125A receives all communication or information from outside of light source 110 and processes, decodes, interprets or reformats the received information. In certain embodiments, communicator 125A transmits the processed, decoded or interpreted received information to one or more components within the light source 110A. In some embodiments, communicator 125A receives all communication or information from one or more components inside of light source 110A and processes, decodes, interprets or reformats the received information. In certain embodiments, communicator 125A transmits the processed, decoded or interpreted received information to one or more lighting system 100 components, such as another light source 110 or another communicator 125 outside of light source 110A. It will be understood by those with ordinary skill in the art that communicator 125A may comprise all the functionality of any other communicator 125, and vice versa.

Address 127A is an address, piece of data, or a piece of information uniquely identifying a lighting system 100 component having the address 127A from other lighting system 100 components. In some embodiments, address 127A is a number. In many embodiments, address 127A is an electronic data, a number, an electronic code, a binary code or a binary number. In a plurality of embodiments, address 127A is a piece of electronic information stored in a memory location. In some embodiments, address 127A is a setting of a switch or a key. In certain embodiments, address 127A is a setting of a logical circuitry set by a user. In a number of embodiments, address 127A is a digital signal or a digital code. In a plurality of embodiments, address 127A is an internet protocol address.

In some embodiments, address 127 is a unique identifier used for network communication of a lighting system component comprising the address 127. In certain embodiments, address 127 comprises a host name, an internet protocol address or a unique identifier. In a plurality of embodiments, address 127 is used by a lighting system component comprising the address 127 to distinguish a message addressed to the lighting system component from a plurality of messages. In many embodiments, address 127 is used by a lighting system component comprising the address 127 to distinguish an information addressed to the lighting system component from a plurality of information. In numerous embodiments, address 127 is used by a lighting system component comprising the address 127 to distinguish a communication addressed to the lighting system component from a plurality of communications. In some embodiments, address 127A is used as a unique network identifier of a lighting system 100 component comprising the address 127A for network communications of the lighting system 100 component. In a number of embodiments, address 127A is used as a unique network identifier of a lighting system 100 component comprising the address 127A for communication between the lighting system 100 component and a lighting system 100 component comprising an address 127 different than an address 127A. It will be understood by those with ordinary skill in the art that address 127A may comprise all the functionality of any other address 127, and vice versa.

Master/slave addressor 130 may be any unit, circuit, device, software or a system capable of setting, resetting or establishing a master or a slave status of any lighting system component. In many embodiments, master/slave addressor 130 is any device, unit or a system setting, resetting or establishing a status of a master or a slave of one of lighting system components from a plurality of lighting system components. In some embodiments, master/slave addressor 130 is a component independent from any light source 110. In a plurality of embodiments, master/slave addressor 130 is a component within a light source 110 and specifically used by the same light source 110. In a plurality of embodiments, master/slave addressor 130 is associated with a specific lighting system component and used by the same specific lighting system component. In numerous embodiments, master/slave addressor 130 is associated with a group of lighting system components within a plurality of groups of lighting system components, and is used by the group of lighting system components for setting or resetting the statuses of the lighting systems components within the group. In a number of embodiments, any master/slave addressor 130 performs any functionality and comprises any embodiments of a master/slave addressor 130A, and vice versa. In a plurality of embodiments, master/slave addressor 130 is used interchangeably with master/slave addressor 130A.

FIG. 1A illustrates master/slave addressor 130 as a lighting system 100 component while illustrating master/slave addressor 130A as a light source 110A component. Master/slave addressor 130A, in a number of embodiments, is any device, unit, setting, monitoring or recognizing a master or a slave status of light source 110A among a plurality of lighting system 100 components. Master/slave addressor 130, in a plurality of embodiments, is any is any device, unit, circuit, software or a system setting, resetting, monitoring or recognizing a master or a slave status of any light source 110 of a lighting system 100 among a plurality of light sources 110 of the lighting system 100 components.

In many embodiments, one lighting system component of a plurality of lighting system components has a status of a master, while all the remaining lighting system components have status of a slave. In numerous embodiments, all lighting system components of a lighting system 100 have a status of a slave. In a plurality of embodiments, all light sources 110 of a lighting system 100 have a status of a slave. In many embodiments, all lighting system components of a lighting system 100 have a status of a master. In some embodiments, all light sources 110 of a lighting system 100 have a status of a master. In many embodiments, master/slave addressor 130 is independent of any other lighting system component and has a status of a master. In many embodiments, master/slave addressor 130 is independent of any other lighting system component and has a status of a master and all other lighting system components have a status of a slave. In numerous embodiments, master/slave addressor 130 is independent of any other lighting system component and has a status of a slave. In some embodiments, master/slave addressor 130 is independent of any other lighting system component and has a status of a slave and one or more of other lighting system components have a status of a master. In a plurality of embodiments, plurality of light sources 110 of a lighting system 100 have a status of a master or a slave. In some embodiments, all light sources 110 of a lighting system 100 have a status of a master or a slave. In certain embodiments, none of light sources 110 of a lighting system 100 have a status of a master or a slave. In a number of embodiments, one of a plurality of light sources 110 has a status of a master and all the remaining lighting system 100 components have a status of a slave.

In some embodiments, a lighting system component having a status of a master controls one or more tasks, actions, functionalities or performances of one or more light sources 100 having a slave status. Sometimes, a lighting system component having a status of a master controls one or more tasks, actions, functionalities or performances of any lighting system components having a slave status. In many embodiments, a lighting system 100 component having a status of a master sends commands or instructions to one or more light sources 100 having a slave status. In certain embodiments, a lighting system 100 component having a status of a master adjusts performance or functionality of one or more components of the lighting system 100 components having a status of a slave. In many embodiments, a lighting system 100 component having a status of a master assigns another component which used to have a status of a slave a status of a master. In a plurality of embodiments, a lighting system 100 component having a status of a master assigns a status of a slave to itself or any other lighting system 100 component. In some embodiments, wherein all of lighting system components have a status of a slave, a status of a master is assigned to one of a plurality of lighting system 100 components by a lighting system 100 component having a status of a slave.

Still referring to FIG. 1A, power supply 140 is illustrated as an independent lighting system component. Power supply 140 may be any component, device, apparatus or a source supplying one of, or any combination of: electrical current, voltage and power, to one or more lighting system 100 components. In many embodiments, power supply 140 performs any functionality and comprises any embodiments of a power supply 140A, and vice versa. In some embodiments, power supply 140 may be used interchangeably with power supply 140A. Power supply 140 may be a part of any lighting system components. In some embodiments power supply 140 is comprised by a lighting system component and it supplies any of or any combination of power, current or voltage to the lighting system 100 component. In a number of embodiments, power supply 140 is a subsystem of a lighting system component and it supplies power, current or voltage to a plurality of lighting system components. In many embodiments, power, current or voltage is transferred or supplied from a power supply 140 to one or more lighting system 100 components via one or more connections 105. In some embodiments, power supply 140 is an electrical outlet supplying electrical current, voltage or power to a lighting system 100 component, such as a light source 110. In a plurality of embodiments, power supply 140 comprises a battery. In a number of embodiments, power supply 140 comprises a transformer. In many embodiments, power supply 140 is a device, system or a unit supplying an alternating current or a current changing through time to one or more lighting system 100 components. In certain embodiments, power supply 140 supplies a constant current to one or more lighting system 100 components. In a plurality of embodiments, power supply 140 supplies an alternating power or a power changing through time to one or more lighting system 100 components. In some embodiments, power supply 140 supplies a constant power to one or more lighting system 100 components. In many embodiments, power supply 140 supplies an alternating voltage or a voltage varying through time to one or more lighting system 100 components. In certain embodiments, power supply 140 supplies a constant voltage to one or more lighting system 100 components. In a plurality of embodiments, power supply 140 supplies a plurality of different power, voltage or source signals to one or more lighting system 100 components.

Power supply 140 may comprise any number of the lighting system 100 components or may be connected to or service any number of lighting system 100 components. In some embodiments, power supply 140 allows or enables the power to be transferred between a plurality of lighting system components. In certain embodiments, power supply 140 transmits, propagates or sends commands and communication to other components of the lighting system 100. In numerous embodiments, power supply 140 receives or accepts commands and communication from other components of the lighting system 100. In some embodiments, power supply 140 includes software, hardware, or any combination of software and hardware. In many embodiments, power supply 140 uses software, hardware or the combination of software and hardware to control, manage or supply power, electrical current or voltage to one or more lighting system 100 components. In many embodiments, power supply 140 utilizes any one of or any combination of hardware, circuitry, or software to supply, manage or control the flow of current, voltage or power to any one of lighting system 100 components. Power supply 140 may comprise any type or form of logic, electronic circuitry, logic operations or functions, software or hardware. In some embodiments, power supply 140 comprises any type and form of digital and/or analog circuitry, any device, system, unit or a program for performing any of the operations described herein.

In a number of embodiments, power supply 140 supplies two alternating current signals to one or more lighting system 100 components, first one of the two having a phase different than a second one of the two. In a number of embodiments, power supply 140 supplies a constant power signal to one or more lighting system components. In numerous embodiments, power supply 140 supplies a varying power signal to one or more lighting system components. In certain embodiments, power supply 140 supplies a constant current signal to one or more lighting system components. In a plurality of embodiments, power supply 140 supplies a constant voltage signal to one or more lighting system components. In some embodiments, power supply 140 supplies a varying current signal, to one or more lighting system components. In certain embodiments, power supply 140 supplies a varying voltage signal, to one or more lighting system components. In some embodiments, power supply 140 supplies any combination of one or more alternate or constant current signals, alternate or constant voltage signals and alternate or constant power signals to one or more lighting system 100 components.

In further reference to FIG. 1A, light source 110A may includes any of, or any combination of: a controller 120, a communicator 125, master/slave addressor 130 and a power supply 140. In many embodiments, communicator 125A of light source 110A comprises an address 127A. In a plurality of embodiments, communicator 125A does not comprise an address 127A. Light source 110A, sometimes, comprises a controller 120A which controls functionality, performance or features of light source 110A or any other component within the light source 110A. In many embodiments, light source 110A comprises a controller 120A which controls one or more lighting system components. In many embodiments, controller 120A is any controller 120. In a plurality of embodiments, communicator 125A is any communicator 125. In a number of embodiments, master/slave addressor 130A is any master/slave addressor 130. In a plurality of embodiments, power supply 140A is any power supply 140.

Communicator 125A is illustrated by FIG. 1A as a component of light source 110A. Communicator 125A may communicate or enable communication with any other components of the lighting system 100. In a number of embodiments, communicator 125A is a unit or a device communicating with one or more lighting system 100 components. In some embodiments, communicator 125A communicates to a plurality of components within light source 110A. In a number of embodiments, communicator 125A communicates to other systems or components within any other lighting system component, also referred to as lighting system 100 component. Communicator 125A, in some embodiments, is used for communication between any components within the light source 110A or within any other lighting system component. Communicator 125A, in a number of embodiments, includes an address 127 used to uniquely identify a light source 110A in a network 110. Communicator 125A, in many embodiments, uses address 127 for communication between two or more lighting system components. In a number of embodiments, communicator 125A uses address 127 to distinguish which information out of a plurality of information reaching the light source 110 is intended for the light source 110A. In a plurality of embodiments, communicator 125A comprises address 127 which is used for receiving or transmitting information, communication, commands or instructions between the communicator 125A and any lighting system component. In many embodiments, communicator 125A comprises address 127 which is used for receiving or transmitting information, communication, commands or instructions between light source 110A and any other lighting system component.

FIG. 1A also illustrates another component of a light source 110A, called a master/slave addressor 130A. A master/slave addressor 130A comprises any functionality of any master/slave addressor 130, and vice versa. In many embodiments, master/slave addressor 130A controls the status of the light source 110A in relation to other lighting system components. In a number of embodiments, master/slave addressor 130A receives an instruction from a lighting system component and sets a status of a light source 110A to master. In a plurality of embodiments, master/slave addressor 130A receives an instruction from a lighting system component and sets a status of a light source 110A to a slave. In some embodiments, master/slave addressor 130A sends an instruction to set a status of another lighting system component to a status of a master or a slave. In a plurality of embodiments, master/slave addressor 130A receives an information from one of a controller 120A, communicator 125A, power supply 140A or a light source 110A and sets a status of another lighting system component to a master or a slave. In a plurality of embodiments, master/slave addressor 130A comprises any functionality or embodiments of a controller 120, and vice versa. In a plurality of embodiments, master/slave addressor 130A comprises any functionality or embodiments of a communicator 125, and vice versa. In a number of embodiments, master/slave addressor 130A comprises any functionality or embodiments of a power supply 140, and vice versa.

In addition to light source 110A, FIG. 1A also presents light sources 110B and 110C connected to light source 110A via network 104. Light source 110B includes a communicator 125B, while light source 110C includes controller 120C and an address 127C. Light source 110 may comprise any number of components of the lighting system 100. Some light sources 110 sometimes comprise all of components of the lighting system 100, while other light sources 110 do not comprise any of the lighting system 100 components. In some embodiments, light source 110 comprises a plurality of other light sources 110. In a number of embodiments, a light source 110 comprises an array of light sources 110. In many embodiments, any of the lighting system 100 components comprise any of the functionality or embodiments of any other lighting system 100 components. In some embodiments, any of the lighting system 100 components comprise any number of any other lighting system 100 components.

Figure 1B:
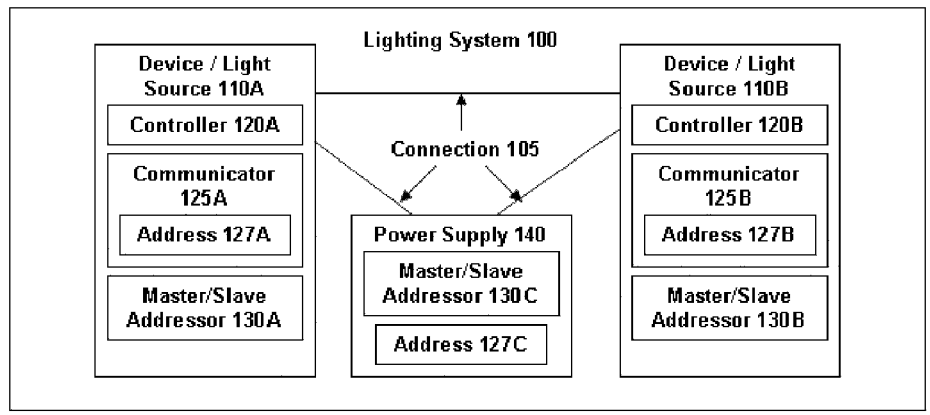
FIG. 1B is a block diagram that depicts another embodiment of a lighting system and components of the lighting system.

FIG. 1B uses a block diagram to illustrate other embodiments of environment of a lighting system 100. FIG. 1B depicts a lighting system 100 having a light source 110A and light source 110B connected to each other and also connected to a power supply 140 via connections 105. Each light source 110 includes one or more controllers 120 for controlling features or functionalities of the light source 110. Light sources 110 also include communicators 125 for communicating to other components of the lighting system 100 or other light sources 110. The communicators 125 in each of the two light sources 110 include addresses 127. Addresses 127 comprised by lighting system components are be used, in many configurations, to uniquely identify communications directed to the specific lighting system 100 components. A light source 110 also includes a master/slave addressor 130a-130c for controlling the status of the light source in terms of control within a lighting system 110. The power supply 140 is connected to one or more light sources 110 and it may be used to provide power or electricity to each of the light sources 110 or any other component within lighting system 100. Connections 115 connect one or more of components of the lighting system 100 and allow for the transfer of power or communication between the components of the lighting system 100.

FIG. 1B presents a configuration involving light sources 110A and 110B connected to each other and a power supply 140. In many embodiments, controllers 120A and 120B control, adjust, modify or affect light emitted or functionality of light sources 110A and 110B, respectively. In some embodiments, light sources 110A and 110B receive all of their power, voltage or current from power supply 140. In some embodiments, light source 110A has an address 127A which is different from address 127B of light source 110B. In other embodiments, light source 110A has an address 127A which is different from address 127B of light source 110B. In a number of embodiments, light sources 110A and 110B communicate with each other using their addresses 127. In many embodiments, master/slave addressors 130A and 130B control, adjust, monitor, set or reset the master or slave status of light sources 110A and 110B, respectively. In a plurality of embodiments, light source 110A having a master status adjusts the status of a light source 110B to a status of a master or a slave. In numerous embodiments, light source 110A having a master status controls, adjusts or modifies the functionality of a light source 110B having a status of a slave. In a number of embodiments, light source 110B having a master status adjusts the status of a light source 110A to a status of a master or a slave. In some embodiments, light source 110A having a master status controls, adjusts or modifies the functionality of a light source 110B having a status of a slave. In a number of embodiments, light source 110A having a master status controls, modifies, affects or governs functionality, performance or light emitted from light source 110B. In a plurality of embodiments, light source 110B has a status of master and a light source 110A has a status of a slave, and light source 110B controls, modifies, affects or governs functionality, performance or light emitted from light source 110A.

Still referring to FIG. 1B, power supply 140 may sometimes comprise an address 127C which is different than address 127A and address 127B. In a plurality of embodiments, address 127C of power supply 140 is used by the power supply 140 to communicate with light source 110A and 110B. In a number of embodiments, address 127C is used for communication between light sources 110A and 110B and power supply 140. Addresses 127C, for example, may be used to distinguish information, data or commands directed to the power supply 140 from the information, data or commands directed to light sources 110A and 110B. In many embodiments, light sources 110A and 110B and power supply 140 are connected in any electrical connection configuration. In some embodiments, lighting system 100 components are connected in series, in parallel or in a combination of series and parallel configurations. In some embodiments, information transmitted between lighting system components comprises an address 127 of a specific lighting system 100 component the transmitted information is intended for. In some embodiments, light sources 110A and 110B and power supply 140 are connected in series and information transmitted comprising an instruction, a command or data is accessible to all three lighting system 100 components while the address 127 within the information transmitted defines which of the lighting system 100 components is the information addressed to.

In some embodiments, light source 110A transmits an information via connection 105 which connects light source 110A with light source 110B and power supply 140. The information transmitted by the light source 110A sometimes comprises instructions, commands, data and an address 127B. The communicator 125B of the light source 110B may receive the address 127B from the transmitted information and confirm that it matches with address 127B of the communicator 125B. The communicator 125B, in response to the confirmed match, then may receive the entire transmitted information.

In many embodiments, master/slave addressor 130 performs all functionality of a communicator 125, or vice versa. In a number of embodiments, light source 110 performs all functionality of a master/slave addressor 130 or a communicator 125, and vice versa. In a plurality of embodiments, any lighting system 100 components performs any functionality of any other lighting system 100 component, and vice versa. In many embodiments, any subcomponent of a lighting system 100 component performs any functionality of any other lighting system 100 component, and vice versa. In certain embodiments, any subcomponent of a lighting system 100 component performs any functionality of any other subcomponent of a lighting system 100 component, and vice versa.

Figure 1C:
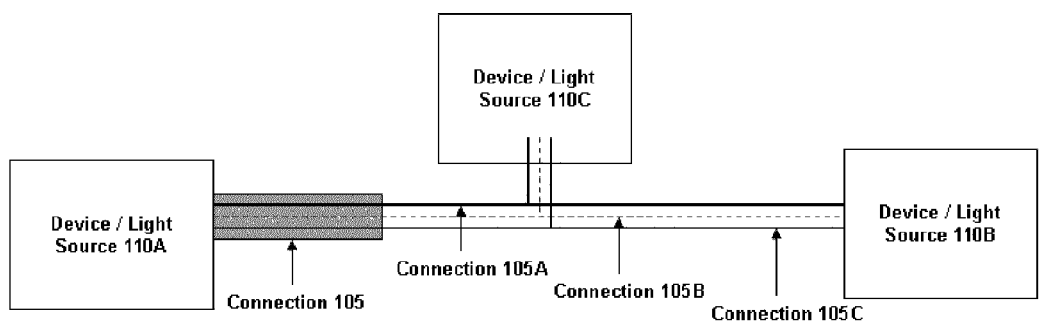
FIG. 1C is a block diagram that depicts an embodiment of a communication system between light sources.

Referring now to FIG. 1C embodiments of systems and methods for digital communication of lighting system components is illustrated. FIG. 1C presents light sources 110A, 110B and 110C connected to each other via connections 105. Connection 105 is illustrated as a shaded region within which connection 105 components are comprised. In some embodiments, connection 105 is a wire or a cable harness comprising an enclosure enclosing three separate wires or three electrical conducting lines. Each of the three separate wires or conducting lines may sometimes be referred to as connection 105 components. FIG. 1C illustrates connection 105 components: connection 105A, connection 105B and connection 105C, as independent conducting lines propagating through the connection 105. Connection 105, however, may also be a wireless communication link. In some embodiments, connection 105 is a wireless communication band comprising a number of wireless communication links. Illustrated as separated from each other, connection 105 components are shown as electrically insulated from each other or mutually independent. In some embodiments, however, connection 105 components are not electrically insulated from each other and are not mutually independent. FIG. 1C depicts connection 105A marked with a bold line, a connection 105B with a dashed line and a connection 105C illustrated with a thin non-dashed line. Herein, the terms connections 105A, 105B and 105C and the term connection 105 components may sometimes be used interchangeably.

One or more connections 105 may be used as means for transmitting communication between a plurality of lighting system components, such as light sources 110A, 110B and 110C. In some embodiments, connections 105 connect all of the lighting system components within a lighting system 100. In a number of embodiments, one or more connection 105 components, such as connections 105A, 105B and 105C connect two or more lighting system 100 components. In many embodiments, all connection 105 components connect two or more lighting system 100 components. In a plurality of embodiments, all connection 105 components connect all of the lighting system 100 components. In many embodiments, connection 105 comprises any number of connection 105 components connecting any number of lighting system 100 components.

Sometimes, connection 105 components transmit electrical current, voltage or power between two or more lighting system 100 components. In some embodiments, connection 105 comprises one or more connection 105 components transmitting information or communication between two or more lighting system 100 components. In many embodiments, connection 105 comprises one or more connection 105 components which serve as mediums or means for delivering, supplying or transmitting electrical current, power or voltage to one or more lighting system components. In some embodiments, connection 105 comprises one or more connection 105 components which serve as mediums or means for delivering, supplying or transmitting information transmitted between the lighting system 100 components.

Connection 105 components, such as connections 105A, 105B or 105C are, in many embodiments, means for delivering electrical power, voltage or current together with electronic analog or digital communication signals. In a number of embodiments, one or more connection 105 components are means through which electrical power is delivered to a lighting system 100 component along with analog or digital information or communication. In a plurality of embodiments, two or more lighting system components are connected to each other via one or more connections 105 or one or more components of connections 105. In some embodiments, connection 105 components are means, paths or mediums through which electrical power, voltage or current is transmitted to a group of lighting system 100 components. Sometimes, connection 105 components are means, paths or mediums through which electrical power, voltage, current or information is transmitted to a lighting system 100. In a number of embodiments, one or more connection 105 components are means, paths or mediums through which analog or digital information is transmitted between the two or more lighting system components. The connection 105 components may also comprise means, paths or mediums through which wireless information is transmitted between the two or more lighting system components.

In some embodiments, light source 110A comprises a power supply 140 and light source 110A provides electrical power to light source 110B via one or more connection 105 components. In a number of embodiments, light source 110A supplies power to light source 110B via connections 105A and 105B, while providing information, such as digital communication for example, via connection 105C. In a some embodiments, light source 110A supplies power to light source 110B via connections 105A and 105B while receiving information or communication from light source 110B. In a plurality of embodiments, light source 110A communicates with light source 110C and light source 110B via connection 105C. In a number of embodiments, light source 110A provides electrical power to light sources 110B and 110C via connections 105A and 105B, while communicating with light sources 110B and 110C via connection 105C. In a number of embodiments, light source 110A provides electrical power to light sources 110B and 110C via connections 105A and 105B, while light sources 110B and 110C communicate to each other via connection 105C. In many embodiments, any one or more of light sources 110A, 110B and 110C provide electrical power to any one or more of light sources 110A, 110B and 110C via any one or more of connections 105A, 105B, or 105C while light sources 110A, 110B and 110C communicate to each other via any one of connections 105A, 105B or 105C.

In a plurality of embodiments, light source 110A comprises a power supply 140 and provides light sources 110B and 110C with electrical power via connections 105A and 105B. In some embodiments, light source 110A comprises a power supply 140 and provides electrical power and communication to light sources 110B and 110C via any combination of connections 105A, 105B and 105C. In a number of embodiments, light source 110A comprises a power supply 140 and provides light sources 110B and 110C with electrical power via connections 105B and 105C, while light source 110A communicates with light sources 110B and 110C via connections 105B and 105A. In a plurality of embodiments, light source 110B, comprising a power supply 140, provides light sources 110A and 110C with electrical power via connections 105B and 105C, while light source 110A communicates with light sources 110B and 110C via connections 105B and 105A. In a number of embodiments, any one or more of light sources 110A, 110B and 110C provides electrical power to any one or more of light sources 110A, 110B and 110C via any one or more of connections 105A, 105B, or 105C while light sources 110A, 110B and 110C communicate to each other via any one or more of connections 105A, 105B or 105C.

Figure 1D:
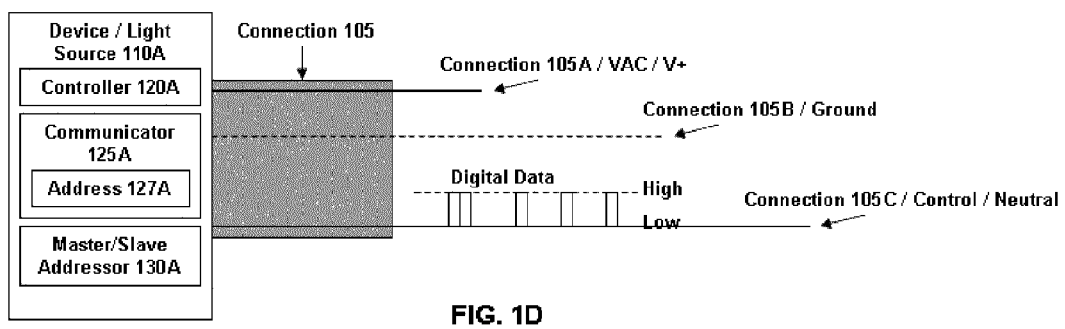
FIG. 1D is a block diagram that depicts an embodiment of a light source control and communication.

FIG. 1D presents an embodiment of connection 105 comprising connection 105 components used for transmission of electrical power and digital data. FIG. 1D illustrates a light source 110A having a controller 120A, a communicator 125A with an address 127A and a master slave 130A. Light source 110A is connected to by connection 105 which comprises connection 105A, connection 105B and connection 105C. Connection 105A is also labeled as VAC or V+. Connection 105B is also labeled Ground, which can sometimes be referred to as electrical ground or a ground potential wire. Connection 105C, in many cases, may be labeled as a neutral, a control, or a control line.

Connection 105A, may sometimes be used for transmitting or propagating alternate voltage or voltage varying through time. Sometimes, connection 105 is also used for transmitting or propagating alternate current or power or current or power varying through time. Connection 105A, in some embodiments, is used for transmission or propagation of a constant voltage which is positive relative to ground. In such cases, the connection 105A may be labeled V+. In a number of embodiments, connection 105A is also used for transmission or propagation of a negative voltage potential relative to ground. In a plurality of embodiments, connection 105A is a medium through which constant power, constant current or constant voltage are propagated or transmitted. Connection 105B is also labeled Ground, and is sometimes used for transmission or propagation of electrical ground or a ground potential. In some embodiments, connection 105 B is used for same purposes as connection 105A. In a plurality of embodiments, connection 105 B is used for grounding and has a zero voltage potential relative to ground. In many embodiments, connection 105B is a medium through which alternate voltage or constant voltage, alternate or constant current or alternate or constant power signals are propagated or transmitted. Connection 105C is sometimes used as a neutral wire which may have any potential relative to ground, or zero potential relative to ground. Connection 105C is sometimes used as a control wire or a control line which may have any potential relative to ground, or not have any potential relative to ground. In some embodiments, connection 105C is a control line used as a medium through which lighting system 100 components send information, controls, signals, commands or instructions among each other. In some embodiments, connection 105C performs all the functionality of connection 105A. In a plurality of embodiments, connection 105C performs all the functionality of connection 105B.

Connection 105C is sometimes used for transmission or propagation of electronic signals. In some embodiments, connection 105C is a medium or a means for transmitting or propagating a digital electronic signal. In various embodiments, connection 105C is a control line connecting two or more light sources 110 or any other lighting system components. Sometimes, connection 105C is a wireless communication link between two or more lighting system 100 components. In a number of embodiments, connection 105C is a control line or a control wire connecting two or more lighting system 100 components. In a number of embodiments, connection 105C is a control line used as a medium through which information, instructions, signals or commands are propagated between two or more lighting system 100 components. In a plurality of embodiments, connection 105C is a medium or means for transmitting or propagating an analog electronic signal.

In many embodiments, connection 105C is a medium through which digital or analog information or data is transmitted or propagated. Digital data sometimes comprises a high voltage level and a low voltage level which defines communication transmitted as binary values of 1 or 0, respectively. In some embodiments, a signal comprises a high value, or a 1, which is defined by a predetermined threshold having a predetermined voltage value. The voltage of the signal may cross above the voltage value of the predetermined threshold resulting in the signal having a high value, or a value of 1. In some embodiments, a signal comprises a low value, or a 0, which is defined by a predetermined threshold having a predetermined voltage value. The voltage of the signal may cross below the voltage value of the predetermined threshold resulting in the signal having a low value, or a value of 0. In some embodiments, a signal has only one threshold value defining a low and a high value of the signal, the signals below the threshold value being low, or 0, and signals above the threshold value being high, or 1. In a number of embodiments, digital data transmitted via connection 105C comprises digital representation of bits. In a plurality of embodiments, digital data transmitted through connection 105C comprises digital representation of pluralities of bits or bytes. In a number of embodiments, digital data transmitted via connection 105C comprises square waves, wherein the low value of the square wave equals the low voltage value and the high value of the square wave equals a high voltage value. In many embodiments, digital data transmitted via connection 105C comprises square waves wherein the low value of the square wave equals zero volts and the high value of the square wave equals any positive voltage value, such as three volts or five volts, for example.

Connection 105 may comprise any number connection 105 components, such as connection 105A, 105B through 105N where N is any number. Any of connection 105 components of the connection 105 may be a wire, a conductor line, a wireless link, a frequency range for a wireless signal, a fiber optic or any other medium capable of transmitting a signal. Any one of the connection 105 components may comprise a control signal or a return for a control signal. In some embodiments, a connection 105 component is a control line. Sometimes, a connection 105 component is a return line. Sometimes, a connection 105 is a differential line wherein one line of the connection 105 comprises a voltage above a certain threshold and another line of the connection 105 comprises a voltage below a certain threshold. In some embodiments, connection 105 comprises any number of connection 105 components which may be dedicated to transmitting any one or any number of signals from any components of lighting system 100.

Digital data, such as data bits 215 may be generated using any device capable of generating signals. Sometimes, a controller 120 or a communicator 125 generates signals which are transmitted to other lighting system 100 components. In many embodiments, a controller 120 receives or processes signals from other devices 110 and generates or sends signals to other devices 110. In a plurality of embodiments, a communicator 125 receives or processes from other devices 110 and generates or sends signals to other devices 110. In some embodiments, digital data may be generated using a phase control dimmer for example. In a number of embodiments, a device generating a pulsed waveform may be combined with a circuitry clipping top portions of the waveform and creating digital bits using portions of the clipped waveform. In many embodiments, a device producing a square-wave waveform may be used in conjunction with an electronic circuit which controls or adjusts the waveform to produce bits of digital signal, such as data bits 215 for example. Digital data may be produced or generated using any electronic signal generating device providing means for generating a digital signal having high values corresponding to digital value of 1 (one) and low values corresponding to a digital value of a 0 (zero). In some embodiments, digital signal having high and low values may resemble a square wave having sharp edges. In other embodiments, digital signal may comprise portions of waveforms having rounded edges.

In some embodiments, connection 105C is a medium through which pulse width modulated information is propagated. In a number of embodiments, connection 105C is a medium through which pulse code modulated data is propagated or transmitted. In many embodiments, connection 105C is a medium through which pulse density modulated data is transmitted or propagated. In a number of embodiments, connection 105C is a medium through which pulse amplitude modulated data is transmitted or propagated. In some embodiments, connection 105C is a medium through which pulse position modulated data is transmitted or propagated. In many embodiments, connection 105C is a medium through which sigma delta modulated data is transmitted or propagated. Connection 105C may be used as a medium through which any type of an electronic or electrical signal is propagated. The propagated signal may be a digital signal of any modulation, such as frequency or phase modulation, amplitude modulation, pulse width modulation or any other type of modulation available. In some embodiments, any one of connections 105A, 105B or 105C can be used interchangeably with any other connection 105 or any other connection 105 component, such as connections 105A, 105B or 105C.

B. Communication Between Lighting System Components

Referring now to FIG. 2A, an embodiment of communication between devices 110A and 110B is illustrated. FIG. 2A depicts devices 110A and 110B, also referred to as light sources 110A and 110B, connected to each other via connection 105. Connection 105 may be used by light sources 110A and 110B as a medium for transmission of communication between the light sources 110A and 110B. FIG. 2A also illustrates a signal transmitted and represented as data 210. Data 210 may be transmitted via a connection 105 and may comprise a plurality of data bits 215. In some instances, active portions of the signal, such as data bits 215 having high values may define a duty cycle of the signal. Data 210 illustrated in FIG. 2A comprises five data bits 215 having high values grouped together. Time Interval 205, also referred to as a period 205, is a time interval within which portions of data 210 are transmitted via communication 105. FIG. 2A presents an embodiment showing two time intervals 205, each time interval 205, also known as period 205, having a group of data 210 comprising an equal amount of bits 215 having a high value. Amount of bits transmitted within each time interval 205 may vary between different embodiments or different applications.

Data 210 may be any information, communication, instruction or data transmitted via connection 105. In some embodiments, data 210 comprises a digital signal. In a plurality of embodiments, data 210 comprises an analog signal. In some embodiment, data 210 comprises a mix of an analog or a digital signal. In a number of embodiments, data 210 comprises a square wave signal. In many embodiments, data 210 comprises a pulse. In some embodiments, data 210 comprises a pulse width modulated signal or data. In a plurality of embodiments, data 210 comprises a pulse amplitude modulated data or signal. In some embodiments, the data 210 is a wirelessly communicated digital data. In numerous embodiments, data 210 comprises data which is encoded using a binary system and comprises only high values and low values. In some embodiments, high value corresponds to a square-shaped signal whose peak is flat over a period of time and has a value of voltage which is higher than a square-shaped signal of a low value. In a number of embodiments, low value corresponds to a square-shaped wave whose lowest point is flat over a period of time and has a value of voltage which is lower than a square-shaped signal of a high value.

Duty cycle of a signal may be any ratio or fraction of a time interval 205 in an active state. The active state may be any state of bits of data 210 or any portions of the signal which may have high values or low values. In some embodiments, active state comprises bits of data 210 having high values, or values equivalent to digital value of 1. In other embodiments, active state comprises bits of data 210 having low values, or values equivalent to digital value of 0. Duty cycle may be a ratio of a portion of a time interval 205 for which the signal comprises high values, such as a digital value of 1, to a duration of that same the whole time interval 205. For example, a duty cycle for a time interval 205 of 1 millisecond may be a ratio of a fraction of the period 205 for which data bits 210 have a value of 1, e.g. for which the signal is high, to the whole duration period of the time interval 205, e.g. 1 millisecond. In some embodiments, duty cycle is a ratio of time interval 205 for which the signal has low values, or values of 0, to the entire duration of the whole same time interval 205. In another example, a duty cycle for a time interval 205 of 1 millisecond may be a ratio of a fraction of the period 205 for which data bits 210 have a value of 0, e.g. for which the signal is low, to the whole duration period of the time interval 205, e.g. 1 millisecond. In a number of embodiments, data 210 comprises bits or portions of signal having high values within a time interval 205, and the bits or portions of signal having high values within the time interval 205 define a duty cycle of the signal or a duty cycle of the time interval 205. Sometimes, data 210 comprises bits or portions of signal having low values within a time interval 205, and the bits or portions of signal having low values within the time interval 205 define a duty cycle of the signal or a duty cycle of the time interval 205. In some embodiments, duty cycle of a signal within a time interval 205 is defined by a total amount of bits or portions of the signal having high values and transmitted with the time interval 205, regardless if the portions are separated or bunched together. In many embodiments, duty cycle of a signal within a time interval 205 is defined by a total amount of bits or portions of the signal having low values and transmitted with the time interval 205, regardless if the portions are separated or bunched together. The duty cycle may include a ratio of a duration of a period 205 for which the signal or communication have a high value to a duration of the entire period 205. The duty cycle of a period 205 may further include an average value of the signal within the period 205.

In a number of embodiments, data 210 is transmitted via connection 105 in respect to the time interval 205. Sometimes, time interval 205 is a predetermined period of time within which a communication or an information comprising a specified amount of data bits is transmitted over a connection 105. In some embodiments, time interval 205, also referred to as period 205, is a period of time within which a communication or an information comprising an unspecified amount of data bits is transmitted over a connection 105. In a number of embodiments, data 210 is a predetermined amount of data transmitted between light source 110A and light source 110B within a time range defined by the period 205. In many embodiments, data 210 is an amount of data having a predetermined amount of bits having a high or a low value transmitted through connection 105 within a time range defined by a period 205. In a plurality of embodiments, data 210 transmitted between devices 110A and 110B remains constant for a plurality of periods, or time intervals 205. In many embodiments, data 210 having portions having a high value may remain constant through a plurality of time intervals 205. In many embodiments, data 210 transmitted between devices 110A and 110B in a first period 205 is different than data 210 transmitted between light sources 110A and 110B in a second period 205. In some embodiments, data 210 transmitted between light sources 110A and 110B via connection 105 has a constant amount of bits through plurality of periods 205. Sometimes, data 210 transmitted between devices 110A and 110B via connection 105 has a constant amount of bits having a high value through plurality of periods 205. In a number of embodiments, data 210 transmitted between devices 110A and 110B via connection 105 has a constant amount of bits having a low value through plurality of periods 205. In a number of embodiments, data 210 transmitted between devices 110A and 110B via connection 105 comprises an amount of bits transmitted within a first period 205 which is different than the amount of bits transmitted within a second period 205. Data 210 transmitted between devices 110A and 110B may also comprise an amount of bits having a high value transmitted within a first time interval 205 different than the amount of bits having a high value transmitted within a second time interval 205. Similarly, data 210 transmitted between devices 110A and 110B may also comprise an amount of bits having a low value transmitted within a first time interval 205 different than the amount of bits having a low value transmitted within a second time interval 205.

In a number of embodiments, time interval 205, or a period 205, is a predetermined period or a duration of time. In a plurality of embodiments, period 205 is constant period or a duration of time. In many embodiments, period 205 is a changing or undetermined period of time. In many embodiments, period 205 is a period of time or a duration of time determined by data 210. In a plurality of embodiments, period 205 is a period of time or a duration of time determined by one or more data bits 215. In many embodiments, period 205 is a period of time or a duration of time determined by light source 110A. In some embodiments, period 205 is a period of time or a duration of time determined by light source 110B. In many embodiments, period 205 is period of time or a duration of time determined by any lighting system 100 component. In a plurality of embodiments, period 205 is a period of time or a duration of time determined by a clock or a circuit. In some embodiments, period 205 is a period of time within which a predetermined amount of information such as one or more bits 215 is transmitted.

In a number of embodiments, lighting system 100 component receiving information or a signal determines period 205 based on the statistics of previous periods 205. In a plurality of embodiments, lighting system 100 component receiving information or a signal anticipates a next period 205 based on the duration of a previous period 205. In many embodiments, lighting system 100 component receiving information or a signal anticipates a period 205 based on an algorithm which uses durations of previous periods 205 to determine the next period 205. In a number of embodiments, lighting system 100 component receiving information or a signal anticipates a period 205 based on a weighted statistics of recently arrived periods 205 or cycles of information. In many embodiments, one or more lighting system 100 components maintains statistics such as average data bits per period 205, tolerance for variation of a period 205, or duration of periods 205. In some embodiments, statistics relating periods 205 or data bits 215 maintained by one or more lighting system 100 components are used to anticipate or predict the next period 205.

In some embodiments, time interval 205, or a period 205, is a period of time determined by an event or a signal. In a plurality of embodiments, a first period 205 is immediately followed by a second period 205 and a time duration of the first period 205 is different from a time duration of the second period 205. In many embodiments, a first period 205 is immediately followed by a second period 205 and a time duration of the first period 205 is the same as the time duration of the second period 205. In a number of embodiments, a number of data bits 215 transmitted via connection 105 within a period 205 is predetermined. In a plurality of embodiments, a number of data bits 215 transmitted within a first period 205 is same as a number of data bits 215 transmitted within a second period 205, the second period immediately following the first. In many embodiments, a number of data bits 215 transmitted within a first period 205 is different from a number of data bits 215 transmitted within a second period 205, the second period immediately following the first. In some embodiments, time duration of period 205 in a first connection 105 component, such as connection 105B, is different from a time duration of a period 205 in a second connection 105 component, such as connection 105C. In many embodiments, time duration of a period 205 relating an information transmitted by a first connection 105 component is the same as a time duration of a period 205 relating an information transmitted by a second connection 105 component. In some embodiments, one or more connection 105 components do not have a period 205.

Referring now to FIG. 2B another embodiment of communication between devices 110A and 110B is illustrated. FIG. 2B presents devices 110A and 110B connected to each other via connection 105. Connection 105 is used by the devices 110A and 110B as a medium of communication between the light sources 110A and 110B. FIG. 2B also illustrates data 210 transmitted via connection 105. In comparison to the embodiment illustrated by FIG. 2A, the embodiments illustrated in FIG. 2B shows data bits 215 spread out through the time interval, or the period 205. Time intervals 205 and an amount of 215 data bits having a high value in each time interval 205 remain the same in the embodiments depicted FIG. 2A and FIG. 2B, illustrating a same or a similar duty cycle for both embodiments. Some data bits 215, however, are also marked as instruction bits 220, and may be used for a variety of communication related purposes, such as instructions or commands.

Still referring to FIG. 2B, data bits 215 are spread out through the period 205. First period 205, in some embodiments, comprises data bits 215 spaced out differently than data bits 215 in second period 205, the second period 205 immediately following the first period 205. In many embodiments, first period 205 comprises data bits 215 having a high or a low value spaced out differently than data bits 215 in second period 205 having a high or a low value, the second period 205 immediately following the first period 205. When two periods comprise a same amount of data bits 215 having a high value, which includes instruction bits 220, then the two periods may have a same duty cycle. Similarly, when two periods comprise a same amount of data bits 215 having a low value, which includes instruction bits 220, then the two periods may also have a same duty cycle.

Sometimes, data bits 215 may be transmitted within a specific time range within period 205. In many embodiments, some data bits 215 having a high or a low value are transmitted outside of a specific time range within period 205 and other data bits 215 are transmitted within the specific time range within period 205. In a plurality of embodiments, data bits 215 having a high or a low value are transmitted outside of a specific time range within period 205. In many embodiments, a specific time range within period 205 is predetermined by any lighting system 100 component. In a plurality of embodiments, a specific time range is always within a same time period for any period 205. In many embodiments, a specific time range within a first 205 period is within a different time period than a second specific time range of a second 205 period, the second period 205 immediately following the first period 205.

Referring now to FIG. 2A and FIG. 2B together, combinations of two embodiments of communication between light sources 110A and 110B are discussed. In FIG. 2A data bits 215 having a high value are sequentially combined together and data 210 therefore resembles a periodic square wave having high value during a first portion of period 205 and a low value during the remainder of period 205. In some embodiments, a first bit 215, which may or may not be instruction bit 220, of data 210 within period 205 triggers or causes the period 205 to start. In many embodiments, a first bit 215, which may or may not be instruction bit 220, of data 210 within period 205 is aligned with period 205. In some embodiments, one or more lighting system 100 components uses the first bit 215 of data 210 within period 205 to define the beginning of a new period 205. In a number of embodiments, one or more lighting system 100 components uses the last bit 215 of data 210 within period 205 to define beginning or end of period 205. In many embodiments, one or more lighting system components uses one or more bits 215 of period 205 to define a specific part of period 205. In some embodiments, communication or information between one or more lighting system components is transmitted within the specific part of period 205 defined by one or more bits 215 of period 205. In embodiments in which data 210 or data bits 215 or 220 are transmitted wirelessly, periods 205, 305 or 315 may be periods of time within which an amount of data is wirelessly transmitted.

In a plurality of embodiments, one or more lighting system 100 components use one or more bits 215 or 220 of data 210 within a period 205 to synchronize communication, transmission of communication or information transmitted via connection 105. In many embodiments, one or more lighting system 100 components use one or more bits 215 or 220 of data 210 within a period 205 to specify a timing within period 205 within which communication or information between two or more lighting system 100 components is transmitted. In a plurality of embodiments, one or more lighting system 100 components communicate information within a part of a period 205 which is defined by one or more bits 215 or 220 of data 210 within the period 205. In many embodiments, one or more bits 215 or 220 within period 205 are used to identify a specific time period within any of a plurality of 205 periods, wherein the specific time period is a period within which communication between two or more lighting system 100 components takes place. In some embodiments, one or more bits 215 or 220 within period 205 are used to identify a specific time period within any of a plurality of concatenated 205 periods. The specific time period is sometimes designated for communication between two or more lighting system 100 components.

FIGS. 2A and 2B illustrate an embodiment wherein information relating intensity of light sources 110A and 110B is transmitted over a connection 105. In some embodiments, light source 110A is sending information, status, instruction or command to light source 110B regarding intensity of light emitted by light source 110A. In many embodiments, light source 110 may be sending any information including information relating: humidity of a room, temperature of a light source 110, temperature of a room, presence of a person in a room, intensity of a light, color of a light or more. In many embodiments, light source 110A is sending information, status, instruction or command to light source 110B regarding intensity or color of light emitted by light source 110B. In a some embodiments, light source 110B is sending information, status, instruction or command to light source 110A regarding temperature or any other characteristic relating specifically to light source 110A. In many embodiments, light source 110B is sending information, status, instruction or command to light source 110A regarding intensity of light emitted by light source 110B.

In some embodiments, FIG. 2A depicts an embodiment wherein light source 110B is sending five 215 bits having a high value or a value of 1, to light source 110. The five 215 bits communicated within period 205 having a high value, in some embodiments, specifies an amount of intensity light source 110A should emit. In many embodiments, the amount of bits 215 within a period 205 having a high value, or a value of 1, is proportional to the intensity of light to be emitted. In a number of embodiments, an instruction comprising an amount of bits 215 having a high value of a value of 1, within a period 205 specifies an intensity a light source 110 receiving the instruction should emit. In a number of embodiments, the higher the proportion of bits 215 having a high value within a period 205, the higher the intensity of the light to be emitted. In a plurality of embodiments, an amount of bits transmitted by light source 110B to light source 110A signifies an instruction for light source 110A to emit a specific intensity of light as specified by the amount of bits 215 or 220 transmitted. In a number of embodiments, bits transmitted by light source 110B to light source 110A signify an instruction for light source 110A to emit a specific intensity of light as specified by the bits transmitted.

In many embodiments, a total amount of bits 215 having a high value within a period 205, transmitted by light source 110B to light source 110A, is an instruction for light source 110A to emit. In many embodiments, a total amount of bits 215 having a low value within a period 205, transmitted by light source 110B to light source 110A, is an instruction for light source 110A to emit. In a plurality of embodiments, amount of data bits 215 having a value of 1 within a period 205 transmitted by light source 110B indicates or signifies intensity of light source 110A. In some embodiments, amount of data bits 215 having a value of 0 within a period 205 transmitted by light source 110B indicates or signifies the intensity of light source 110A.

In FIG. 2A light source 110B transmits five bits 215 within each period 205, wherein the five bits specifies intensity with which light source 110A should emit light. FIG. 2A also illustrates five bits 215 of data 210 within period 205 positioned at the beginning of each period 205. In many embodiments, all bits 215 positioned at the beginning of period 205 specify intensity of light but do not carry any additional information. In a number of embodiments, five bits 215 positioned at the beginning of period 205 specify the beginning of a period 205.

In FIG. 2B, five bits 215 are spread out within period 205, wherein first two bits 215 are at the beginning of each period 205 and remaining bits 215, also referred to as instruction bits 220, are spread out within a latter portion of period 205. In many embodiments, wherein the instruction bits 220 are spread out within a latter portion of period 205, the instruction bits 220 signify information which is not related to intensity of light. In many embodiments, wherein the instruction bits 220 are spread out within a latter portion of period 205, the instruction bits 220 signify information which are related to intensity of light as well as another information transmitted to the lighting system component. In a plurality of embodiments, wherein the instruction bits 220 are spread out within a latter portion of period 205, the instruction bits 220 signify an instruction to one or more lighting system 100 components. In many embodiments, wherein the instruction bits 220 are spread out within a latter portion of period 205, the instruction bits 220 are information transmitted to one more lighting system 100 components. In some embodiments, instruction bits 220 are bits 215 spread out through any part or portion of a period 205. In many embodiments, instruction bits 220 are bits 215 performing a specific task. In a variety of embodiments, instruction bits 220 are bits 215 are data 210 emitted by a lighting system 100 component which sends an information within a specific time frame within period 205. In many embodiments, instruction bits 220 are data 210 emitted within any one or more sections or portions of period 205.

In many embodiments, data bits 215 spread out within a latter portion of period 205 are referred to as the instruction bits 220. In a number of embodiments, data bits 215 spread out within a first portion of period 205 are referred to as the instruction bits 220. Instruction bits 220, in some embodiments form an address of a lighting system 100 component. In many embodiments, instruction bits 220 form a command or an instruction addressed to a specific lighting system 100 component to change status from master to slave. In a plurality of embodiments, instruction bits 220 are a part of an instruction or a command addressed to a specific lighting system 100 component to change status from slave to master. In many embodiments, instruction bits 220 form an instruction addressed to a specific lighting system 100 component relating control of the specific lighting system 100 component. In a number of embodiments, instruction bits 220 form an instruction addressed to a specific lighting system 100 component to change a spectral range of light emitted.

In a plurality of embodiments, instruction bits 220 form an instruction addressed to a specific lighting system 100 component to change, adjust or amend intensity of light emitted. In some embodiments, instruction bits 220 form an instruction addressed to a specific lighting system 100 component to maintain or confirm intensity of light emitted. In many embodiments, instruction bits 220 form an instruction addressed to a specific lighting system 100 component to adjust address 127 of the lighting system 100 component. In numerous embodiments, instruction bits 220 form an instruction addressed to a specific lighting system 100 component to turn the lighting system 100 component on. In some embodiments, instruction bits 220 form an instruction addressed to a specific lighting system 100 component to start emitting light. In numerous embodiments, instruction bits 220 form an instruction addressed to a specific lighting system 100 component to turn the lighting system 100 component off. In some embodiments, instruction bits 220 form an instruction addressed to a specific lighting system 100 component to stop emitting light. In numerous embodiments, instruction bits 220 form an instruction addressed to a specific lighting system 100 component to turn the lighting system 100 component on. In some embodiments, instruction bits 220 form an information, instruction or command addressed to a specific lighting system 100 component to perform a task, an action or an adjustment of any kind.

In some embodiments, instruction bits 220 are positioned in a very first portion of period 205. In many embodiments, instruction bits 220 are positioned in central or middle portion of period 205. In a number of embodiments, instruction bits 220 are positioned in last or final portion of period 205. In numerous embodiments, instruction bits 220 are transmitted within any portion of period 205 or within a plurality of portions of period 205. In a number of embodiments, the portion of period 205 within which instruction bits 220 are transmitted remains the same for all periods 205. In many embodiments, the portion of period 205 within which instruction bits 22 are transmitted varies between periods 205.

FIG. 2A and FIG. 2B also illustrate how a lighting system 100 component, in some embodiments, maintains a same light intensity regardless of whether data 210 is in a group or dispersed through period 205. As illustrated by FIG. 2A, in some embodiments, light source 110B transmits an amount of data bits 215 having a high value within a period 205 to light source 110A to indicate a light intensity light source 110A should emit light with. In some embodiments, as illustrated by FIG. 2B, light source 110B transmits the same amount of data bits 215 having a high value within the period 205 as in FIG. 2A, while transmitting instruction bits 220 further specifying additional information to light source 110A. In such embodiments, light source 110B is sometimes a master sending instructions to a slave light source 110A. Light source 110B, in some embodiments, maintains the same intensity of light source 110A while sending additional information to light source 110A. The additional information may be any information, such as instructions, commands, settings, calibrations, tasks, actions, statuses or any other information light sources 110A and 110B are capable of communicating.

In some embodiments, it is a position of data bits 220, or instruction bits 220, in relation to the period 205 which defines the instruction or information transmitted by instruction bits 220. In a number of embodiments, instruction bits 220 form or define a digital instruction, such as a digital number, a digital sequence of values or a digital value pattern. In a plurality of embodiments, information comprises data bits 215 which are not instruction bits 220, wherein data bits 215 are positioned within a specific portion of period 205 and signify intensity of light to be emitted by light source 110 receiving the information. In numerous embodiments, data bits 215 which are not instruction bits 220, transmitted within a period 205 and comprising both bits 215 and bits 220, form or define information relating intensity of light to be emitted by a light source 110 receiving the information. In many embodiments, information relating intensity of light to be emitted by the light source 110 is a command or an instruction indicating the intensity of light the light source 110 will emit. In some embodiments, information relating intensity of light to be emitted by the light source 110 is a command or an instruction indicating to turn light source 110 on or off. In some embodiments, instruction bits 220 form or define an information or instruction which is different from an instruction relating intensity of light for a lighting system 100 device.

In some embodiments, information transmitted by data bits 215 is digital communication information. In a number of embodiments, information transmitted by instruction bits 220 is digital communication information. In a plurality of embodiments, data bits 215 comprise digital communication. In many embodiments, data bits 215 comprise one or more digital values of 0's and 1's. In many embodiments, bits 215 are digital communication wherein digital value of 1 is marked by a square wave having a height signifying a digital value of 1 and a square wave having a lack of height signifying a digital value of 0. In many embodiments, height of the square wave is defined by a voltage signal, such as a voltage step or a voltage impulse. In a plurality of embodiments, data bits 215 are digital communication wherein digital value of 0 is marked by a square-like wave having a height and a digital value of 0 is marked by a lack of a square-like wave. In a plurality of embodiments, high to low transition of a digital communication, a wave or an electronic signal indicates or signifies a data bit 210, a bit 215 or a bit 220. In a number of embodiments, low to high transition of a digital communication, a wave or an electronic signal indicates or signifies a data bit 210, a bit 215 or bit 220. In a plurality of embodiments, a missing, or a lack of, high to low transition of a digital communication, a wave or an electronic signal indicates or signifies a data bit 210, a bit 215 or a bit 220. In a number of embodiments, a missing, or a lack of, low to high transition of a digital communication, a wave or an electronic signal indicates or signifies a data bit 210, a bit 215 or bit 220.

Duty cycle of period 205, in some embodiments, is defined as amount of data bits 215 having a value of 1 within a period 205. Duty cycle of period 205, in other embodiments, is defined as amount of data bits 215 having a value of 0 within a period 205. Duty cycle of period 205, in many embodiments, is defined as amount of data bits 215 having any value. In many embodiments, duty cycle of period 205 signifies or defines intensity light source 110 should emit light with. In a number of embodiments, light source 110B with a master status transmits information to light source 110A with a slave status, wherein duty cycle of period 205 of the transmitted information signal, signifies or defines intensity instructions for light source 110A. Light source 110A, in some embodiments, in response to the duty cycle of period 205 of the transmitted information signal adjusts, changes or amends intensity of the light emitted. Light source 110A, in a number of embodiments, in response to the duty cycle of period 205 of the transmitted information signal maintains or remains unchanged intensity of the light emitted. In many embodiments, duty cycle of a signal or an information is related to the intensity of the light to be emitted by a light source 110 receiving the signal or the information. In a plurality of embodiments, duty cycle of a signal or an information is proportional to the intensity of the light to be emitted by a light source 110 receiving the signal or the information. In many embodiments, duty cycle of a signal or an information is inversely proportional to the intensity of the light to be emitted by a light source 110 receiving the signal or the information.

In some embodiments, a duty cycle may be comprised within a time interval of a signal transmitted between two or more lighting system components. The duty cycle within a time interval may be ratio or a fraction of a duration of time within which signal has a certain value to the entire duration of the time interval 205. In some embodiments, the duty cycle is a duration of time within a time interval 205 for which the signal has high values, such as a digital value 1 in digital signals for example, over the entire duration of the time interval 205. In some embodiments, duty cycle is a fraction of time within a time interval 205 for which the signal has a high value over the entire duration of the time interval 205. The duty cycle within a time interval, in some embodiments, may be ratio or a fraction of a time within a time interval 205 for which signal is low values, such as a digital value 0 in digital signals for example, over the entire duration of the time interval 205. In some embodiments, duty cycle is a fraction of time within a time interval 205 for which the signal has a low value over the entire duration of the time interval 205. Sometimes, the duty cycle may comprise a plurality of portions. Sometimes, each of the portions of the plurality of portions of the duty cycle of the signal may further comprise a duration of the duty cycle. In some embodiments, a duty cycle of a time interval may be a ratio of total amount of time for which the signal within the time interval 205 was high to the total time interval 205 duration. For example, a duty cycle may comprise a duration of time within which a plurality of separated data bits 215 having high values are dispersed within a time interval 205 and separated from each other by portions of time interval 205 which does not comprise high values. Therefore, a duty cycle may be the duty cycle of the entire time interval 205, regardless of the number of portions of time within the time interval 205 for which signal was high or low and regardless of whether the signal having certain values is separated by portions of the signal having certain other values.

In some embodiments, a length of a period 205 is adjusted to modulate intensity of a light source 110 receiving the information. In a number of embodiments, a length of a preceding or a succeeding period 205 is adjusted to modulate intensity of a light source 110 receiving the information. Sometimes, an instruction in a preceding period 205 causes a duty cycle of the preceding period 205 to temporarily increase the light intensity. In such embodiments, a period 205 succeeding the preceding period 205 is adjusted to compensate for the duty cycle in the preceding period 205 and maintain intensity or brightness of light to be emitted unchanged. In many embodiments, an instruction in a preceding period 205 causes the duty cycle of the preceding period 205 to temporarily decrease the light intensity. In such embodiments, a period 205 succeeding the preceding period 205 is adjusted to compensate for the duty cycle in the preceding period 205 and adjust the duty cycle in the succeeding period 205 to maintain intensity or brightness of light to be emitted unchanged or as intended. In a number of embodiments, lighting system 100 component transmitting or sending information or communication to another lighting system 100 component maintains a queue of data to be sent. In a number of embodiments, period 205 or amount of data bits 215 or instruction bits 220 is adjusted or changed to compensate for the information queued.

In a plurality of embodiments, lighting system 100 comprises one or more lighting system 100 components, such as light source 110, receiving, reading, interpreting or understanding information transmitted via data bits 215 or instruction bits 220. In many embodiments, lighting system 100 comprises one or more lighting system 100 components not receiving, reading, interpreting or understanding information transmitted via data bits 215 or instruction bits 220. In some embodiments, lighting system 100 comprises one or more lighting system 100 components receiving, reading, interpreting or understanding duty cycle of a period 205. In many embodiments, lighting system 100 comprises one or more light sources 110 which in response to understanding duty cycle of period 205 adjust intensity of the one or more light sources 110. In some embodiments, lighting system 100 comprises one or more light sources 110 which in response to understanding duty cycle of period 205 maintain intensity of the one or more light sources 110.

FIG. 2A and FIG. 2B, in some respect, illustrate embodiments of a lighting system 100 wherein duty cycle within any of a plurality of concatenated periods 205 remains equal with or without instruction bits 220. In such embodiments, light source 110B controls intensity of light source 110A by transmitting within any period 205 a duty cycle having a specific time duration. Time duration of a duty cycle may be defined or specified by a number of bits, number of bits having a value 1 or a value 0. In some embodiments, time duration of a duty cycle is defined or specified by a number of bits transmitted within a period 205. In many embodiments, time duration of a duty cycle is defined or specified by a number of bits having a value of 1 transmitted within a period 205. In some embodiments, communication or information transmitted using a duty cycle may be referred to as pulse width modulation.

Figure 3:
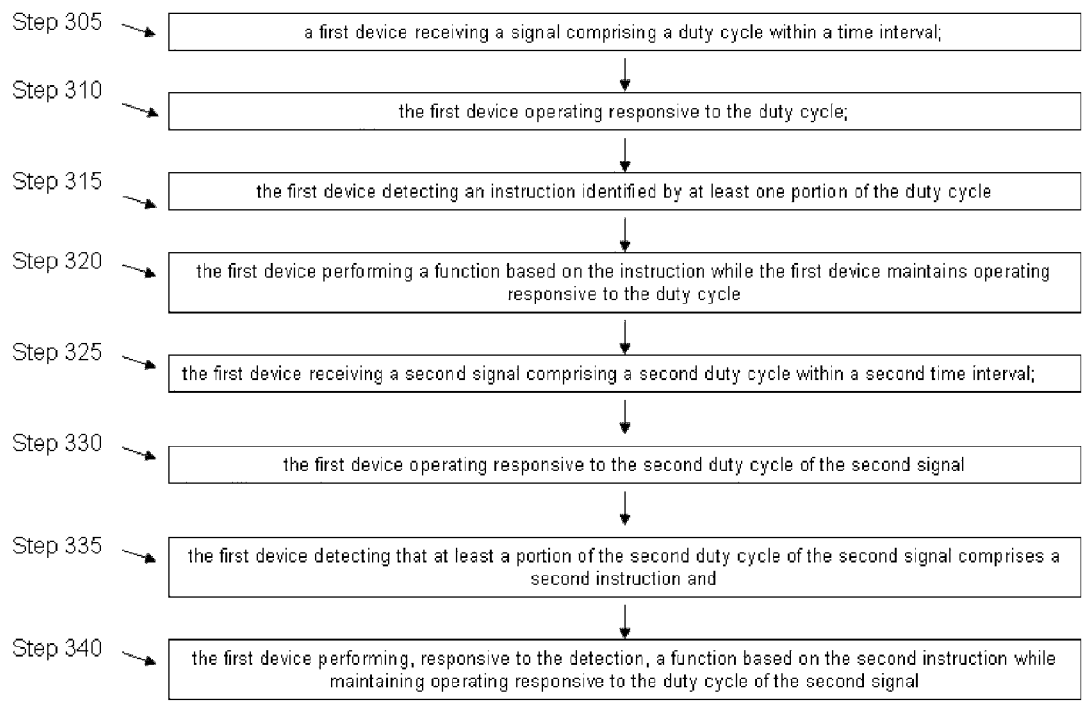
FIG. 3 is a flow chart illustrating steps of a method for communicating between devices using a duty cycle of a signal.

Referring now to FIG. 3, a flow chart of a method for communicating between devices using a duty cycle of a signal is illustrated. In some embodiments, FIG. 3 also relates to a method for communicating between devices using a duty cycle of a signal while a device maintains operation which is responsive to the duty cycle. In brief overview of method 300, at step 305 a first device receives a signal comprising a duty cycle within a time interval. The duty cycle may comprise a plurality of portions and each of which may further comprise a duration of the duty cycle. At step 310 the first device operates responsive to the duty cycle. At step 315 the first device detects an instruction identified by at least one portion of the duty cycle. At step 320 the first device performs a function based on the instruction while the first device maintains operating responsive to the duty cycle. At step 325 the first device receives a second signal comprising a second duty cycle within a second time interval. The second duty cycle of the second signal may comprise a plurality of portions and each of the plurality of portions of the second duty cycle of the second signal may further comprise a duration of the second duty cycle. At step 330 the first device operates responsive to the second duty cycle of the second signal. At step 335 the first device detects that at least a portion of the second duty cycle of the second signal comprises a second instruction. At step 340 the first device performs, responsive to the detection, a function based on the second instruction while maintaining operating responsive to the duty cycle of the second signal.

At step 305 of the method 300 a first device receives a signal comprising a duty cycle within a time interval. In some embodiments, the first device receives a signal from a second device 110. In many embodiments, the first device receives a plurality of signals from a plurality of devices 110. In some embodiments, the first device receives a signal from a controller, a switch or a source external to the lighting system 100. In various embodiments, the first device receives a signal via a wireless link. In a number of embodiments, the first device receives a signal comprising a plurality of duty cycles within a time interval. In various embodiments, the first device receives a signal comprising a plurality of duty cycles within a time interval, the plurality of duty cycles comprising portions of the signal having high values whose sum defines the total duty cycle of the time interval.

At step 310 the first device operates responsive to the duty cycle. In some embodiments, the first device operates in any manner and at any time, in response to the duty cycle. The first device, also referred to as a device 110, may perform any operation which is responsive to, or modified by the duty cycle of the signal. In some embodiments, the first device spins a motor and a rotational speed or an acceleration of the motor spin is controlled by the duty cycle. In a plurality of embodiments, the first device operates an engine which performs or runs in response to the duty cycle of the signal. In many embodiments, the first device operates an emission of light having an intensity, wherein the intensity is responsive to, modified by, or related to the duty cycle. Sometimes, the first device emits a light having a specific feature, such as a pulse of light, periodicity of pulse, wavelength of light, phase of light, spectral range of light emitted or even power of light, and any of which may be modulated or be responsive to the duty cycle of the signal. The first device may receive a signal comprising a duty cycle within a time interval 205 of the signal and perform a function or an operation modulated, controlled or instructed by the duty cycle within the time interval 205 of the signal. In some embodiments, the first device operates a second device in response to the duty cycle. In many embodiments, the first device operates a plurality of devices in response to the duty cycle. The plurality of devices may perform as instructed by the duty cycle of the signal received by the first device. In some embodiments, the first device operates based on a threshold or a plurality of thresholds of the duty cycle. The duty cycle may be within or past a threshold point which defines an action or an operation which the first device has to perform. For example, the first device may receive a signal having a duty cycle within a threshold range for which the first device does not perform any function, such as the device is shut off or on standby. In a number of embodiments, the first device receives a signal having a duty cycle within a threshold range for which the first device emits a light at a specific intensity or brightness. In many embodiments, the duty cycle of a signal received is within a threshold range which defines a spin speed of a motor, an intensity range of a light source, a wavelength range of a light source, a power output, a current output, a voltage output, or any other operation by any other device.

At step 315 the first device detects an instruction identified by at least one portion of the duty cycle. The first device may detect an instruction using any number of components, units or functions capable of detecting, decoding and processing instructions. In some embodiments, the communicator 125 or the controller 120 detects an instruction comprising instruction bits 220, data bits 215 or any data 210. In a number of embodiments, the first device detects an instruction using a function, structure or an unit of the first device for intercepting and decoding the instruction. The instruction, in such embodiments, may be a codeword, a number of data bits or a pattern of data bits. In some embodiments, the first device detects an instruction using a detector which detects or decodes the signal. The detector may observe, monitor or detect instructions by monitoring a portion of a signal within a predetermined time interval within the time interval 205. The detector may observe, monitor or detect instructions by monitoring a data bits 215 or instruction bits 220 of the signal within a predetermined time interval within the time interval 205. In some embodiments, the first device detects an instruction by receiving, decoding or monitoring any data bits 215, 220 or 210 which are within a predetermined portion of a time interval 205 of the signal. In some embodiments, the first device detects an instruction by recognizing, reading or detecting a portion of a signal within a predetermined portion of a time interval 205, or period 205. In a plurality of embodiments, the first device detects instructions by observing a specific portion or a specific plurality of portions of the time interval 205 of the signal. In many embodiments, the instruction is detected by the first device which observes a latter portion of the time interval to search for instruction bits. The first device may detect a codeword, a digital pattern or an instruction comprising any number of data bits 215, which may be positioned within any portion of specific time interval within the time interval 205. In a variety of embodiments, a portion of the duty cycle of the signal comprises a portion of the instruction. In many embodiments, the first device detects that at least a portion of the duty cycle of the signal comprises a portion of the instruction.

At step 320 the first device performs a function based on the instruction while the first device maintains operating responsive to the duty cycle. In some embodiments, the first device performs any type and form of function or operation while maintaining operating of the first device responsive to the duty cycle. In some embodiments, the first device performs any type and form of function or operation while maintaining operating of a second device responsive to the duty cycle. In some embodiments, the first device performs any type and form of function or operation while maintaining operating of a plurality of devices responsive to the duty cycle. In some embodiments, the first device performs a function based on the instruction without maintaining operating responsive to the duty cycle. In some embodiments, the first device instructs a second device to perform a function and operates, or maintains operating, of the second device in response to the duty cycle. In some embodiments, the first device was emitting light having an intensity, brightness or pulse frequency as instructed by the previous duty cycle and upon receiving the signal and the duty cycle of the signal, the first device maintains the intensity, the brightness or the pulse frequency of the light emitted as instructed by the duty cycle of the signal. In a variety of embodiments, the first device was operating any one, or any combination of: a light source, a motor, an engine, a power supply or a unit supplying electrical power as instructed by the previous duty cycle as instructed by previous duty cycles, and upon receiving the duty cycle of the signal, the first device maintains operating of the light source, the motor, the engine, the power supply or the unit supplying electrical power of the light emitted as instructed by the duty cycle of the signal. The function may be any action executed upon receiving an instruction, such as for example, turning on or off of a first device. In some embodiments, the function is setting an intensity of the light emitted by the first device. In a plurality of embodiments, the function performed is setting a status, such as a master or a slave status to the first device. In a variety of embodiments, the function performed is processing a communication, data or a command comprised by the instruction. In a number of embodiments, the function is any function or any operation performed by the first device or any device 110, or any lighting system component described herein. In some embodiments, the first device performs the function based on the instruction and maintains operating of the first device responsive to the duty cycle. Operating may refer to performing operation of any device 110 or any function or operation of any lighting system 100 component described herein.

At step 325 the first device receives a second signal comprising a second duty cycle within a second time interval. In some embodiments, the first device receives a second signal which is a signal immediately following the signal. In some embodiments, the second duty cycle of the second signal comprises a plurality of portions. Each of the plurality of portions of the second duty cycle of the second signal may further comprise a duration of the second duty cycle. A second signal may comprise any functionality or any characteristics of the first signal. In some embodiments, the second signal is identical or substantially similar to the first signal. In a variety of embodiments, the second signal comprises a second duty cycle which is different than a first duty cycle. In many embodiments, the second duty cycle is the same as the first duty cycle. The plurality of portions of the second duty cycle may comprise any number of data bits 215 comprising any number of digital portions of the signal having high or low values. The second duty cycle may comprise a plurality of portions which are similar or identical to the plurality of portions of the first duty cycle. The plurality of portions may comprise a portion of a time interval 205 within which a signal has a high value for the cases in which high value is the active value of the signal, or low value for the cases in which the low value is the active value of the signal. The second time interval may be same as the time interval or any other previous time interval 205 in the chain of time intervals 205. In some embodiments, the second time interval is a different time interval than the time interval, or the preceding time interval 205. In a number of embodiments, the second time interval is a longer period of time than the time interval. In a plurality of embodiments, the second time interval is a shorter period of time than the time interval.

At step 330 the first device operates responsive to the second duty cycle of the second signal. The first device operating responsive to the second duty cycle of the second signal may be similar to the first device operating responsive to the duty cycle of the signal. In a number of embodiments, the first device operates or performs an operation of the first device or any other device 110 in response to the duty cycle of the signal received. In many embodiments, the second duty cycle of the second signal is different than the duty cycle of the signal. The first device may change or modify the operating of, or operation performed by, the first device, the second device or any device which operates in response to the second duty cycle of the second signal. In a number of embodiments, the first device instructs a second device or a plurality of devices to perform in response to the second duty cycle of the second signal. The operating may comprise emitting a light having a specific brightness, intensity, spectral range or pulse duration. In a variety of embodiments, the operating comprises supplying electricity or power to a component or a plurality of components of the first device or any number of devices 110, the electricity or power responsive to the duty cycle or the second duty cycle.

At step 335 the first device detects that at least a portion of the second duty cycle of the second signal comprises a second instruction. The first device may detect the second instruction in a same way as detecting the instruction. In many embodiments, the second instruction is detected differently than the first instruction. In a number of embodiments, the second instruction comprises a number of data bits 215 positioned within a specific time interval within time interval 205. In a variety of embodiments, a portion of the second duty cycle of the second signal comprises a portion of the second instruction. In many embodiments, the first device detects that at least a portion of the second duty cycle of the second signal comprises a portion of the second instruction.

At step 340 the first device performs, responsive to the detection, a function based on the second instruction while maintaining operating responsive to the duty cycle of the second signal. In some embodiments, the first device performs a function based on the second instruction without maintaining operating responsive to the second duty cycle. The function may be any action executed upon receiving an instruction. In a number of embodiments, the function is any function or any operation performed by the first device or any other device 110 described herein. In some embodiments, the first device performs the function based on the second instruction and maintains operating of the first device responsive to the second duty cycle. In a variety of embodiments, the first device performs the function based on the second instruction and maintains operating of a second device responsive to the second duty cycle. Sometimes, the first device performs the function by any device 110 based on the second instruction for any device 110 and maintains operating of any device 110 in response to the second duty cycle. In some embodiments, the first device instructs a second device to perform a function and operates or maintains operating of the second device in response to the second duty cycle. Operating may refer to performing operation of any device 110 described herein.

C. Status Assignment of Lighting System Components

Further referring to figures FIG. 2A and FIG. 2B discussed in the earlier sections, FIGS. 2A and 2B further refer to embodiments within which light sources 110 may transmit among each other instructions to assign statuses of masters and slaves. In one example, a first lighting system 100 component, such as a lighting device 110 may have a status of a master. The master first lighting device 110 may transmit a first information using data bits 215 or 220 to a second lighting system 100 component, such as a second lighting device 110. The second lighting device component having a slave status. The second lighting system 100 component receives the first information and in response to the first information adjusts the status of the second lighting system 100 component to a master status. The second lighting system 100 component having a master status transmits a second information using data bits 215 or 220 to the first lighting system 100 component. The first lighting system 100 component receives the second information and in response to the second information adjusts the status of the first lighting system 100 component to a status of a slave.

In some embodiments, light source 110B, having a master status, transmits a first information using data bits 215 or instruction bits 220 to light source 110A which has a slave status. Light source 110A receives the first information and in response to the first information adjusts the status of the light source 110A to a master status. Light source 110A, having a master status, transmits a second information using data bits 215 or instruction bits 220 to the light source 110B. Light source 110B receives the second information and in response to the second information adjusts the status of the first light source 110B to a slave status. In a number of embodiments, light source 110A, having a master status, transmits a third information via data bits 215 or instruction bits 220 to a plurality of lighting system components, one of which is light source 110B. The third information transmitted by light source 110A comprises address 127B. The plurality of lighting system components receive the third information and light source 110B receives the third information. Light source 110B matches address 127B within the third information to address 127B of the light source 110B. In some embodiments, light source 110B, in response to the third information, adjusts the status of light source 110B to a status of a master. In a number of embodiments, light source 110B, in response to the address 127B matching the address 127B of the light source 110B, adjusts the status of light source 110B to a status of a master. In a plurality of embodiments, light source 110B, in response to the received third information and in response to the address 127B matching the address 127B of the light source 110B, adjusts the status of light source 110B to a status of a master.

In some embodiments, a plurality of light sources 110, each having a status of a master or a slave, communicate using a same connection 105 component, such as a wire or an electrical current conducting line. In such embodiments, any of the light sources 110 may become a master or a slave. Sometimes, the plurality of light sources 110 communicating over a same connection 105 component include only a single master, while all other light sources 110 have a status of a slave. In such embodiments, one of the light sources 110 having a status of a slave pulls the voltage potential within the connection 105 component low for a period of time, such as a microsecond, a millisecond or a second. The light source 110 having a status of a master interprets the low voltage signal in the connection 105 component as a signal to change status from master to slave. The light source 110 having a status of a master accepts the status of a slave, and the light source 110 which pulled the voltage potential low accepts the status of a master. Thus the signal across the connection 105 component signals a change in the status of one or more light sources 110 communicating over the same connection 105 component. In some embodiments, the signal that changes the status of one or more lighting system components may be a high voltage potential signal, a low voltage signal, an impulse, a digital pattern, a ground signal, or any other analog or digital signal transmitted over connection 105.

In a number of embodiments, when a group of light sources 110 are all off, upon being turned on, each one of the group of light sources 110 turns on with a status of a master. In some embodiments, upon receiving a signal that a light source 110 having a master status, also called a master, already exists, a light source that has just turned on changes its own status to a status of a slave. Thus, when a group of light sources 110 are all turned on at once it is ensured that at least one master exists. In some embodiments, light source 110 upon turning on and automatically changing its own status to a master, the light source 110 listens for a period of time if there is another master on the network. If the light source 110 does not receive any messages that there is another master on the network, the light source 110 remains the master.

In some embodiments, a lighting system 100 component receiving instruction from a sender assembles received bits 215 from a plurality of periods 205. In some embodiments, the lighting system 100 component receiving information from a sender parses the bits and bytes of the received information and forms instruction, data or commands. In a plurality of embodiments, lighting system 100 component receiving instruction from a sender interprets the forms instructions, data or commands and implements the same formed instructions, data or commands.

Therefore, in many embodiments, lighting system 100 components use bidirectional digital pulse width modulated communication to transmit and receive information. Furthermore, in some embodiments, lighting system 100 components use digital pulse width modulated communication to control performance and functionality of one or more lighting system 100 components. Light brightness, also referred to as intensity, in many embodiments is controlled, communicated or instructed using a pulse width modulated communication. In many embodiments, light brightness or intensity is controlled, communicated or instructed using a duty cycle of a period 205. Pulse width modulated signals may therefore be referred to as transport mechanism of the digital communication between lighting system 100 components.

D. Lighting System Intensity Control With Digital Patterning

In addition to previously discussed embodiments, FIG. 2A and FIG. 2B also include applications relating control of intensity of light sources 110 using digital patterns. A digital pattern may be any order or any formation of any number of data 210 or data bits 215. In some embodiments, a digital pattern is an order or a formation of any number of data bits 215 or instruction bits 220 within a 205. In many embodiments, a digital pattern is an order or a formation of any number of data bits 215 or instruction bits 220 within any number of periods 205. In numerous embodiments, a digital pattern is an order or a formation of any number of data bits 215 or instruction bits 220 within a plurality of concatenated periods 205. In some embodiments, a digital pattern comprises data bits having values of either 1 or 0. Sometimes, digital pattern comprises a set or a predetermined number of data bits 215. In some embodiments, digital pattern comprises a number of data bits not predetermined. In many embodiments, digital pattern comprises a number of data bits 215 or instruction bits 220 which is equal over all periods 205. In a number of embodiments, digital pattern comprises a number of data bits 215 or instruction bits 220 which changes between a first period 205 and a second period 205, the second period 205 immediately following the first period 205. In a plurality of embodiments, a digital pattern is any order of any number of data bits 215 or instruction bits 220 within a period 205. In many embodiments, digital pattern affects duty cycle of a period 205. In numerous embodiments, digital pattern defines a duty cycle of a period 205. In various embodiments, digital pattern is defined using pulse width modulated digital signals.

In some embodiments, digital pattern is any order of eight bits, such as data bits 215 or instruction bits 220, each bit having either a value of 1 or a value of 0. In many embodiments, digital pattern is any order of four bits, each bit having either a value of 1 or a value of 0. In many embodiments, digital pattern is any order of sixteen bits, each bit having either a value of 1 or a value of 0. In numerous embodiments, digital pattern is any order of any number of data bits 215 or instruction bits 220, each bit having a value of 1 or a value of 0. In a plurality of embodiments, a bit having a value of 1 corresponds to a voltage signal which is larger than a voltage signal corresponding to a bit having a value of 0. In some embodiments wherein eight data bits 215 or instruction bits 220 are used for 8-bit digital patterning, seven sequences or distinct digital patterns are utilized or created. In a plurality of embodiments wherein eight data bits 215 or instruction bits 220 are used for 8-bit digital patterning, any number of sequences or distinct digital patterns are utilized or created.

In a plurality of embodiments, a first lighting system 100 component transmits information comprising an intensity instruction encoded using a digital pattern to a second lighting system 100 component. In such embodiments, a number of data bits 215 having a digital value of 1 within a number of periods 205 define the intensity of the light to be emitted by the second lighting system 100 component. The second lighting system 100 component receives the information and based on the number of data bits 215 with a digital value of 1 adjusts the intensity of the light emitted from the second lighting system 100 component. In many embodiments, a number of data bits 215 having a digital value of 0 within a number of periods 205 define the intensity of the light to be emitted by the second lighting system 100 component. The second lighting system 100 component receives the information and based on the number of data bits 215 with a digital value of 0 adjusts the intensity of the light emitted from the second lighting system 100 component. In some embodiments, information relating instruction for intensity of the light to be emitted comprises a periodic square wave signal. The periodic square wave signal may turn on or off and the proportion of the time the signal is on and the proportion of the time the signal is off may define the duty cycle. In some embodiments, duty cycle is directly proportional to the intensity of the light to be emitted. In a number of embodiments, duty cycle defines the intensity of the light the instruction instructs to be emitted from the lighting system 100 component receiving the instruction. In a number of embodiments, duty cycle of one or more of periods 205 is constant. In a plurality of embodiments, duty cycle of a third one of a group of concatenated periods 205 may vary, but duty cycles from other periods 205 from the group of concatenated periods 205 adjust to compensate for the third one of a group of concatenated periods 205.

Referring now to FIG. 4A an embodiment of an 8-bit digital pattern transmission is illustrated. In FIG. 3A, light source 110A is connected to light source 110B via connection 105. Connection 105 transmits information or communication transmitted between light sources 110A and 110B. FIG. 4A illustrates digital data transmitted between light sources 110A and 110B divided into 8-bit periods 305. 8-bit period 305, in some embodiments, is a period 205 whose time length is tailored to allow transmission of 8 bits of data 215 within the period 205.

8-bit period 305, in some embodiments, is a period 205. In many embodiments, 8-bit period 305 is a period of time defined or determined by how many bits of data one or more lighting system 100 components use in a single instruction or a single instruction set. In a number of embodiments, 8-bit period 305 is a period of time defined by, determined by, or corresponding to a duration of time within which lighting system 100 components communicated via connection 105 transmit 8 bits of data 210. In many embodiments, 8-bit period 305 is a period of time defined by, determined by, or corresponding to duration of time within which lighting system 100 components communicated via connection 105 transmit 8 data bits 215. In some, 8-bit period 305 is a period of time defined by, determined by, or corresponding to a duration of time within which lighting system 100 components communicated via connection 105 receive 8 bits of data 210. In numerous embodiments, 8-bit period 305 is a period of time defined by, determined by, or corresponding to a duration of time within which lighting system 100 components communicated via connection 105 receive 8 data bits 215.

In one of the embodiments illustrated in FIG. 3A, light source 110B transmits an 8-bit digital pattern within an 8-bit period 305. In some embodiments, light source 110B transmits a first 8-bit digital pattern having a single bit having a value of 1 and seven bits having values of 0 via network 105 to light source 110A. Light source 110A may receive the first 8-bit digital pattern and in response to receiving the first 8-bit digital pattern, may adjust the intensity of the light emitted by the light source 110A to match the intensity marked by the first 8-bit digital pattern. Sometimes, light source 110B transmits a second 8-bit digital pattern having a three bits having values of 1 and five bits having values of 0 via network 105 to light source 110A. Light source 110A may receive the second 8-bit digital pattern and in response to receiving the second 8-bit digital pattern, may adjust the intensity of the light emitted by the light source 110A to match the intensity marked by the second 8-bit digital pattern. In many embodiments, light source 110B transmits a third 8-bit digital pattern having a any number of bits having values of 1 and any number of bits having values of 0, the total amount of bits being eight, via network 105 to light source 110A. Light source 110A may receive the third 8-bit digital pattern and in response to receiving the third 8-bit digital pattern, may adjust the intensity of the light emitted by the light source 110A to match the intensity marked by the third 8-bit digital pattern.

Similar system may be accomplished using any number of bits for digital patterning, wherein the number of possible patterns are related to the number of bits the pattern has. In many embodiments, a digital pattern defines, determines or characterizes intensity of a light source 110. In some embodiments, light source 110B transmits a message having a duty cycle defined by a digital pattern of data bits 215 or instruction bits 220 to a light source 110A. Light source 110, in response receiving the message having a duty cycle defined by the digital pattern, adjusts the intensity, wavelength, pulse duration or any other operation of light source 110A.

Referring now to FIG. 4B an embodiment of a transmission of 16-data bits 215 per period 315 is illustrated. In FIG. 3B, light source 110A is connected to light source 110B via connection 105. Connection 105 transmits information or communication transmitted between light sources 110A and 110B. FIG. 4B illustrates embodiments where digital data transmitted between light sources 110A and 110B divided into 8-bit periods 305 and 16-bit periods 315. 8-bit period 305 is a period of time within which two 16-bit periods 315 may be defined. 16-bit period 315, in some embodiments, is a period 205 whose time length is tailored to allow transmission of 16 bits of data 215 within the period 205. In some embodiments, 16-bit period 315 is a half of time interval of an 8-bit period 305 for a similar system.

In some embodiments, lighting system 100 components, such as light source 110B and light source 110A, communicate using data bits 215, instruction bits 220 or a combination of data bits 215 and instruction bits 220. In many embodiments, lighting system 100 components communicate by sending information within predetermined concatenated time periods, such as 8-bit periods 305. Sometimes, lighting system components using 8-bit periods 305 are capable of transmitting or receiving information twice as fast. In such embodiments, lighting system components, such as light sources 110A and 110B 16 bit send or transmit a 16-bit digital pattern within an 8-bit period. In many embodiments, light source 110B communicates with light source 110A transmitting or receiving information within 8-bit periods 305. In many embodiments, light source 110B transmits a 16-bit digital pattern comprising data bits 215 or instruction bits 220 within an 8-bit period 305 to light source 110A. Light source 110A receives 16-bit digital pattern within the 8-bit period 305 and in response to the received 16-bit digital pattern adjusts, changes or maintains the intensity of the light emitted by the light source 110A.

In many embodiments, information transmitted may comprise any number of bits 215 or 220 within a period 205, 305 or 315. In a plurality of embodiments, information transmitted within a period 205, 305 or 315 comprises any amount of data 210 comprising any amount of bits 215 or 220, such as 4, 8, 16, 32, 64, 128 or any other number of bits. In a plurality of embodiments, periods 205, 305 or 315 of an information transmitted are increased or decreased to modulate average intensity of a light source 110 receiving the information. In a number of embodiments, preceding period 205, 305 or 315 is increased or decreased and succeeding period 205, 305 or 315 adjusts accordingly to maintain a desired intensity over a period of time of a plurality of periods 205, 305 or 315.

Digital patterns comprising any number of bits, in numerous embodiments, have duty cycles of periods 205, 305 or 315, defined by a number of bits having values of 1 or 0. In many embodiments, two different digital patterns comprising a same total number of bits within a period, such as period 205, 305 or 315, may have a same or a different duty cycle. In many embodiments, two different digital patterns comprising a different total number of bits within a period may have a same or a different duty cycle. In a variety of embodiments, a lighting system component controlling a light source 110 sends instructions for controlling intensity of the light source 110 via connection 105C, wherein the instructions comprise digital patterns whose duty cycle indicates the intensity of the light to be emitted from the light source 110.

In various embodiments, digital pattern comprising any number of bits is used to control intensity of a one or more light sources 100 having any number of spectral ranges. In many embodiments, lighting system 100 comprises a plurality of light sources 110 each emitting a light of a different spectral range or a different color. In a number of embodiments, lighting system 100 comprises a light source 110A emitting a red light, a light source 110B emitting a green light and a light source 110C emitting a blue light. Sometimes, a lighting system component controls the color rendering, or the color summation of all three light sources 110A, 110B and 110C by controlling intensity of each of the individual light sources 110. Sometimes, a lighting system component controls the total color output of the light emitted by all three light sources 110 by controlling intensity of each of the individual light sources 110. In a number of embodiments, a plurality of light sources 110A through 110N each emit light of a different spectral range or a different color. In such embodiments, a lighting system 100 component controlling the light sources 110A through 110N controls the color rendering or the total color output by light sources 110A through 110N by controlling intensity of each light source 110 of the plurality of light sources 110A through 110N.

E. Non-Contact Switch and Selection

Figure 5A:
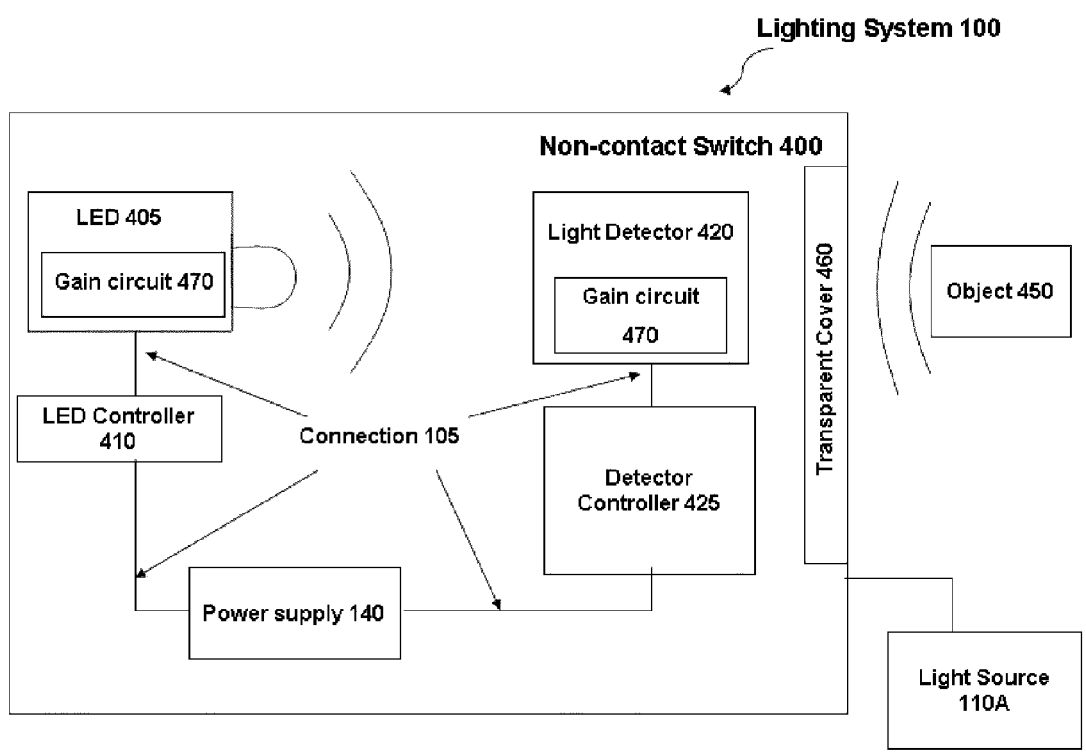
FIG. 5A is a block diagram of an embodiment an apparatus, such as a non-contact switch for selecting and controlling one or more light sources.

Referring now to FIG. 5A, an embodiment of a non-contact selection and control device of a lighting system 100 is illustrated. FIG. 5A depicts a lighting system 100 comprising a non-contact device 400 or a light non-contact switch 400 that includes a light source LED 405, LED controller 410, power supply 140, light detector 420 and detector controller 425. The non-contact device 400 is in connection with one or more LED devices, such as lighting devices or sources 110 or any other components of the lighting system 100. LED 405 and light detector 420 further comprise gain circuit 470. LED 405 of the non-contact switch 400 is a light source that may emit an electromagnetic signal, such as a light, a wireless or an optical signal. LED 405 is controlled by a LED Controller 410 via a connection 105. The components of the non-contact device 400 may also be connected to a power supply 140. Non-contact switch 400 may further include a light detector 420 that may be connected to detector controller 425 via connection 105. The non-contact device 400 may detect an object 450 located outside of the light non-contact switch 400 by detecting any interference, effect or reflection of the signal emitted by LED 405 caused by the object 450. Object 405 may also generate or emit an electromagnetic or other type or form signal to be detected by the non-contact device 400. Light detector 420 of the non-contact device 400 may be controlled or modulated by the detector controller 425 in any number of configurations to detect the signal reflected or emitted by the object 450. Non-contact device 400 may transmit any detected signals to any number of lighting devices 110 or any other components of the lighting system 100.

Referring to FIG. 5A in further detail, non-contact switch 400 may be any device, apparatus or a unit comprising any type and form of hardware, software, or any combination of hardware and software for non-contact selection or detection by any object. In some embodiments, non-contact switch 400 is a light switch box or a light switch device or package. Non-contact switch 400 may be any unit, apparatus, system or a component detecting an object 450, a signal, a person or any living being within a distance from the non-contact switch. In further embodiments, non-contact switch 400 detects an object 450, a person or a living being without the object 450, the person or the living being touching the non-contact switch 400 physically. In still further embodiments, non-contact switch 400 detects an object 450, a person or a living being with the object 450, the person or the living being physically touching or nearly touching the non-contact switch 400. Non-contact switch 400 may comprise a box enclosing a LED 405, a light detector 420 or any other lighting system 100 component, or more specifically a light non-contact switch 400 component, such as those displayed in FIG. 5. In some embodiments, a non-contact switch 400 comprises, or is a component of a light fixture installed in a room. The non-contact device 400 may include any type of processor or processors configured to implement specialized functions for controlling, modulating or configuring any component of the non-contact device 400, such as the light detector 420 or LED 405. Non-contact device 400 may include any type and form of firmware or software instructions operating on the processor or the processors configured for controlling any of the non-contact device 400 components. In addition to the components illustrated by FIG. 5, non-contact switch 400 may further include any number of hardware components detecting of any type and form of object, person or a user located at any distance from the non-contact device 400. Non-contact device 400 may be used by a user to control one or more lighting devices, adjust brightness of the light emitted or to select specific lighting devices. In some embodiments, non-contact device 400 is used to select a particular light source 110 or a group of light sources 110 during the configuration the lighting system 100. In further embodiments, the user selects one or more light sources 110 to select or identify specific light sources to be configured a certain way, to be assigned a particular address or to be processed, programmed or controlled in a way determined by the system or the user.

Transparent cover 460 may be any portion of non-contact switch 400 comprising a material that is transparent to a portion of the light emitted by LED 405. Non-contact switch 400 may comprise an enclosure that may further include any number of additional components, such as the transparent cover 460. In some embodiments, transparent cover 460 comprises a material transparent in the visible or infrared range, such as for example, a glass, a clear plastic or a plexiglass cover. Transparent cover 460 may further comprise any other material that is transparent or semi-transparent to any light or signal emitted by the LED 405. The transparent cover may comprise a filter that filters out wavelengths of light outside of a predetermined range. The transparent cover may reflect a portion of a light, such as for example 0.01, 0.1, 1, 2, 3, 4, 5, 6, 7, 8, 9 or 10 percent of the light, or any other percentage of light between 10 and 90 percent that reach the transparent cover 460. The transparent cover 460 may further include any component or a part of the non-contact switch 400 that reflects or is capable of reflecting signal emitted from the LED 405. Transparent cover 460 may be opaque to any wavelength of light aside from the light emitted by the LED 405. Transparent cover 460 may comprise an optical filter, filtering, absorbing or reflecting some wavelengths of light and allowing others to pass through. Transparent cover 460 may be positioned on the enclosure of the non-contact switch 400 to reflect a specific portion of light from the LED 405 towards the light detector 420. Transparent cover 460 may comprise a reflective coating to ensure a specific reflectivity, or a reflectivity of a specific percentage or portion of the signal from LED 405. In some embodiments, transparent cover 460 comprises a reflective surface, such as a mirror for example. Transparent cover may be positioned anywhere within the non-contact switch 400 or outside of the switch 400. In some embodiments, transparent cover 460 is a component of the enclosure of the non-contact switch 400.

Transparent cover 460 may allow only a portion of light to propagate through the transparent cover while reflecting a fraction of the light. In some embodiments, transparent cover reflects between 10 and 20, 20 and 30, 30 and 40, 40 and 50, 50 and 60, 60 and 70, 70 and 80, 80 and 90 and 90 and 99.99 percent of the signal. The transparent cover may also propagate, transmit or allow transmission of any portion of the signal such as for example, 99.99 and 95, 95 and 90, 90 and 80, 80 and 70, 70 and 60, 60 and 50, 50 and 40, 40 and 30, 30 and 20, 20 and 10, or 10 and 0.01 percent of the signal. In some embodiments, the transparent cover reflects between about 0 and 1 percent of light, such as for example 0.2, 0.4, 0.6 or 0.8 percent of light emitted by the LED 405 reaching the transparent cover. In some embodiments, the transparent cover reflects between about 1 and 2 percent of light, such as for example 1.2, 1.4, 1.6 or 1.8 percent of light emitted by the LED 405 reaching the transparent cover. In some embodiments, the transparent cover reflects between about 2 and 3 percent of light, such as for example 2.2, 2.4, 2.6 or 2.8 percent of light emitted by the LED 405 reaching the transparent cover. In some embodiments, the transparent cover reflects between about 3 and 4 percent of light, such as for example 3.2, 3.4, 3.6 or 3.8 percent of light emitted by the LED 405 reaching the transparent cover. In some embodiments, the transparent cover reflects between about 4 and 5 percent of light, such as for example 4.2, 4.4, 4.6 or 4.8 percent of light emitted by the LED 405 reaching the transparent cover. In some embodiments, the transparent cover reflects between about 5 and 6 percent of light, such as for example 5.2, 5.4, 5.6 or 5.8 percent of light emitted by the LED 405 reaching the transparent cover. In some embodiments, the transparent cover reflects between about 6 and 7 percent of light, such as for example 6.2, 6.4, 6.6 or 6.8 percent of light emitted by the LED 405 reaching the transparent cover. In further embodiments, the transparent cover reflects between about 7-10 percent of light emitted by the LED 405. In further embodiments, the transparent cover reflects between about 10 and 20 percent of light, or between 20 and 30, 30 and 40, 40 and 50, 50 and 60, 60 and 70, 70 and 80, 80 and 90 or 90 and 99.99 percent for example. Transparent cover 460 may comprise any component, or any group of components of the non-contact switch 400 that reflect, refract, permeate or propagate any portion of the signal emitted by LED 405.

LED 405 of the non-contact device 400 may be any type and form of an apparatus, component or a device emitting or producing an electromagnetic signal. LED 405 may be positioned or deployed anywhere within or around any lighting system 110 component. In some embodiments, LED 405 is light source 110. In other embodiments, LED 405 is a semiconductor light emitting diode. In further embodiments, LED 405 is a component producing a wireless signal. In still further embodiments, LED 405 is a unit producing a radio or an RF (radio frequency) signal. LED 405 may emit or generate an electromagnetic wave of any wavelength, power or spectral range. In still further embodiments, LED 405 is an infra red light emitting diode or source. LED 405 may be a light emitting source that emits light of constant intensity or varying intensity. In some embodiments, LED 405 is a light emitting diode emitting a time dependent intensity or power varying signal. In further embodiments, LED 405 is a flickering light emitting device. LED 405 may emit an amplitude modulated, frequency modulated, phase modulated, pulse width modulated or any signal or output of single or multi-level modulation scheme or type. LED 405 may further comprise any number of light sources or light emitting devices. In some embodiments, LED 405 comprises an array of light emitting diodes, laser diodes, lamps, bulbs or any other type or form of electromagnetic wave emitting devices. LED 405 may include a number of similar or different light emitting devices, sources, diodes or any other components which may or may not be associated with a light source 110.

Different light sources within the LED 405 may emit signals at different power ranges, different spectral ranges, different intensities and signals with no modulations or signals modulated with various types of modulation schemes. LED 405 may further include a second light emitting source emitting a light signal intended to help control or modulate the gain circuitry, such as gain circuit 470, of the light detector 420. The noise signal light source may emit light at a specific average intensity and a specific spectral range to maintain the gain feedback circuitry, such as the gain circuit 470, of the light detector 420 within a specific sensitivity range. Such sensitivity range of the light detector 420, based on the intensity and the spectral range of the signal, may enable the light detector 420 to detect an object 450 at a specific distance or distance range from the non-contact device 400. The total light of the LED 405 may include the first light source emitting the modulated and controlled signal and the second light source emitting the noise or the background signal for modulating the gain of the light detector 420. In some embodiments, LED 405 includes two or more LED 405 components, each of which may include any functionality or embodiment of any other LED 405.

LED 405 may include any number of sources that emit pulsed signals at a specific frequency or at a number of specific frequencies or frequency ranges. For example, light emitted by one or more sources of the LED 405 may have a spectral ranges in the visible, near infra red, infra red or far infra red range. The light emitted may also be modulated in bursts or pulses occurring for a specific duration of time at a specific frequency or a range of frequencies. In some embodiments, light emitted may be random and constant light. In further embodiments, signal comprises light in x-ray range, visible range, near infrared range, mid infrared range, a far infrared range or radio wavelength range.

The signal may comprise light having any spectral range, such as between 1 and 5 nanometers, 5 and 10 nanometers, 10 and 15 nanometers, 15 and 20 nanometers, 20 and 25 nanometers, 25 and 30 nanometers, 30 and 40 nanometers, 40 and 60 nanometers, 60 and 80 nanometers, 80 and 100 nanometers, 100 and 400 nanometers or 400 and 2000 or more nanometers. In still further embodiments, signal comprises pulses or bursts of signal which may occur at a carrier frequency. The carrier frequency may be any frequency, such as for example, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 kilohertz. In still further embodiments, the carrier frequency may include any frequency between 100 hertz and 1 kilohertz, 1 kilohertz and 5 kilohertz, 5 kilohertz and 20 kilohertz, 20 kilohertz and 50 kilohertz, 50 kilohertz and 70 kilohertz, 70 kilohertz and 150 kilohertz, 150 kilohertz and 300 kilohertz, 300 kilohertz and 1 megahertz, 1 megahertz and 10 megahertz, 10 megahertz and 100 megahertz, or 100 megahertz and 1000 megahertz. The signal may comprise modulation such as frequency, phase, amplitude or pulse width modulation. In some embodiments, the carrier frequency of the signal is in the range of 30-35 kilohertz. In further embodiments, the signal has a carrier frequency of 35-40 kilohertz. In still further embodiments, the signal has a carrier frequency of 40-45 kilohertz. In yet further embodiments, the signal has a carrier frequency of 45-100 kilohertz. The signal may be emitted within any conical angle from the LED, such as between 1 and 3 degrees, 3 and 5 degrees, 5 and 10 degrees, 10 and 20 degrees, 20 and 30 degrees, 30 and 40 degrees, 40 and 50 degrees, 50 and 60 degrees, 60 and 70 degrees, 70 and 80 degrees, 80 and 90 degrees, 90 and 100 degrees, 100 and 110 degrees, 110 and 120 degrees, 120 and 130 degrees, 130 and 140 degrees, 140 and 150 degrees, 150 and 180 degrees, 180 and 220 degrees, 220 and 250 degrees, 250 and 270 degrees and 270 and 360 degrees. In a plurality of embodiments, LED 405 emits pulses of light wherein the pulses occur within any frequency range. In some embodiments, LED 405 emits pulses of light wherein the pulses have a specific duty cycle. In some embodiments, LED 405 emits an electromagnetic signal that is modulated and controlled by LED controller 410. In some embodiments, LED 405 is positioned inside the non-contact switch 400. In other embodiments, LED 405 is positioned outside of the non-contact switch 400. In some embodiments, LED 405 is positioned or installed on or within a lighting device 110. In further embodiments, LED 405 is positioned near a lighting system 100 component, such as a lighting device 110. In still further embodiments, LED 405 is positioned on a wall of a room that is illuminated by a lighting device 110.

Gain circuit 470 may be any hardware, software or a combination of hardware and software that controls, modulates or maintains performance or operation of LED 405 or light detector 420. Gain circuit 470 may include logic circuits, or software operating on one or more processors to control or manage how signals from the LED 405 are detected by light source 410. Gain circuit 470 may utilize a fraction of light reflected by the transparent cover 460 towards the light detector 420 to maintain the light detector 420 within a specific detection range. In some embodiments, gain circuit 470 manages or controls detection of light detector 410 of any signal, including the signal from the LED 405 or from any other light source, such as for example an emitter of object 450. In some embodiments, gain circuit may be comprised by any component of the non-contact switch 400, such as an LED 405, light detector 420, LED controller 410 or detector controller 425. Gain circuit 470 may be connected in a feedback loop with the light detector 420 or the LED 405.

The gain circuit 470 may maintain the light detector 420 at a specific detection threshold or detection range. The gain circuit may be configured to provide real-time adjustments to the light detector 420 so that the signal detected by the light detector 420 may be maintained within a specific operating range of the light detector 420. In some embodiments, the gain circuit 470 maintains a feedback loop with the light detector 420 to maintain the detecting range of the light detector 420 at a specific detection range, such as slightly below a threshold level of the detection of the light detector 420. As ambient light, such as background noise light, increases in intensity, the gain circuit 470 may compensate and adjust to still maintain the gain of the light detector 420 within the specific range. Following the adjustment by the gain circuit 470, light detector 420 would still adjust and maintain the sensitivity to the presence of object 450. For example, when there is a lot of ambient light in the room where non-contact switch 400 is installed, gain circuit 470 may decrease the gain of the light detector 420 to compensate for the increased ambient light. In the instance where the object 450 is brought within a specific distance from the non-contact device 400, the reflected portion of the LED 405 signal may increase the amount of the detected signal slightly above the threshold. The light detector 420 may then detect the presence of the object 450 as the threshold has been exceeded by the portion of the signal reflected by the object 450. Normally, the gain circuit 470 may compensate for any changes in ambient light by setting and maintain the light detector 420 within the detection range just below the detectable threshold. However, as the present object 450 reflects a substantial amount of light towards the light detector 420, the gain circuit 470 may not compensate for such a great increase in light intensity fast enough and the object 450 may be detected by the light detector 420. As such, gain circuit 470 may control the sensitivity of the signal detected by light detector 420 such that compensates for changes in ambient light or background noise but does not lose sensitivity to the presence of the object 450. The gain circuit 470 may control the light detector 420 such that the light detector 420 it is not oversensitive to detect the presence of the object 450 when the object 450 is not present within a predetermined distance from the non-contact device 400. The gain circuit of any of the LED 405, LED controller 410, detector controller 425 or light detector 420 may perform any functionality or include any embodiments of any of the gain circuits of the LED 405, LED controller 410, light detector 420 and detector controller 425.

In some embodiments, gain circuit 470 includes an average intensity filter, a frequency filter and a comparator. The average intensity filter of the gain circuit 470 may monitor the average intensity of the signal detected by the light detector 420. The average intensity filter may further filter out intensity of signal that is below or above a predetermined threshold intensity. In some embodiments, average intensity filter may only allow the signals that are within a predetermined range of the average intensities to pass through the filter. For example, if average intensity of light received by the light detector 420 is below a predetermined intensity threshold, the average intensity may filter out the signal. As such, the average intensity filter may filter out signals outside of the predetermined range. Just as with average intensity filter, the frequency filter of the gain circuit 470 may filter out any signal that is outside of a predetermined frequency range. In some embodiments, the frequency signal filters out signals that have carrier frequency outside of the allowed frequency range. In some embodiments, the carrier frequency range of allowed signals may be any signals that have pulses or carrier frequency between 30 and 50 kilohertz. In some embodiments, the carrier frequency range of allowed signals may be around 40 kilohertz, such as 41 or 42 kilohertz for example. Comparator of the gain circuit 470 may compare the signals that passed through the average intensity filter and the frequency filter against a threshold. The comparator may compare the signal filtered by the average intensity filter and the frequency filter against a predetermined threshold or a predetermined threshold range. If the comparator detects that the signal exceeds the threshold the object 450 is detected. Similarly, in set-ups where the comparator compares the signal that is lower than a predetermined threshold, the object 450 is detected if the signal is lower than the predetermined threshold. Gain circuit 470 may use any one of, or any combination of, the average intensity filter, frequency filter and a comparator together with any automatic gain controller circuit to control the detection of the light detector 420.

LED controller 410 may be any device, unit, component or a function for controlling, managing or driving LED 405. LED controller 410 may include any hardware, software or any combination of hardware and software for controlling, driving or enabling emitting of light by one or more LED 405. LED controller 410 may be a device, product or a system controlling, maintaining or enabling functionality or operation of LED 405. In some embodiments, LED controller 410 comprises a processing unit configured or comprising specific instructions for controlling, adjusting, maintaining or enabling functionality or operation of LED 405, such as signal or light emitting. In many embodiments, LED controller 410 comprises analog or digital circuitry for controlling, maintaining, adjusting or enabling functionality of LED 405. In further embodiments, LED controller 410 comprises switches, latches or transistor circuitry which switch LED 405 on or off. In a plurality or embodiments, LED controller 410 comprises monitoring circuitry monitoring and observing performance or functionality of LED 405. In many embodiments, LED controller 410 comprises modulating circuitry, gain circuitry or circuitry for maintaining the detector within a specific gain range or detection range. Sometimes, LED controller 410 modulates, adjusts or changes state, status or performance of LED 405 in response to the monitored or observed performance or functionality of LED 405.

In some embodiments, LED controller 410 may include gain circuitry, such as gain circuit 470, adjustment of gain of the signal emitted by the LED and detected by the light detector 420 in order to maintain the light detector 420 within a specific detection range. The adjustment may be real-time adjustment. Gain circuit 470 may be comprised by any component of the non-contact switch 400. For example, a gain circuitry of the LED controller 410 may maintain the output at a specific threshold or within a specific range. The gain circuit 470 of the LED controller 410 may control the properties of the electromagnetic signal emitted by the LED 405 such that the light detector 420 is maintained slightly below a detection range threshold. By maintaining the light detector 420 within a specific range, the light detector 420 may be controlled such that the reflected signal reaching the detector is below the detectable threshold unless an object 450 is placed within a predetermined distance from the non-contact switch 400. LED controller 410 may modulate current, voltage or power to LED 405 to maintain the light detector 420 within a specific threshold or operating range as desired by the configuration of distance within which the object 450 may be detected. In some embodiments, gain circuitry may be adjusted so that object 450 is detected at a greater distance. In other embodiments, gain circuitry is adjusted so that the object 450 is detected at a distance very close to the non-contact switch 400. The distance may be any distance ranging from 1 millimeter, 2 millimeters, 5 millimeters, 1 centimeter, 2 centimeters, 5 centimeters, 10 centimeters, 20 centimeters, 50 centimeters, 70 centimeters, 1 meter, 2 meters, 5 meters, 10 meters, 20 meters or any other distance desired by the user. In some embodiments, LED controller 410 comprises functionality which scales up or scales down the gain of the LED 405 using a dial, a button or a setting. In some embodiments, software operating on a processor of the LED controller 410 monitors and modulates the gain of the light emitted by one or more light sources of the LED 405 to maintain light detector 420 within a specific operating detection range. The gain circuitry of the LED controller 410 may be adjusted in response to background noise to compensate for increased or decreased background noise.

LED controller 410 may modulate, control or adjust LED 405 operation such that LED 405 emits or generates light of a specific wavelength, power or intensity range as controlled by the LED controller 410. In a number of embodiments, LED controller 410 modulates, adjusts or controls LED 405 such that LED 405 emits one or more signals of a specific intensity controlled by LED controller 410. In many embodiments, LED controller 410 modulates, adjusts or controls LED 405 such that LED 405 emits light in pulses occurring at a specific frequency. In some embodiments, LED controller 410 modulates LED 405 to emit light within the infra red wavelength range. In many embodiments, LED 405 emits light within infra-red wavelength range. In a plurality of embodiments, LED 405 emits light having a spectral range of less than 100 nanometers. In many embodiments, LED 405 emits light having a spectral range of less than 50 nanometers. In some embodiments, LED 405 emits light having a spectral range of less than 10 nanometers. In a number of embodiments, LED 405 emits light having a spectral range of about 5 nanometers or less than 5 nanometers. In some embodiments, LED 405 emits light having a spectral range of about one or two nanometers of full width at half maximum of the signal. In a number of embodiments, LED 405 emits light having a spectral range of less than one nanometer.

LED 405 may include a plurality of light sources, one of which acts as a light source emitting a background noise signal. In some embodiments, a non-contact switch 400 comprises a plurality of LEDs 405. A first one of the LEDs 405 may emit a pulsed signal designated to be the signal that the light detector 420 detects and interprets. This signal may be the signal to be reflected off of the object 450 and detected by the light detector 420. The second one of the LEDs 405 may emit a constant low intensity signal, such as a synthetic background noise signal. Synthetic noise may be noise generated by LED 405 to suppress any background noise created by the environment. The synthetic noise signal may be in the general intensity or power range or in an intensity or power range that is larger than the intensity or power range of the background signal of the environment coming from outside of the non-contact switch 400. The synthetic background noise or background noise signal produced by the second LED 405 may be any signal within a wavelength and power range detectable by the light detector 420. By having a stronger synthetic constant background noise signal transmitted by one or more LEDs 405, any additional less intense background noise signals from the environment may be not as damaging to the communications of the LED 405. In one example, a first LED 405 emits a high intensity signal via which the light switch enclosure 400 detects the presence of the object 450. The second LED 405 of the same or a different light switch enclosure may emit a lower intensity signal than the signal emitted by the first LED 405. The second LED 405 signal may have an intensity that is higher than a common or expected background noise from the environment. Both, the first and the second LEDs 405, may emit signals that are electromagnetic signals within a frequency, power or intensity range that is detected by the light detector 420. The light detector 420 may detect both signals. As background noise is generated from the environment, the second LED 405 emitting a stronger signal in this wavelength range than the background noise, may in suppress the background noise. In some embodiments, LED 405 comprises a Rohm or Sharp surface mount infrared emitting component, such as for example a Rohm palm device component emitting infrared light at pulses of around 40 kilohertz.

Light detector 420 may be any device, component or a unit detecting or sensing any electromagnetic signal or wave. Light detector 420 may include or comprise any type and form of hardware, software or combination of software and hardware for sensing or detecting light or optical signal. In some embodiments, light detector 420 senses light or an electromagnetic wave and produces a voltage or a current proportional to the intensity or the power of the light or the electromagnetic wave sensed. The light detector 420 may detect emission or radiation of any type and form, of any frequency and of any power or wavelength range. Light detector 420 includes a semiconductor detector, such as a silicon detector or a Gallium Arsenide detector. In some embodiments, light detector 420 includes a diode, such as a photodiode. In some embodiments, light detector 420 detects or senses heat or infra red radiation or signals. In other embodiments, light detector 420 includes a sensor for detecting light within a room that is illuminated by a lighting device 110. In another embodiment, light detector 420 includes a sensor detecting ambient light. In other embodiments, light detector 420 includes a color sensor for sensing a color of light or a wavelength of light. In yet further embodiments, light detector 420 is a color temperature sensor for detecting color temperature of a light source. In still further embodiments, light detector 420 senses or detects chromaticity of light. In a number of embodiments, light detector 420 detects an electromagnetic signal within the frequency or wavelength range of the signal emitted by the LED 405. For example, light detector 420 may be tuned to collect any radiation having spectral or modulation characteristics of the signal emitted by LED 405 in order to detect if an object 450 is present. The object 450 may be detected by the detector 420 due to the object 450 reflecting the signal from the LED 405 to the light detector 420. In such instances, light detector 420 may detect the presence of an object 450 when object 450 is within a specific distance from the light detector 420. In some embodiments, light source 420 is a sound or acoustic wave sensor detecting sound or acoustic signals. In some embodiments, light detector 420 detects RF or radio frequency signals.

In still further embodiments, light source 420 detects any type, form or configuration of a signal that may be affected by presence of an object 450 within a perimeter of the light detector 420. In some embodiments, light detector 420 detects or senses near infra red signals, such as the signals emitted by a remote control. In still further embodiments, light detector 420 detects or senses wireless transmission signals, such as the signals of a wireless internet connection generally received by wireless network cards of computers and laptops. In various embodiments, light detector 420 comprises any functionality of any other lighting system 100 component. Light detector 420 may be detecting modulation of the light oscillating at a carrier frequency. The carrier frequency may be any carrier frequency, such as a carrier frequency of about 40 kilohertz. In some embodiments, light detector 420 comprises a Panasonic receiver, such PNA4602 receiver.

Detector controller 425 may be any device controlling or managing operation or functionality of the light detector 420. Detector controller 425 may be any device, unit or component processing or modifying the output signal of the light detector 420. In some embodiments, detector controller 425 is a device, product or a system controlling, configuring or managing the light detector 420. In other embodiments, detector controller 425 comprises hardware, software or a combination of hardware and software for controlling, adjusting or maintaining functionality of one or more light detectors 420. In some embodiments, detector controller 425 comprises analog or digital circuitry for controlling, maintaining, adjusting or enabling functionality of the light detector 420. In further embodiments, detector controller 425 comprises switches, latches or transistor circuitry which controls or modulates light detector 420. Detector controller 425 may comprise monitoring circuitry which uses a software running on a processor of the detector controller 425 to receive, process or modify the output signal of the light detector 420. For example, output signal of a light detector 420 may be sent to the detector controller 425, which may use any functionality to determine if the received signal signifies the presence of an object 450 within a predetermined perimeter from the light detector 420. In some embodiments, light detector controller 425 may use the light detector 420 output signal to determine performance, operation or action of the lighting device 110. For example, if a light detector 420 detects a signal affected by an object 450, detector controller 425 may process the signal and determine that an object 450 is present. The detector controller 425 may in response to the determination that the object 450 is present sent a signal to the lighting device 110 or any other component of the lighting system 100. The lighting device 110 may, in response to the signal from the detector controller 425, start emitting light, stop emitting light or change the intensity, color or any other configuration of the light emitted.

Detector controller 425 may receive and monitor current or voltage output signals from any number of light detectors 420. In some embodiments, detector controller 425 receives current or voltage output signal from one or more light detectors 420 and converts the current or the voltage signal into a digital signal. Sometimes, detector controller 425 processes current or voltage output signal from one or more light detectors 420. In various embodiments, detector controller 425 adjusts one or more functionalities or performance characteristics of one or more light detectors 420 in response to the received current or voltage output signal received. In a plurality of embodiments, detector controller 425 may form and transmit commands or instructions, such as instructions 650, to any lighting device 110. Detector controller 425 may send communication or receive communication from other lighting system 100 components, as desired or as necessary. In some embodiments, detector controller 425 includes any functionality of any other lighting system 100 component, such as the lighting device 110.

Object 450 may be any type and form of an object, such as a book, a chair, a door, a pen, a signal, a human being or any other living being. Object 450 may be an object capable of changing, modifying or affecting the signal detected by the light detector 420. Object 450 may be a person or a part of a person, such as a person's hand. Object 450 may be a signal emitter emitting an electromagnetic signal, such as a remote controller, light emitter or a radio emitter. In some embodiments, object 450 is a person that reflects a signal into the light detector 420 of the non-contact switch 400 by walking into a room that has a light non-contact switch 400 installed on a wall. In some embodiments, LED 405 emits an electromagnetic signal which is reflected off of the person and detected by the light detector 420. The light detector 420 may detect the presence of the person in the room and send the signal to the detector controller 425 which in turn may send an instruction to lighting devices 110 in the room to turn on and emit light.

Object 450 may be a device or an apparatus emitting a signal. In some embodiments, object 450 is an emitter such as a remote controller that emits an infra red signal detected by the non-contact switch 400. The signal may be detected by the light detector 420 and the light from the lighting devices 110 may be turned on. In still further embodiments, object 450 may be any object, person or a device intercepting, reflecting or affecting the signal detected or sensed by the light detector 420. Object 450 may be any object reflecting a portion of light emitted by LED 405 toward light detector 420. In some embodiments, object 450 emits an electromagnetic signal, heat, acoustic or sound signal, a wireless signal, radio signal or any type and form of signal that the light detector 420 detects. In some embodiments, object 450 creates an interference or obstruction to an intensity, phase, frequency or amplitude of a signal detected by light detector 420. Object 450 may create an obstruction or a lapse in the signal amplitude, phase, frequency or intensity, which may be detected by a light detector 420. In some embodiments, object 450 reflects a signal such that the light detector 420 detects the reflected signal in an increasing fashion as the object 450 approaches the light detector 420.

The components of the non-contact switch 400, such as the LED 405, LED controller 410, light detector 420 and the detector controller 425 may each include one or more gain circuits to adjust the amount of light from the LED 405 to be detected by the light detector 410. In one example, a gain circuit of a LED 405 may adjust and control the output light of the LED 405 to maintain the light detector 420 within a specific operating range. The specific operating range may be a range of operation of the LED 405 or light detector 420 or both such that the light detector 410 detects the light from the LED 405 with a specific sensitivity. For example, the gain circuit may cause the LED 405 to emit just enough light to enable the light detector 420 to barely detect portions of the light from the LED 405 reaching the light detector 410. The portions of light may be the fraction of light reflected from a transparent or a semi-transparent portion of an enclosure of the non-contact switch 400, such as a transparent cover. The transparent cover may include glass or a plexiglass portion that reflects the light towards detector 420. The gain circuit may maintain the amount of light detected by the light detector 420 just below the threshold of the presence of the object 450. The presence of the object 450 may then provide an additional amount of reflection reaching the light detector 420, thus exceeding the threshold of detection. Once the threshold is exceeded the light detector 420 may send the signal that object 450 has been detected.

Similarly in another example, a gain circuit of light detector 420 may adjust and control the detection settings of the light detector 420 to maintain the light detector 420 within a specific operating range. The gain circuit may cause the light detector 420 to detect light with a specific sensitivity or configuration to enable the light detector 420 to detect portions of the light from the LED 405 just below the detection threshold of the light detector 420. As such, the light detector 420 may detect absence of any object 450 from the perimeter of the non-contact switch 450. In the instance that the object 450 approaches the non-contact switch 400, the object 450 will detect an additional amount of the signal from the LED 405 back into the light detector 420. The gain circuit maintaining the amount of light detected by the light detector 420, may experience a rising signal which will be too strong to be compensated for by the gain circuit quickly enough and the light detector 410 will detect the presence of the object 450. Similarly, gain circuits may be deployed in the led controller 410 or detector controller 425 in any orientation. The gain circuits may control the sensitivity of the light detector 420 or the gain circuits may control the intensity, power, pulse frequency, carrier frequency or even wavelength of the light emitted from LED 405 to enable and control the detection of the object 450 when present.

Non-contact switch 400 may be used by any number of users to control, manage or configure a lighting system 100 as well as to communicate with one or more of lighting system 100 components. Sometimes, light non-contact switch 400 is configured to perform a set of tasks enabling user communication with a lighting system 100. In some embodiments, non-contact switch 400 is configured or tuned to perform sensing of a user's presence. In many embodiments, non-contact switch 400 is configured or tuned to enable a user to control light intensity, light color, pulsing or other performance characteristics of light sources 110. In many embodiments, non-contact switch 400 is configured or tuned to enable a user to select a group of light sources 110 and control them separately from other light sources 100. In some embodiments, non-contact switch 400 components are tuned and configured to operate based on frequency of pulses of signal at a specific predetermined frequency. In some embodiments, light non-contact switch 400 components are tuned and configured to emit and/or detect pulses of signal at a specific predetermined intensity. In still further embodiments, light non-contact switch 400 components are tuned and configured to emit and/or detect pulses of signal within a specific predetermined spectral range.

For example, non-contact switch 400 components may be tuned and configured to emit and/or detect the signal at a specific predetermined combination of frequency, intensity, wavelength or modulation. Upon placing an object 450 in the vicinity of the non-contact switch 400 component, any feature of the signal, such as the intensity, frequency, wavelength or format, may be interrupted and the interruption may be detected by the light detector 420. In some embodiments, LED controller 410 modulates LED 405 to emit or generate pulses or bursts of electromagnetic, acoustic or other wireless signal at a specific frequency and a specific intensity. Light detector 420 may be modulated by detector controller 425 to detect the signals emitted by the LED 405 at the frequency and intensity range emitted by the LED 405. The detector controller 425 may modulate the light detector 420 by user configuration, frequency or resistance adjustment, programming of the detector controller 425, setting up configuration inputs or any other user action or activity. Detector controller 425 may process the signals from the light detector 420 in accordance with configuration settings and alert other lighting system 100 components when the object 450 is in the vicinity. In some embodiments, signals emitted by LED 405 may be adjusted to include pulse frequency, signal intensity, signal wavelength and modulation format which are all within detectable range of the light detector 410. The light detector 410 may continuously, periodically or randomly check for the signal presence. The signal being maintained by the gain circuit within a specific range just below a detectable threshold range of the light detector 410 may signify that the object 450 is not within the vicinity. However, when the object 450 is within the vicinity the signal reflected off of the object 450 and reaching the light detector 410 may increase and exceed the threshold. Light detector 410 may then detect the presence of the object 450. In some embodiments, object 450 may interrupt or change the intensity, power, frequency, wavelength or modulation of the signal emitted from the LED 405. Light detector 410 may detect such changes and interpret the detection as the presence of the object 450.

The threshold distance or distance range within which the non-contact switch 400 components detect the presence of object 450 may be configured by any configuration method. In some embodiments, the user configures the threshold or distance range by setting the distance or relative position or direction of the non-contact switch 400 components, such as the LED 405 and light detector 420. In further embodiments, the threshold or distance range may be set by choosing a duration of pulse and the frequency of pulses emitted by LED 405. In still further embodiments, the threshold or distance range may be set by selecting a spectral range of the light emitted by LED 405, as well as the average intensity of the light emitted. In other embodiments, lighting system 100 includes a configuration tool which enables the user to configure the vicinity range or threshold within which the object 450 is detected. In some embodiments, the threshold or the range of the vicinity or distance within which the object 450 is detected is preset or preconfigured by the manufacturer. In further embodiments, the threshold range or the distance range of the vicinity may be adjusted by a button, setting, dial or an input on the light switch enclosure 400 or any other lighting system 100 component.

The vicinity or range within which the object 450 is detected by the non-contact switch 400 may be as any range or threshold of distance. In some embodiments, the vicinity is any length between the object 450 and the non-contact switch 400. In some embodiments, the vicinity is any distance or range of about 1, 2, 5, 10 or 15 centimeters. In further embodiments, the vicinity is 1, 2, 3, 4, 5, 6, 7, 8, 9 or 10 millimeters. In further embodiments, vicinity is a distance of 15, 20, 20, 30, 40 or 50 centimeters. In other embodiments, vicinity is a range or a threshold of distance of between 50 centimeters and 1 meter. In further embodiments, vicinity is a range of between 1 and 10 meters. Vicinity may be configured by configuring or adjusting the output signal characteristics of the LED 405 and detectable range and performance of light detector 420. In some embodiments, vicinity may be altered by the user using configuration schemes, settings, programs or inputs for the light switch enclosure 400 or lighting system 100. In many embodiments, vicinity is a range or threshold of distance which is constant and predetermined for a specific non-contact switch 400. In other embodiments, vicinity is a range or threshold of distance which may vary depending on the configuration, user inputs and signals or instructions from other lighting system 100 components.

Non-contact switch 400 may communicate to other lighting system 100 components by sending or receiving signals or instructions. In some embodiments, LED 405 of a first light switch enclosure transmits communication to a second light switch enclosure 400. The light detector 420 of the second light switch enclosure 400 may detect the signal emitted by the LED 405 of the first light switch enclosure 400. The second light switch enclosure 400 may process or forward the instruction 650 to one or more lighting devices 110. In some embodiments, both the first and the second enclosures 650 are associated with one or more lighting devices 110. When a first light switch enclosure 400 transmits a transmission, such as an instruction 650 via LED 405, the second light switch enclosure 400 may receive the transmission and forward it to the one or more lighting devices 110 associated with the second light switch enclosure 400. The one or more lighting devices 110 may implement the instruction 650 or operate in accordance to the instructions received. In some embodiments, a plurality of light switch enclosures 400 are configured to be in communication with one or more lighting devices 110. The master lighting device 110 may transmit an instruction 650 to any number of the plurality of lighting devices 110 via it's own non-contact switch 400. The signal, such as the instruction 650, may be transmitted wirelessly via the LED 405 and the plurality of light switch enclosures 400 may receive the instruction 650 and forward the instructions 650 to the lighting devices 110 to implement the instruction 650.

Non-contact switch 400 may further communicate with one or more light sources 110. In some embodiments, components of the non-contact switch 400 may be associated with one or more light sources 110. For example, a light source 110 may comprise components of the non-contact switch 400, such as the LED 405 or the light detector 420. Non-contact switches 400 may be used for assigning of unique digital addresses to one or more lighting system 100 components. In some embodiments, a non-contact switch 400 is used to assign a unique digital address to a lighting device 110 that is connected to a switch 400. In further embodiments, a non-contact switch 400 is used to assign a unique digital address to a plurality of lighting devices 110 that are connected to or in communication with the light switch enclosure 400. Assigning of the unique digital address may be done by sending an instruction or a command via connections 105 to all the lighting devices 110 connected. The instruction or the command may be any instruction 650 that indicates that a lighting device 110 will be assigned an unique digital address. The same or another instruction may be transmitted identifying a first unique digital address, or the first address 127 to all the lighting devices 110. A user may place a hand, or any other object 450, within the vicinity of a switch 400 associated with a particular lighting device 110. The light detector 420 of the light switch enclosure 400 may detect the presence of the hand and send the signal to the lighting device 110 associated with the light switch enclosure 400. The receipt of the signal by the lighting device 110 will indicate to the lighting device 110 that the user has identified that particular lighting device 110 as the lighting device 110 to be assigned the first address 127. This particular lighting device 110 may then save the address 127 and use the address 127 for communicating with any other lighting devices 110 on the network of lighting devices 110. In such or similar manner the user may identify other lighting devices 110 and assign to them any particular unique digital addresses or addresses 127. The user may also assign to a group of lighting devices 110 one address 127, such that entire group will behave and act in accordance with instructions or commands transmitted along with that particular address 127.

Non-contact switch 400 may be used for assigning a master or slave status to any lighting device 110. In some embodiments, the user may select a master or slave status by placing a hand in the vicinity of the light switch enclosures 400 associated with particular lighting devices 110. A component of a lighting system 100 may receive an instruction or a signal that the lighting system 110 is placed into an assignment mode. An assignment mode may be any mode of operation of the lighting system 100 wherein the lighting system 100 assigns an addresses 127 or a status, such as slave or master status, to one or more lighting system 100 components. In some embodiments, an assignment mode is a mode, a function, a feature of a lighting system 100 to assign an addresses 127 to any lighting system 100 component. In other embodiments, an assignment mode is a mode, a function, a feature of a lighting system 100 to assign an master or a slave status to any lighting system 100 component. In yet further embodiments, an assignment mode is a mode, a function, a feature of a lighting system 100 to assign any number of lighting devices to a group. Assignment mode may be a mode of operation or configuration in which the lighting system 100 allows the user to select via non-contact switch 400 associated with light sources 110 the light sources 110 will be assigned to specific statuses, specific groups or specific addresses 127. When the lighting system 100 is placed in the assignment mode, the lighting system may send a group assigning instruction to each lighting device 110. The user may select via non-contact switch 400 which of the lighting devices will be assigned to this particular group. Following the selection, the user may exit the assignment mode and each selected light source 110 may be saved into the group as selected. Similarly, the user may assign addresses 127 or master and slave statuses to each of the lighting devices 110.

Assignment mode, implemented by a non-contact switch 400, may be any function or a setting of any of the lighting system 100 components, such as a function, a feature or a setting implemented by any of a controller 120, a communicator 125, a master/slave addressor 130, a power supply 140 or a light source 110. Assignment mode may include a software, a hardware or a combination of software and hardware for implementing tasks relating to assignment of addresses 127 for each of the lighting system 100 components. Assignment mode may include a means for transmitting or receiving messages from each of the lighting system 100 components who have received and accepted the addresses 127. Assignment mode may further receive confirmation messages from the lighting devices 110 that were selected by the user via non-contact switch 400. In some embodiments, lighting system 100 components store the address 127 received from the master and transmit the confirmation messages to the master lighting device 110. The master lighting device 110 may then be aware which lighting devices have accepted and saved the address 127 the user has selected. The master lighting device 127 may send any further communication of these devices using the addresses 127 assigned. In some embodiments, the master lighting device 110 transmits one of a plurality of addresses 127 to each of the lighting system 100 components and waits for the lighting system 100 components to accept the address 127 transmitted. The lighting system 100 components may accept the address 127 upon receiving the signal from a non-contact switch 400 as selected by the user. Those lighting system 100 components selected by the user may return to the master lighting device 110 the confirmation messages indicating that these lighting system 100 component have accepted the addresses 127. Similarly, the master lighting device 110 may send out group assignment signals to the lighting devices 110 in the network. The lighting devices 110 may, upon receiving signals from the non-contact switch 400 that an object 450 was detected, send to the master lighting device the confirmation signals that the user has selected these lighting devices 110 to be in the same group. The group may be assigned a special group address 127, or a group identifier. Such a group address or a group identifier may be used to control the group of lighting devices 110 selected by the user in the future. In one example, light source 110A accepting address 127A previously sent by the master receives a signal from a light switch enclosure that a user's presence, or an object 450, was detected. The light source 110A sends a confirmation message confirming that light source 110A has accepted the address 127. The master lighting device 110, in response to the received confirmation message, associates address 127 with the lighting system 100 component for any future communication. In some embodiments, assignment mode entails the master receiving messages from one or more lighting system 100 components and assigning addresses 127 in response to the received messages.

In one example, a non-contact switch 400 may be utilized with associated lighting system 100 components for assignment of addresses 127. In some embodiments, a master communicates with a plurality of lighting system 100 components which may or may not have a master status. One of the plurality of lighting system 100 components is a light source 110A. In a number of embodiments, lighting system 100 components send information to the master using non-contact switch 400 associated with lighting system 100 components. A master may be placed in an assignment mode and may be available to receive any information from any one or more of lighting system 100 components. A user may select a light source 110A by placing an object 450, such as a hand, in front of a non-contact switch 400 associated with the light source 110A. Light detector 420 of the non-contact switch 400, in response to the placed object 450, detects light emitted by LED 405 and non-contact switch 400 sends a signal indicating that the light source 110A is selected. Light source 110A transmits a signal to the master indicating the user's selection and the master assigns an address 127, such as address 127A, to light source 110A. The master transmits information notifying light source 110A of the new address 127 assigned to the light source 110A. The light source 110A uses the assigned address 127 to receive for communication with master or any other lighting system 100 component. In some embodiments, light source 110A uses the assigned address 127 to recognize which information transmitted by any other lighting system 100 component is addressed to light source 110A.

In a similar example, the user may proceed to select any number of lighting system 100 components by placing an object 450 in front of a non-contact switch 400 associated of each selected lighting system 100 component. The master, in response to user's selections via a non-contact switch 400, may assign an address 127 to each of the user selected lighting 100 system components. Upon completing all the selections, the user may terminate the assignment mode and the master may store all the addresses 127 and lighting system 100 components associated with each of the addresses 127. The lighting system 100 components may use addresses 127 assigned to transmit or receive information or communication among the lighting system 100 components assigned. In some embodiments, similar methods may be used to create a group of lighting system 100 components, or a group of light sources 100. A user may configure the group by selecting via non-contact switch 400 the light sources 110 that are the members of the group. In further embodiments, non-contact switch 400 may be used to distinguish a group of light sources 110 from another group of light sources 110. In some embodiments, each of the groups selected may be controlled separately by the lighting system 100. Each lighting system 100 component may store an addresses 127 of the group or a zone. As the commands or instructions are received for the light sources 110 of the specific group, the address 127 may be used as a key to address the members of the specific group to perform a certain function without affecting light sources 110 of other groups. Such addresses may also be referred to as group identifiers. Non-contact switch 400 may be used in any combination with any other lighting system 100 component to select, set up or configure any number of lighting system 100 components.

Figure 5B:
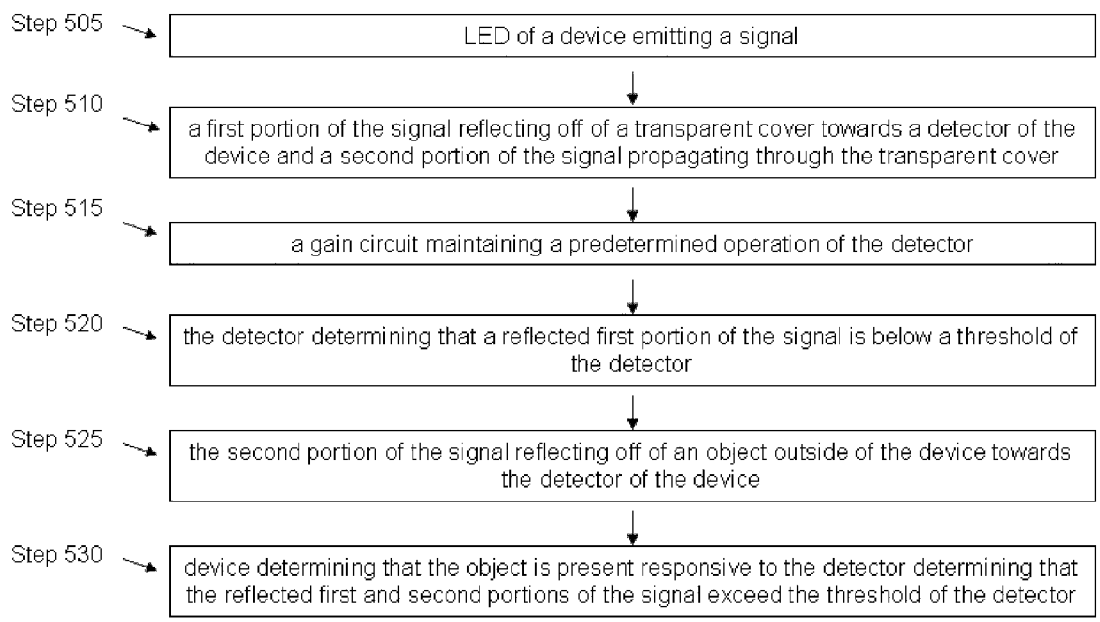
FIG. 5B is a flow chart illustrating steps of an embodiment of a method for detecting presence of an object or a person via a non-contact switch.

Referring now to FIG. 5B, an embodiment of steps of a method for detecting an object is depicted. At step 505, an LED of a device emits a signal. At step 510, a first portion of the signal reflects off of a transparent cover towards a detector of the device and a second portion of the signal propagates through the transparent cover. At step 515, a gain circuit maintains a predetermined operation of the detector. At step 520, the detector determines that a reflected first portion of the signal is below a threshold of the detector. At step 525, the second portion of the signal reflects off of an object outside of the device towards the detector of the device. At step 530, the device determines that the object is present responsive to the detector determining that the reflected first and second portions of the signal exceed the threshold of the detector.

Further referring to step 505 of FIG. 5B, a LED of a device emits a signal. The signal emitted may be any signal, such has an electromagnetic signal. In some embodiments, the signal is an infrared signal or a radio signal. In further embodiments, the signal is a modulated signal comprising a carrier frequency between 20 and 60 kilohertz, such as 40 kilohertz for example. The carrier frequency may be a frequency of pulses of bursts of light emitted by the LED. The signal may further be amplitude, frequency, phase or pulse width modulated. In some embodiments, the signal may further be modulated in any additional way. In some embodiments, the signal comprises high components of the signal and low components of the signal. In some embodiments, high components of the signal correspond to pulses of light emitted from the LED. In further embodiments, low components of the signal correspond to durations of time when there are no pulses of the signal. In still further embodiments, low components of the signal correspond to durations of time where LED emits light having a lower intensity than the intensity of light emitted during the emission of high components of the signal. The high components of the signal may comprise or correspond to portions of the signal comprising voltage, current, power or intensity that is higher or larger than the voltage, current, power or intensity of the portions of the signal that are comprised by, or correspond to, the low components. The signal may comprise portions of the signal comprising any number of pulses such as 1, 5, 10, 15, 20, 25, 30, 35, 40, 45, 50, 55, 60, 65, 70, 80, 90 or 100 pulses for example. In some embodiments, the portions of the signal comprise more than 100 pulses, such as 200, 500 or 1000 pulses. Each pulse may be a part of a period comprising high and low components. In some embodiments, a pulse may comprise any number of periods comprising high and low components. In further embodiments, a pulse comprises a high component and a duration of signal not having a pulse comprises a low component. The signal may be emitted within any conical angle from the LED, such as 180 degrees, for example. The signal may be emitted from within an enclosure of the device. The signal may comprise any type and form of communication comprising instructions, commands or data. The signal may comprise communication for any component of the lighting system 100, such as for example a lighting device 100 or another non-contact switch 400.

At step 510, a transparent cover of the device reflects a first portion of the signal and allows a second portion of the signal to propagate through or transmit through the transparent cover. In some embodiments, the first portion is emitted by a first light source of the LED 405 and the second portion is emitted by a second light source of the LED 405. In further embodiments, the first and the second portions are emitted by the same light source of the LED 405. In other embodiments, the first and second portions of the signal are emitted by different light sources of the LED 405. In still further embodiments, some portions of the first or second portions of the signal are emitted by multiple light sources of the LED 405, which may be same or different light sources. In some embodiments, the signal may be reflected from components, such as enclosure of the device, led controller 410, power supply 140, light detector 420, detector controller 425, connections 105 or any other component of the non-contact switch 400. In some embodiments, a first portion of the signal is reflected off of the transparent cover 460. A portion of the first portion of the signal may be reflected towards a light detector, such as the light detector 420. In some embodiments, the second portion of the signal propagates through the transparent cover and exit the non-contact switch 400. The transparent cover may reflect a percentage of the signal, such as 2, 4, 6, 8 or 10 percent and propagate the remainder of the signal.

At step 520, a gain circuit maintains, monitors, controls or adjusts operation of the detector. Gain circuit may be gain circuit 470. The detector may be light detector 420. Gain circuit may maintain operation of the detector to ensure that the detector operates within a predetermined sensitivity range. In some embodiments, predetermined sensitivity range may be an average intensity range of the detector that is below the threshold for detecting a presence of an object 450. In some embodiments, specific sensitivity range may be an average intensity range of the light detected that is above the detection threshold for detecting a presence of an object 450. In other embodiments, specific sensitivity range may be an average intensity range of the light detected that includes a detection threshold for detecting a presence of an object 450. In some embodiments, specific sensitivity range may be an intensity or power range of the detector that is below the detection threshold for detecting of the presence of the object 450. Gain circuit may maintain operation of the detector a specific percentage of the detection threshold intensity or power for detecting the presence of the object 450. In some embodiments, gain circuit maintains operation of the detector between below the detection threshold for detecting the object 450 by a predetermined percentage of the threshold. The predetermined percentage of the threshold may be any percentage of the intensity or power of light detected to meet or exceed the threshold for detecting of the object 450. In some embodiments, the predetermined percentage of the threshold may be between 0 and 5 percent, 5 and 10 percent, 10 and 20 percent, 20 and 30, 30 and 40 percent, 40 and 50, 50 and 60 percent, 60 and 70 percent, 70 and 80 percent, 80 and 90 percent, 90 and 95 percent, or 95 and 100 percent of the detection threshold. In some embodiments, the gain circuit determines that the signal or a portion of the signal detected by the detector is below the specific sensitivity range. The portion of the signal may be a duration of any number of pulses, such as between 1 and 10 pulses, 10 and 20 pulses, 20 and 30 pulses, 30 and 40 pulses, 40 and 50 pulses, 50 and 60 pulses, 60 and 80 pulses, 80 and 100 pulses, 100 and 200 pulses, 200 and 2000 pulses or any other number of pulses. In some embodiments, the gain circuit determines that a portion of the signal comprising any number of high components and low components is below the specific sensitivity range. The gain circuit may adjust or increase the gain to ensure that the detector detects the portion of the signal within the specific sensitivity range or within a specific percentage range of the detection threshold. Similarly, the gain circuit may determine that a portion of the signal comprising any number of high components and low components is above the specific sensitivity range. The gain circuit may adjust or decrease the gain to ensure that the detector detects the portion of the signal within the specific sensitivity range or within a specific percentage range of the detection threshold. Adjustment of gain may be done by varying pulse width of the signal. In some embodiments, adjustment of gain is implemented by increasing or decreasing a duration high components of each pulse. In further embodiments, adjustment is implemented by increasing or decreasing a duration of low components of each pulse. By adjusting the high component to low component duration ratio of the pulses of the signal the device may adjust the gain of the detector. Adjustment of gain may be done at a specific rate to allow the gain not to be adjusted fast enough in embodiments when object 450 approaches the device. In such instances, the object 450 may cause the portion of the signal detected to exceed the detection threshold of the detector faster than the gain circuit would adjust the gain of the signal.

At step 520, the detector determines that a reflected first portion of the signal is below a threshold of the detector. The threshold of the detector may be a sufficient the power or intensity of signal detected by the detector to recognize the presence of the object 450. In some embodiments, the reflected first portion of the signal includes the portion of the signal reflected by the transparent cover 460. In further embodiments, the reflected portion of the signal includes the portions of the signal reflected by any segment or component of the non-contact switch 400. In still further embodiments, detector determines that the total signal reaching the detector is below the threshold, in response to actions, adjustments or maintaining of performance performed by the gain circuit.

At step 525, the second portion of the signal reflects off of an object outside of the device. The second portion of the signal may comprise a portion of the signal that has propagated through the transparent cover. The second portion of the signal may comprise a portion of the signal that has propagated through the transparent cover and has reflected off of an object, such as an object 450. In some embodiments, the second portion of the signal or a portion of the second portion of the signal reflects towards detector, such as the light detector 420. In further embodiments, the second portion of the signal or a portion of the second portion of the signal reflects off the object and through the transparent cover towards the detector. The object may be a portion of a body of a person, such as a user, or any embodiment of the object 450.

At step 530, the device determines that the object is present responsive to the detector determining that the reflected first and second portions of the signal exceed the threshold of the detector. In some embodiments, the detector determines that the reflected first and second portions of the signal exceed the threshold of the detector. In some embodiments, the detector receives the reflected second portion of the signal reflected off of the object 450 in addition to the received first portion of the signal. The detector may detect the sum of the reflected first and second portions of the signal. In some embodiments, the detector detects average intensity or power of the reflected first and second portions of the signal. In further embodiments, the detector determines that the sum of the received first and second portions of the signal exceeds the threshold intensity or power needed for the detector to recognize the presence of the object 450. In still further embodiments, the device determines that the object is present responsive to the determination of the detector that the reflected first and second portions of the signal exceed the intensity or power threshold of the detector needed to detect the presence of the object. In still further embodiments, the determination that the object is present is responsive to the actions or adjustments by the gain circuit. In still further embodiments, the determination that the reflected first and second portions of the signal exceed the threshold is further based on the average intensity of the plurality of pulses of the reflected first and second portions of signal exceeding the threshold established by the gain circuit.

F. Systems and Methods for Assigning of Master and Slave Status

Figure 6A:
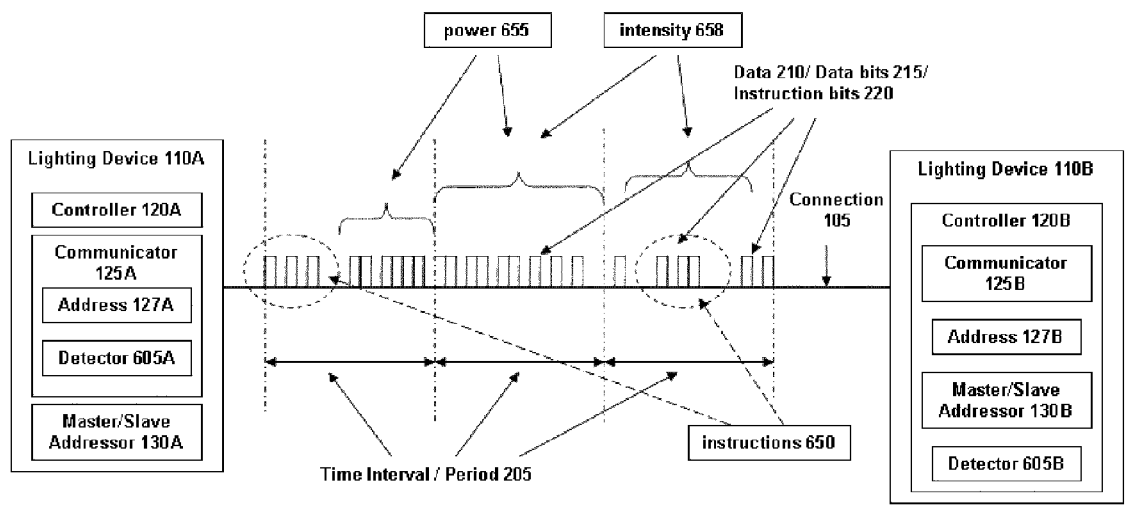
FIG. 6A is a block diagram of an embodiment for lighting devices transmitting power, intensity and instructions for assigning a status to a lighting device via a connection.

Referring now to FIG. 6A, an embodiment of a system for assigning of master or slave status to a light device 110 is illustrated. FIG. 6A depicts lighting devices 110A and 110B exchanging communication signals via a connection 105. Lighting device 110A comprises controller 120A, master/slave addressor 130A and a communicator 125A that further includes address 127A and detector 605A. Lighting device 110B includes a controller 110B that comprises communicator 125B, address 127B and master/slave addressor 123B. The signals or communication transmitted between the lighting devices 110A and 110B include data 210, data bits 215 and instruction bits 220 that are divided into time intervals or periods 205. Data 210, data bits 215 and instruction bits 220 within each period 205 define a duty cycle of each period 205. The duty cycle of each period 205 may further define or identify power 655 or intensity 658 for the lighting devices 110. Data 210, data bits 215 and instruction bits 220 of the signals may form instructions 650 for assigning master or slave status to the lighting devices 110. The instructions 650 in addition to providing instructions for assigning status, such as a master or slave status, may also be included within the duty cycle that may also provide power 655 and/or intensity 658 for the lighting device 110.

In further detail, FIG. 6A illustrates a detector 605 that receives, detects and identifies instructions 650. Detector 605 may include any type and form of hardware, software or a combination of hardware and software. Detector 605 may include any type and form of a device, a unit, a structure, an apparatus, a function, an algorithm, a script, an executable file, a software application or a software program that operates on a computing device such as a lighting device with a processor. In some embodiments, detector 605 includes any type and form of a function, application, device, unit or a structure for receiving, detecting, identifying, managing or manipulating instructions 650. Detector 605 may comprise any unit, function or a component for identifying or recognizing instructions 650 from any type and form of data 210, such as data bits 215 or instruction bits 220. In some embodiments, detector 605 includes any type and form of a policy or a policy engine. In further embodiments, detector 605 includes a rule or a rule engine. The policy or policy engine or the rule or the rule engine may determine or identify actions to be taken in response to the instructions 650. In further embodiments, detector 605 includes a parser that parses incoming data 210, data bits 215 and instruction bits 220. The parsed data may be used by any component of the lighting device 110 to implement or execute actions as defined by the received instructions 650. In some embodiments, the parsed data is used to operate the lighting device 110 as identified by the power 655 or intensity 658. In further embodiments, detector 605 determines the duty cycle within each of the time interval or period 205. In still further embodiments, detector 605 determines the starting or ending point of each of the time intervals or periods 205.

Power 650 may be any rate of delivery of electrical energy to a lighting device 110. In some embodiments, power 650 is a product of voltage and current delivered to a lighting device 110. The power 650 may be delivered to the lighting device 110 from another lighting device 110, from a power supply 140 or from any power outlet or plug. In some embodiments, power 650 is defined by the duty cycle of a signal or communication received by the lighting device 110 via connection 105. In some embodiments, power 650 within a period 205 is defined by a ratio of a duration of a period 205 for which the signal or communication have a high value to a duration of the entire duration of the period 205. In further embodiments, power 650 within a period 205 is defined by an average voltage, current or power value of the signal within the period 205. In some embodiments, power 650 may be defined by a signal that comprises a plurality of periods 205. The lighting device 110 may emit light or otherwise operate in accordance with power 650. The power 650 may change from period 205 to period 205. In some embodiments, the power 650 may remain unchanged over any number of consecutive periods 205, regardless if some periods 205 comprise one or more instructions 650.

Intensity 658 may be any amount of electromagnetic radiation emitted or emanated or to be emitted or emanated from the lighting device 110. In some embodiments, intensity 658 identifies an amount of photons of light emitted from the lighting device 110. In further embodiments, intensity 658 is an amount of light emitted by lighting device 110 per a predetermined amount of time. In some embodiments, intensity 658 is defined by the duty cycle of a signal or communication received by the lighting device 110 via connection 105. In some embodiments, intensity 658 within a period 205 is defined by a ratio of a duration of a period 205 for which the signal or communication have a high value to a duration of the entire duration of the period 205. In further embodiments, intensity 658 within a period 205 is defined by an average voltage, current or power value of the signal within the period 205. In some embodiments, intensity 658 may be defined by a signal that comprises a plurality of periods 205. The lighting device 110 may emit light or otherwise operate in accordance with intensity 658. The intensity 658 may change from period 205 to period 205. In some embodiments, intensity 658 may remain unchanged over any number of consecutive periods 205, regardless if some periods 205 comprise one or more instructions 650.

Instructions 650 may include any type and form of commands, instructions, or configurations, such as for assigning a status to a lighting device 110. Instructions 650 may include data 210, data bits 215 or instruction bits 220. In some embodiment, instructions 650 includes any combination of data 220, data bits 215 or instruction bits 220. In some embodiments, instructions 650 include any type and form or commands and instructions for assigning a status of a master or a slave to a lighting device 110. The status of a master may enable the lighting device 110 to send out instructions or commands to one or more lighting devices on a network. The status of a master may further enable the lighting device to control, manage or modify operation, functionality or output of other lighting devices 110 connected to the lighting devices 110 via the connection 105. The status of a slave may enable the lighting device 110 to receive instructions and commands from a lighting device 110 that is assigned a status of the master. The status of a slave may enable the lighting device to be controlled, managed or have its operation, functionality or output modified by the lighting device that is assigned a status of the master. The lighting device 110 assigned the status of a slave may be modified, commanded, operated or have its operation or functionality controlled or modified by the lighting device 110 having the status of the master by receiving instructions 650 via the connection 105.

In some embodiments, instructions 650 include messages used to diagnose problems of lighting devices 110. Instructions 650 may include requests and responses to the requests and may be sent by master or slave lighting devices 650, such as:

LC_ACK_ON_ALERTS sending an acknowledgement to check for an error, such as humidity, temperature or voltage error;

LC_CLEAR_ALERTS clearing alert flags from the lighting device 110;

LC_SET_ALERT_HISTORY setting alert flag if permanent history exists.

LC_DRIVE_LED_ALERT setting an alert light or alert LED if an alert is set;

LC_DRIVE_LED_ADDRESS setting alert light to on when a match between an address 127 of a previously received instruction 650 and an address 127 of the lighting device 110 is detected;

LC_NO_DRIVE_LED to set alert light to off;

LC_ACK_ON_AMBIENT sending an acknowledgement if ambient light detector is active;

LC_ACK_ON_PIR sending an acknowledgement if an object 450 is detected on a light switch enclosure.

In some embodiments, instructions 650 include messages that include commands for controlling or managing of the lighting devices 110. Instructions 650 may include dimming or brightness level instructions, color settings, flashing instructions, timing instructions, or any other control instructions, such as:

LC_SET_DIM commanding a setting of a dimming or a brightness value

LC_SET_RED setting a value of brightness of red light;

LC_SET_GREEN setting a value of brightness of green light;

LC_SET_BLUE setting a value of brightness of blue light;

LC_LATCH_RGB setting a value of brightness or intensity using a previous value for a specific zone or a specific group of lighting devices 110;

LC_LATCH_RGB_SHORT setting a value of brightness or intensity for all zones or all groups of lighting devices 110;

LC_MOVING_DOWN decreasing dim or brightness, intensity level;

LC_MOVING_UP increasing dim or brightness, intensity level;

LC_FOLLOW_DIM_LINE using external source for PWM signal to modify the dim or brightness and intensity level. Such external signal control may be cancelled with LC_SET_DIM instruction;

LC_SELECT_LED1 selecting a lighting device 110a of the plurality of lighting devices 110;

LC_SELECT_LED2 selecting a lighting device 110b of the plurality of lighting devices 110;

LC_SELECT_LED3 selecting a lighting device 110c of the plurality of lighting devices 110;

LC_LATCH_FADE_SPEED using a previously sent value to set speed of fading light between 0% and 100%;

LC_LATCH_MAX_LEVEL using a previously sent value as maximum dim or intensity, brightness level;

LC_LATCH_SMOOTH_TIME using a previously sent value as dim number last sent as DIM transition time for "smooth DIM"

LC_LATCH_ON_TIME using a value sent as a time interval during which the lighting device 110 will be turned on during the strobe or flashing effect;

LC_LATCH_OFF_TIME using a value sent as a time interval during which the lighting device 110 will be turned off during the strobe or flashing effect;

LC_START_FLASH starting a flashing or strobe effect by counting PWM pulses from the master lighting device 110;

LC_STOP_FLASH stopping the flashing or strobe effect.

In some embodiments, instructions 650 include messages that set or check addresses of the lighting devices 110. Instructions 650 may include any requests for address matches, setting of addresses, such as:

LC_ACK_ADDRESS requesting response from specific address. The address may include a number between 1 and 511. This instruction may send 0 to clear the addresses;

LC_ENTER_LEARN_MODE turning on the learn mode or the addressing assignment mode and allowing the lighting devices 110 to learn set addresses, be assigned addresses or modify addresses; LC_CANCEL_LEARN_MODE ignoring learn mode and not saving the modified addresses;

LC_EXIT_LEARN_MODE turning off the learn mode or the addressing assignment mode;

LC_ACK_ZONE_MATCH sending acknowledgement if a one-wire zone or group of lighting devices 110 was recognized;

LC_FLASH_ZONE_ID flashing a zone identifier;

LC_RESET_ZONE setting the zone to default, such as value of 0 for example.

In some embodiments, instructions 650 include messages that activate or deactivate light switch enclosure detection of an object 450, such as:

LC_IR_TOUCH_SENSE commanding to use infrared, or IR, touch sensing;

LC_IR_CODE_SENSE commanding to use IR receive code sensing;

LC_PIR_SENSE commanding to use passive IR person sensing

LC_KEY_FOB_SENSE commanding to use wireless key fob sensing

LC_OTHER_SENSE commanding to use unlisted or an auxiliary technology for sensing LC_NO_SENSE commanding to turn off all sensing, and instead use the line communication between the lighting devices 110 only.

In some embodiments, instructions 650 include messages that set or check for master or slave statuses of the lighting devices 110. Instructions 650 may assign or verify master and slave statuses of the lighting devices using any number of commands, such as:

LC_ACK_MASTER sending a global request to all the lighting devices 110 to acknowledge a master status of a lighting device 110.

LC_ACK_GRANT_MASTER granting or assigning a master status to a lighting device 110 previously having a slave status;

LC_ACK_DECODE_ERR sending an acknowledgement response stating that the instruction 650 to acknowledge a master status was not recognized;

LC_CHECK_FOR_SLAVE sending a request to set a status of a lighting device 110 to slave status;

LC_ACK_REQ_SHORT sending a default request to set a hardware to clear.

In some embodiments, instructions 650 include messages that configure options, such as clock and timing of the lighting devices. Such instructions may grant or assign generic status or be used for control of communications, such as:

LC_POWER_ON_FULL powering on the lighting devices 110 to full 100% brightness or intensity;

LC_POWER_ON_LAST remembering a previous setting for next power-on

LC_SET_NUMBER setting current value to be used for intensity, addresses, status, commands or communication to any value between 0 and 1023.

LC_LATCH_COUNT using a value previously sent as count for upload/download bytes in packet, time setting;

LC_LATCH_CLOCK_TIME using a value previously sent for a time and date, such as years/days/hours/seconds of time;

LC_SET_ACTION using a value previously sent to assign the date and time of the event;

LC_RESET_HARDWARE resetting hardware of the lighting devices 110;

LC_RAW_DATA sending raw data, such as higher-level protocol for extended commands;

LC_REQUEST_STATUS asking for configuration string.

Instructions 650 may include status responses for lighting devices 110 such as, 12" V-Line "Gen2.1", 18" V-Line "Gen-2.1", Touch V1, Aperion V2, TriLight V3, Lightlink 105 V3, LightLink 101 V3, Super LightLink, or any other lighting device 110. The instructions 650 may further include current software version or revision. In some embodiments, instructions 650 include software interfaces used for communication, such as the line, DMX communication interface, differential serial communication line or a wireless connection. Instructions 650 may further include hardware features installed, such as InfraRed, or IR detect present, light switch enclosure 400 or PIR detect present, ambient light sensor present, fire sensor present, DMZ interface present or wireless radio present. Instructions 650 may further include input selections, such as: 0 to 10 volt input, 10 volt current source, MOM switch, DMX address, PWM signal input, inverted PWM signal input, preset switch input, IR touch or IR command line. Instructions 650 may further include a time, such as current time of day, total on duration of time, lighting device 110 on running time, and event timers. Instructions 650 may include humidity, temperature and voltage error readings, such as: humidity reading, minimum lifetime humidity reading with time stamp, maximum lifetime humidity reading with time stamp, temperature reading, minimum lifetime temperature reading with time stamp, maximum lifetime temperature reading with time stamp and over voltage detection with time stamp. Sometimes, instructions 650 may further include current status of sensors, such as: IR detect, PIR detect, PIR person detector tripped since last request, current state of ambient light sensor, and current state of the fire or smoke sensor.

Connection 105, which may also be referred to as the line, may be any medium through which signals, communications, instructions, power and intensity are transmitted. In some embodiments, the line is a I2Systems Lightlink™ of I2Systems Inc. In further embodiments, the line is I2Systems or I2System Lightlink Control Bus, also referred to as LLCB by I2Systems Inc. The line may comprise a single active wire connection between two or more lighting devices 110 and a single ground return wire. Two or more lighting devices 110 may be connected via the line in parallel connection, in series connection or in any combination of parallel and series connections. In some embodiments, the lighting devices are connected in a parallel connection pattern in which the communication receiving pins of the lighting devices 110 are connected to the active wire of the line and ground pins of the lighting devices 110 are connected to the ground wire of the line. In some embodiments, the line includes a medium for controlling lighting devices 110 via a lighting dimmer scheme, such as a DMX-512 protocol for a DMX connection. In further embodiments, the line includes a RS-232 connection, a wireless connection or an Ethernet connection. In still further embodiments, the line is any medium supporting or handling any 8/16 bit digital communication.

In one embodiment, a master lighting device 110*a* communicates with a plurality of slave lighting devices 110 via the line. The line may include an active wire via which the communications are transmitted, and a ground return wire. Communications transmitted may include signals, instructions, request and response messages, power or intensity modulating signals, commands, configurations, settings, read-backs or any other type and form of transmissions The communications may be digital transmissions of any voltage or current characteristics or range. In some embodiments, digital pulse width modulated (PWM) signals based on a 5 volt digital logic are transmitted via the line. The PWM signals may use a 5 volt signal to indicate a high state, while a 0 volt transmission may indicate a low state. A threshold distinguishing between the high and the low levels may be any value between 0 and 5 volts, such as 2.5 volts for example. In some embodiments, the signal in addition to only two levels, a high level and a low level, may further include additional levels, such as a third level, a fourth level, a fifth level, and so on. The line may transmit communication using a half-duplex channel allowing a single lighting device 110*a* to send a communication at one time. The lighting devices 110 receiving the communication may send acknowledgement transmissions in response to the received communication. The acknowledgement may include a response that a received instruction 650 was implemented or an indication that the received communication was acknowledged. In some embodiments, acknowledgements include a response that an error occurred or that that the received instruction 650 was not acknowledged. For example, the master lighting device 110*a* may send an instruction 650 to set a first slave lighting device 110*b* as a master lighting device. In response to the received instruction 650, the master lighting device 110*a* may receive acknowledgements from each of the lighting devices 110. Once each of the lighting devices 110 has acknowledged affirmatively, the first slave lighting device 110*b* may be assigned a master status and all the remaining lighting devices 110, including the master lighting device 110*a,* may be assigned a slave status. The first slave lighting device 110*b* is from that point on recognized as the master and may send any instructions 650 or commands to any of the lighting devices 110. Thus, the group of lighting devices 110 in this embodiment only have a single master lighting device 110 at a given time.

Instructions and acknowledgements transmitted between the lighting devices 110 may be sent via the line using any communication, such as DMX communication that uses DMX-512 protocol. In some embodiments, the DMX communication may be used or modified to enable two-way communication between lighting devices 110 by using RS-232 connections to listen for incoming communication, such as instructions or acknowledgements. Instructions or commands may be of any bit length, such as 2 bits, 4 bits, 8 bits, 16 bits or 32 bits. In some embodiments, instructions include a command of 4 bits, 8 bits of data and 4 bit checksum. In further embodiments, an additional instruction may be used to check for activity over the line. The rate of the communication transmitted via the line may vary. In some embodiments, communication is transmitted via the line at a rate of 250 cps. In further embodiments, communication transmitted may be at speed of 500 cps or clocks per second, 1000 cps, 4000 cps, 16000 cps or any other rate.

Figure 6B:
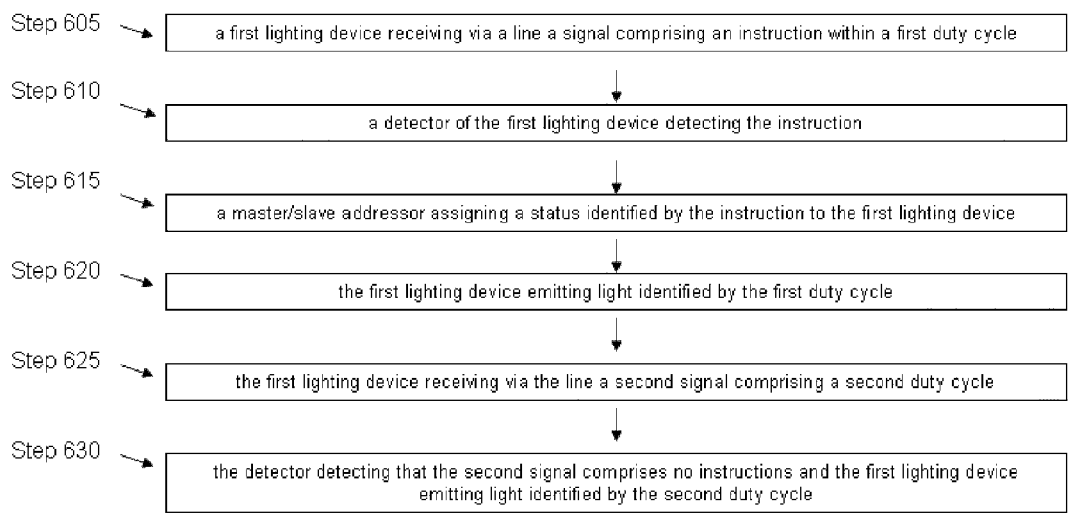
FIG. 6B is a flow chart illustrating steps of an embodiment of method for assigning a status to a lighting device via a connection used by the lighting device for receiving intensity and/or power.

Referring now to FIG. 6B, an embodiment of steps for a method for assigning a status to a lighting device over a single line or a connection used by the lighting device to communicate with one or more of other lighting devices is illustrated. At step 605, a first lighting device receives via a line a signal comprising an instruction within a first duty cycle. At step 610, a detector of the first lighting device detects the instruction. At step 615, a master/slave addressor assigns a status identified by the instruction to the first lighting device. At step 620, the first lighting device emits light identified by the first duty cycle. At step 625, the first lighting device receives via the line a second signal comprising a second duty cycle. At step 630, the detector detects that the second signal comprises no instruction and the first lighting device emits light identified by the second duty cycle.

At step 605, a first lighting device, such as the lighting device 110, receives via a line a signal comprising an instruction within a first duty cycle. The first lighting device may receive the signal via any line, such as a connection 105 for example. In some embodiments, the signal is transmitted to the first lighting device via a conducting wire. In further embodiments, the first lighting device receives the signal via a wireless link. In yet further embodiments, the first lighting device receives the signal in the form of an electromagnetic wireless transmission that can be of any bandwidth or spectral range. In still further embodiments, the first lighting device receives the signal via an optical fiber or via any type and form of a waveguide. The signal received may include any type and form of a communication or a transmission, such as digital, analog, optical, wireless, electromagnetic or electrical signal or transmission. The signal may be divided into any number of periods 205. In some embodiments, the signal is of a duration of a single period 205. In other embodiments, the signal is of a duration of a plurality of periods 205. The signal may include any number of instructions, such as the instructions 650. In some embodiments, the instruction includes an instruction 650 to set or establish a status of the first lighting device. In further embodiments, the instruction includes an instruction or a command to set or establish a master status to the first lighting device. In other embodiments, the instruction includes an instruction or a command to establish a slave status to the first lighting device. In still further embodiments, the instruction includes an instruction or a command to set or establish an intermediary status to the first lighting device. The intermediary status may be a status different from the master status or the slave status. The intermediary status may enable the first lighting device to act or operate as a master to a first number of lighting devices and to act or operate as a slave to a second number of lighting devices. The first number of lighting devices and the second number of lighting devices may be connected to the first lighting device via the same line, such as a connection 105. The instructions comprised by the signal may be included within the first duty cycle of the signal. The first duty cycle may be a duty cycle of a first period 205 of a plurality of periods 205 of the signal. The first duty cycle may be any fraction or a ratio of a duration of a period 205 for which the signal includes a high voltage value over the total duration of the period 205. In some embodiments, first duty cycle is a fraction or a ratio of a duration of a period 205 for which the signal includes a high current value over the total duration of the period 205. In further embodiments, first duty cycle is a fraction or a ratio of a duration of a period 205 for which the signal includes a high power value over the total duration of the period 205. In some embodiments, duty cycle includes an average value of the signal averaged over the period 205. The total duration of the period 205 may include portions of the signal having any number of values.

At step 610, any component of the first lighting device detects the instruction. The instruction may be any instruction 650. In some embodiments, detector 605 detects the instruction 650. In further embodiments, communicator 125 detects the instruction 650. In still further embodiments, controller 120 detects the instruction 650. In yet further embodiments, master/slave addressor 130 detects the instruction 650. The first lighting device may detect the instruction using any type and form of a detecting mechanism, apparatus, application or a device. In some embodiments, the first lighting device detects the instruction 650 using a detector that monitors the receiving signal detects the instruction 650 within the signal. In further embodiments, the first lighting device monitors the incoming signal for a specific signal profile in order to detect the instruction. The lighting device 110 may detect the instruction 650 by matching an address or an identifier comprised by the incoming instruction 650 to address 127 stored on the lighting device 110. The address or the identifier of the instruction 650 may include any set of characters, numbers, symbols, data 210, data bits 215 or instruction bits 220. In some embodiments, the address or the identifier of the instruction 650 includes a set of data bits 215, characters, numbers or symbols that that match data bits 215, characters, numbers or symbols of the address 127 stored on the lighting device 110. The first lighting device may detect the instruction 650 by parsing the received instruction into components, one of which may be an address comprised by the instruction 650. The address or the identifier of the parsed instruction 650 may be matched to the address 127 of the first lighting device by the detector 605. In some embodiments, detector 605 matches the address or the identifier of the instruction 650 to the address 127 of the lighting device using any type and form of a logic comparator, a policy or a rule. In further embodiments, the lighting device uses a policy engine to match an address or the identifier of the instruction 650 to the address 127 of the lighting device. In still further embodiments, the lighting device uses a rule engine to match an address or the identifier of the instruction 650 to the address 127 of the lighting device. In yet further embodiments, the lighting device 110 uses any combination of a comparator, a logic component a parser, a rule engine, a policy engine or any other matching or detecting unit to detect the instruction 650. Detector 605 may further identify the type of instruction, such as an instruction 650 to assign a master status, a slave status or any other type of status to the first lighting device 110. In some embodiments, the first lighting device 110 identifies the instruction to assign a master status to the first lighting device. In other embodiments, the first lighting device identifies the instruction to assign a slave status to the first lighting device. In further embodiments, the first lighting device identifies the instruction to assign any other status, such as an intermediary status, to the first lighting device.

At step 615, a component of the first lighting device assigns a status to the first lighting device. The status may be assigned to the first lighting device 110 in response to the identification of the received instruction 650 by the detector 605. The status may be assigned to the first lighting device 110 in response to the matching of the address or the identifier of the instruction 650. In some embodiments, master/slave addressor 130 of the first lighting device assigns the status to the first lighting device 110. In other embodiments, any component of the lighting device 110 assigns the status to the first lighting device 110. In further embodiments, the status assigned to the first lighting device 110 is identified by the instruction 650 received by the first lighting device 110. The status may be assigned in response to the detection of the instruction 650. In some embodiments, the status is assigned in response to the matching of the address or the identifier of the instruction 650 with the address 127 of the first lighting device 110. In still further embodiments, master/slave addressor 130 modifies or edits configuration of the first lighting device 110 in accordance with the status identified by the instruction 650. Master/slave addressor 130 may edit or modify settings or configuration of the first lighting device 110 to a specific configuration of the status identified by the instruction 650. In some embodiments, master/slave addressor 130 edits or modifies the configuration of the first lighting device to the master configuration in response to the detection 650 of the instruction to set the first lighting device 110 to the status of the master. In further embodiments, master/slave addressor 130 edits or modifies the configuration of the first lighting device 110 to the slave configuration in response to the detection of the instruction 650 to set the first lighting device 110 to the status of a slave. In yet further embodiments, master/slave addressor 130 edits or modifies the configuration of the first lighting device to the intermediary configuration in response to the detection of the instruction to set the first lighting device to the intermediary status. Modified configuration in response to the detection of the instruction 650 to set up or assign a master status to the first lighting device 110 may change operation of the first lighting device 110 to control or manage other lighting devices connected via the line. In some embodiments, modified configuration in response to the detection of the instruction 650 to assign or set up a slave status to the first lighting device 110 changes or modifies the operation of the first lighting device 110 to be controlled or managed by another lighting device 110 that is connected via the line, or the connection 105, to the first lighting device 110.

At step 620, the first lighting device emits light identified by the first duty cycle. The first lighting device 110 may emit the light having the intensity 650 or the power 655 as defined by the first duty cycle or as defined by the signal within the first duty cycle. In some embodiments, the first lighting device emits light that has intensity 658 that is identified by the first duty cycle. In further embodiments, first lighting device emits light that has intensity 658 that is identified by the plurality of successive duty cycles, such as the first duty cycle. In still further embodiments, the first lighting device emits light that has intensity 658 that is proportional to the first duty cycle. In still further embodiments, the first lighting device emits light that has intensity 658 that is proportional to the maximum intensity of light emitted by the first lighting device multiplied by the first duty cycle. In some embodiments, the first lighting device emits light that has power 655 identified by the first duty cycle. In further embodiments, first lighting device emits light that has power 655 identified by the plurality of successive duty cycles. In still further embodiments, the first lighting device emits light that has power 655 that is proportional to the first duty cycle. In still further embodiments, the first lighting device emits light that has power 655 that is proportional to the maximum power used by the first lighting device multiplied by the first duty cycle. In further embodiments, the first lighting device 110 emits light that has pulse or intensity variation that is defined or identified by the first duty cycle or by a plurality of duty cycles such as the first duty cycle.

At step 625, the first lighting device receives via the line a second signal comprising a second duty cycle. The second signal may be divided into any number of periods 205. In some embodiments, the second signal is of a duration of a single period 205. In other embodiments, the second signal is of a duration of a plurality of consecutive periods 205. The first lighting device may receive via the line a second signal comprising any functionality or any feature of the signal received by the first lighting device in step 605. In some embodiments, the second signal comprises a second duty cycle that is same as the first duty cycle or substantially similar to the first duty cycle. In other embodiments, the second duty cycle is different from the first duty cycle. The second duty cycle may include any embodiments and any functionality of any duty cycle. The second duty cycle may not include any instructions 650 but may still define or identify the same power 655 or the same intensity 658 as defined by the first duty cycle. In some embodiments, the second duty cycle does not include any instructions 650 but still identifies or defines power 655 that is the same or substantially similar as the power 655 defined or identified by the first duty cycle. In further embodiments, the second duty cycle does not include any instructions 650 but still identifies or defines power 655 that is the same or substantially similar as the power 655 defined or identified by the first duty cycle.

At step 630, first lighting device detects that the second signal comprises no instructions and emits light identified by the second duty cycle. In some embodiments, detector 605 detects no instructions 650 within the second signal. The first lighting device may emit light identified by the second duty cycle. The first lighting device 110 may emit the light as identified by the second duty cycle regardless of the presence or absence of the instruction 650 from the signal within the second duty cycle. The first lighting device 110 may emit the light having the intensity 650 or the power 655 as defined by the second duty cycle or as defined by the signal within the second duty cycle. In some embodiments, the first lighting device emits light that has intensity 658 that is proportional to the second duty cycle. In still further embodiments, the first lighting device emits light that has intensity 658 that is proportional to the maximum intensity of light emitted by the first lighting device multiplied by the second duty cycle. In some embodiments, the first lighting device emits light that has power 655 identified by the second duty cycle. In further embodiments, first lighting device emits light that has power 655 identified by the plurality of successive duty cycles. In still further embodiments, the first lighting device emits light that has power 655 that is proportional to the second duty cycle. In still further embodiments, the first lighting device emits light that has power 655 that is proportional to the maximum power used by the first lighting device multiplied by the second duty cycle. In further embodiments, the first lighting device 110 emits light that has pulse or intensity variation that is defined or identified by the second duty cycle or by a plurality of duty cycles such as the second duty cycle.

I claim:

1. A method for detecting a presence of an object, the method comprising:
   emitting, from a light emitting device (LED) of an apparatus, an electromagnetic signal, the electromagnetic signal comprising high components and low components;
   determining, by a detector of the apparatus, that an average intensity of a received portion of the electromagnetic signal is below a predetermined threshold, the average intensity determined responsive to a ratio of the high components duration over a period of time to the low components duration over the period of time; and
   detecting, by the detector, a presence of an object, located in a first proximity of the detector and reflecting a portion of the electromagnetic signal, by determining that a sum of average intensities of the received portion of the electromagnetic signal and the reflected portion of the electromagnetic signal exceeds the predetermined threshold, the sum of average intensities determined responsive to the ratio.

2. The method of claim 1, wherein the received portion of the electromagnetic signal comprises a portion of the electromagnetic signal that is reflected by a glass of the apparatus.

3. The method of claim 1, further comprising: adjusting the ratio to detect the object at a second proximity, the second proximity comprising a different length of a detection range of the object from the apparatus than the first proximity.

4. The method of claim 1, wherein the object is a part of a body of a person.

5. The method of claim 1, further comprising:
adjusting, by a gain circuit of the apparatus, gain of a sum of the received portion and the reflected portion detected by the detector, the gain adjusted to be within a predetermined gain range;
filtering, by a frequency filter of the apparatus, a frequency of the sum of the received portion and the reflected portion detected by the detector, the frequency filter eliminating frequencies of the sum that are outside of a predetermined frequency range; and
detecting, by the detector, the presence of the object in response to determining, by a comparator of the apparatus that an average intensity of the sum adjusted by the gain circuit and filtered by the frequency filter exceeds the predetermined threshold.

6. A method for detecting a presence of an object, the method comprising:
emitting, from a first light emitting device (LED) of an apparatus, a first signal comprising high components and low components;
adjusting a ratio of time duration of the high components in relation to time duration of the low components;
reflecting, by a glass of the apparatus, a portion of a second signal, the second signal emitted from a second LED of a non-contact switch; and
detecting, by a detector of the apparatus, a presence of an object located in a proximity of the apparatus and reflecting a portion of the first signal, by determining that an average intensity of a sum of the reflected portions of the first signal and the second signal exceeds a detection threshold of the detector, the average intensity of the sum exceeding the detection threshold based on the ratio.

7. The method of claim 6, wherein the reflected portion of the first signal propagates through the glass that reflects the second portion of the second signal.

8. The method of claim 7, further comprising:
determining, by the detector, that the reflected portion of the second signal does not exceed the detection threshold; and
detecting, by the detector, presence of the object by determining that the sum exceeds the detection threshold.

9. The method of claim 6, further comprising:
adjusting, by a gain circuit of the apparatus, gain of the sum, the gain of the sum adjusted to be within a predetermined gain range;
filtering, by a frequency filter of the apparatus, a frequency of the sum, the frequency filter eliminating frequencies outside of a predetermined frequency range; and
determining, by a comparator of the apparatus, that the sum adjusted by the gain circuit and filtered by the frequency filter exceeds the detection threshold.

10. The method of claim 9, wherein the gain circuit adjusts the gain to maintain the reflected portion of the second signal received by the detector below detection threshold and wherein the frequency filter filters out signals with carrier frequencies below 35 kilohertz and above 45 kilohertz.

11. A system for detecting a presence of an object, the system comprising:
a light emitting device (LED) of an apparatus emits an electromagnetic signal, the electromagnetic signal comprising high components and low components;
a detector of the apparatus determines that an average intensity of a received portion of the electromagnetic signal is below a predetermined threshold, the average intensity determined responsive to a ratio of the high components duration over a period of time to the low components duration over the period of time; and
the detector detects a presence of an object, located in a proximity of the apparatus and reflecting a portion of the electromagnetic signal, by determining that a sum of average intensities of the received portion of the electromagnetic signal and the reflected portion of the electromagnetic signal exceeds the predetermined threshold, the sum of average intensities determined responsive to the ratio.

12. The system of claim 11, wherein the received portion of the electromagnetic signal comprises a portion of the electromagnetic signal that is reflected by a glass of the apparatus.

13. The system of claim 11, wherein a user adjusts a ratio, the adjusted ratio enabling detection of the object at a second proximity, the second proximity comprising a different length of a detection range of the object from the apparatus than the proximity.

14. The system of claim 11, wherein the object is a part of a body of a person.

15. The system of claim 11, wherein:
an intensity filter of the apparatus adjusts gain of a sum of the received portion and the reflected portion detected by the detector, the gain adjusted to be within a predetermined gain range;
a frequency filter of the apparatus filters a frequency of the sum of the received portion and the reflected portion detected by the detector, the frequency filter eliminating frequencies of the sum that are outside of a predetermined frequency range; and
the detector detects the presence of the object in response to determining, by a comparator of the apparatus, that an average intensity of the sum exceeds the predetermined threshold.

16. A system for detecting a presence of an object, the system comprising:
a first light emitting device (LED) of an apparatus emitting a first signal comprising high components and low components; a ratio adjuster for adjusting a ratio of time duration of the high components in relation to time duration of the low components;
a glass of the apparatus reflecting a portion of a second signal, the second signal emitted from a second LED of a non-contact switch;
a detector of the apparatus detecting a presence of an object, located in a proximity of the apparatus and reflection a portion of the first signal, by determining that an average intensity of a sum of the reflected portions of the first signal and the second signal exceeds a detection threshold of the detector, the average intensity of the sum exceeding the detection threshold based on the ratio.

17. The system of claim 16, wherein the reflected portion of the first signal propagates through the glass that reflects the second portion of the second signal.

18. The system of claim 16, wherein the detector determines that the reflected portion of the second signal does not exceed the detection threshold and detects the presence of the object by determining that the sum exceeds the detection threshold.

19. The system of claim 16, wherein a gain circuit of the apparatus adjusts gain of the sum, the gain of the sum adjusted to be within a predetermined gain range;
- a frequency filter of the apparatus filters a frequency of the sum, the frequency filter eliminating frequencies outside of a predetermined frequency range; and
- a comparator of the apparatus determines that the sum adjusted by the gain circuit and the frequency filtered by the frequency filter exceeds the detection threshold.

20. The system of claim 19, wherein the gain circuit adjusts the gain to maintain the reflected portion of the second signal received by the detector below the detection threshold and wherein the frequency filter filters out frequencies below 35 kilohertz and above 45 kilohertz.

* * * * *